United States Patent [19]
Richards

[11] Patent Number: 4,993,016
[45] Date of Patent: Feb. 12, 1991

[54] NETWORK CONTROL ARRANGEMENT FOR PROCESSING A PLURALITY OF CONNECTION REQUESTS

[75] Inventor: Gaylord W. Richards, Naperville, Ill.

[73] Assignee: AT&T Bell Laboratories, Murray Hill, N.J.

[21] Appl. No.: 349,027

[22] Filed: May 8, 1989

[51] Int. Cl.$^5$ ............................................. H04Q 11/00
[52] U.S. Cl. .................................... 370/54; 370/58.1; 340/826; 379/272
[58] Field of Search ............... 370/54, 65.5, 58.1–58.3, 370/60, 60.1; 340/826, 827, 825.79, 825.8; 379/219, 220, 221, 271, 272, 273, 274, 275

[56] References Cited

U.S. PATENT DOCUMENTS

| | | | |
|---|---|---|---|
| 4,005,272 | 1/1977 | Collins et al. | 370/54 |
| 4,038,497 | 7/1977 | Collins et al. | 370/54 |
| 4,621,357 | 11/1985 | Naiman et al. | 370/65.5 |
| 4,686,669 | 8/1987 | Chang | 370/54 |

OTHER PUBLICATIONS

A. Feiner et al., "No. 1 ESS Switching Network Plan", *The Bell System Technical Journal*, vol. XLIII, Sep. 1964, No. 5, Part 2, pp. 2193–2220.
W. Ulrich, "No. 1 ESS Network Sequences and Program", Electronic Switching Symposium, 1963, pp. 14-1–14-13.

Primary Examiner—Douglas W. Olms
Assistant Examiner—Alpus H. Hsu
Attorney, Agent, or Firm—R. T. Watland

[57] ABSTRACT

A network control arrangement where two or more path hunt operations are performed in parallel using one or both of two techniques: (1) reading a memory for a second path hunt operation during the time that information read from the memory for a first path hunt operation is being processed to select a path, and (2) maintaining duplicate memories and reading from them both to perform two path hunt operations before either memory is updated. A disjoint path check unit rapidly determines whether all of the network paths from a first inlet to a first outlet are disjoint from all of the network paths from a second inlet to a second outlet. Plural path hunts are performed only when all network paths from the first inlet to the first outlet are determined to be disjoint from all network paths from the second inlet to the second outlet.

34 Claims, 41 Drawing Sheets

FULL CAPACITY NODE

CAPACITY ONE NODE WITH SELECTIVITY

CAPACITY ONE NODE WITHOUT SELECTIVITY

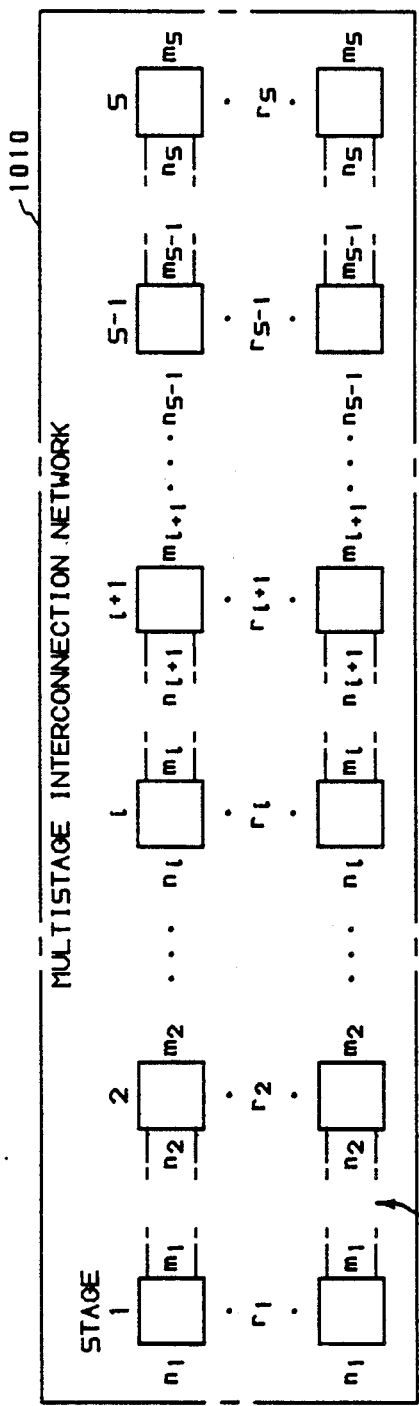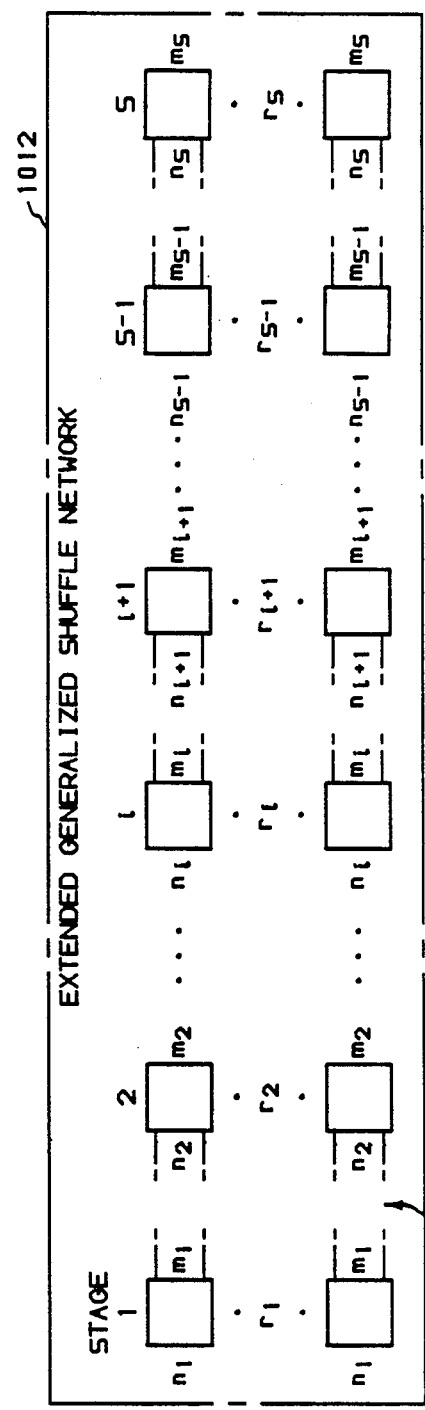

16 X 16 CROSSOVER NETWORK

| FIG. 34 | FIG. 35 | FIG. 36 |

— 4,993,016 —

NETWORK CONTROL ARRANGEMENT FOR PROCESSING A PLURALITY OF CONNECTION REQUESTS

CROSS-REFERENCE TO RELATED APPLICATIONS

This application is related to the following applications, which are assigned to the same assignee and concurrently filed herewith:

T. J. Cloonan et al., "Network Topology for Reduced Blocking and Photonic System Implementation Thereof", Ser. No. 07/349,281 filed May 8, 1986.

T. J. Cloonan et al., "Space-Division Switching Network Having Reduced Functionality Nodes", Ser. No. 07/349,280 field May 8, 1989.

T. J. Cloonan et al., "Optical Apparatus for Combining Light Beam Arrays Having Different Wavelengths", Ser. No. 07/349,280 filed May 8, 1989.

T. J. Cloonan et al., "Crossover Network Utilizing Two-Dimensional Arrays of Nodes", Ser. No. 07/349,008 filed May 8, 1989.

G. W. Richards, "Concurrent Multi-Stage Network Control Arrangement", Ser. No. 07/349,011, filed May 8, 1989.

G. W. Richards, "Network Control Arrangement Based on Topological Equivalence" Ser. No. 07/349,007, filed May 8, 1989.

TECHNICAL FIELD

This invention relates to communication network control and, more specifically to arrangements, applicable to both circuit-switched and packet-switched networks, for rapidly determining available network paths and enabling communication via such paths.

BACKGROUND AND PROBLEM

The time required to perform a path hunt through a switching network effectively limits the rate at which circuit-switched or packet-switched communications can be established through that network. The path hunt process involves three basic determinations: (1) identifying one or more paths between a given network inlet and a given network outlet, (2) determining whether any of the identified paths are idle and (3) if more than one of the identified paths are idle, selecting one for use for a particular communication. Once an idle path is selected, further control actions must be taken to enable communication through that path. As disclosed in an article by A. Feiner et al., Bell System Technical Journal, September 1964, pages 2208–2214, a basic decision in the design of the 1 ESS ™ switch was that of isolating the path hunt function from the switching network itself. A central processor makes all path searches and keeps a continuous record of all pertinent switching information in its memory. Since only a single processor is used, only one path hunt operation is performed at a time. Accordingly, there is no possibility of an error due to a memory being accessed for a second path hunt operation before a path selected as a result of a first path hunt is marked busy. However, as network designs evolve for use in communicating a wider variety of voice, image and data information, and specifically for networks designed for implementation in the photonics domain and where circuit-switched or packet-switched connections are requested at a high rate the limitation of "one at a time" path hunt operations characteristic of known network control arrangements may lead to long connection request queues and connection setup delays.

SOLUTION

The aforementioned problem is solved and a technical advance is achieved in accordance with the principles of the invention in an exemplary network control arrangement, implemented using hardware rather than with a single, software-controlled processor, where two or more path hunt operations are performed in parallel using one or both of two techniques: (1) reading a memory for a second path hunt operation during the time that information read from the memory for a first path hunt operation is being processed to select a path, and (2) maintaining duplicate memories and reading from them both to perform two path hunts before either memory is updated. For the illustrative networks described herein, it is very likely that none of the network paths from a first inlet to a first outlet conflict with any of the network paths from a second inlet to a second outlet. Furthermore, a simple logic circuit is capable of rapidly determining whether two connection requests conflict. Plural path hunts are performed only when there is no conflict.

A method in accordance with the invention is used in an arrangement comprising a network for interconnecting any of a plurality of inlets with any of a plurality of outlets, and means for storing busy/idle information for network path components. The storing means is read to identify an idle path from a first network inlet to a first network outlet. After identifying an idle path, path components of the path are marked busy in the storing means. However, before the path is marked busy, the storing means is accessed to find an idle path from a second network inlet to a second network outlet.

An illustrative network controller (FIG. 1) is used to control a 512×512 multi-stage crossover network (FIG. 38). The controller includes a plurality of memories each storing stage busy/idle information for one of the network stages. A disjoint path check unit (FIG. 46) determines whether any network paths form a first network inlet to a first network outlet conflict with any network paths from a second network inlet to a second network outlet. The stage memories are accessed to find an idle path from the second inlet to the second outlet before being updated only when it is determined that there is no possible conflict. The disjoint path check is effected by logically combining corresponding bits of inlet binary numbers associated with the first and second inlets and logically combining corresponding bits of outlet binary numbers associated with the first and second outlets.

In a first plural processing technique, busy/idle information is read from the stage memories and subsequently processed to identify an idle path. Concurrently with the identification processing, the stage memories are accessed again to effect another, non-conflicting path hunt.

An alternative network controller (FIG. 45) has duplicate, first and second memories for each stage. In a second plural processing technique, the first stage memories and the second stage memories are read concurrently to perform two path hunts. Identified paths are subsequently marked busy in both the first and second stage memories. The alternative network controller also employs the first plural processing technique to further reduce connection request processing times.

One specific illustrative embodiment of the invention is used in the network controller 1300 (FIG. 1) which controls a 512×512 multi-stage crossover network 1200 (FIG. 38). To get a better understanding of the size of network 1200 and the potential complexity of performing path hunts in a network of that size, first refer to the 16×16 crossover network 1170 (FIGS. 34–36) and note the pattern of crossover connections from stage to stage. FIG. 37 is a representation of the relative sizes of the 16×16 network 1170 and the 512×512 network 1200. Also shown is an intermediate size 128×128 network. Crossover network 1200 (FIG. 38) also includes 15 stages; however stages 1, 2, 3, 13, 14, and 15 do not perform a switching function but are used only to implement the fanout/fanin F=8. Network controller 1300 is used to effect path hunt, connect and disconnect functions for network 1200 via a plurality of stage controllers 1201 through 1209, individual to the stages 4 through 12. For the present example, the nodes of the switching stages 4 through 12 are full capacity switching nodes such as the node of FIG. 6.

Network controller 1300 (FIG. 1) includes a plurality of memories 1312 each storing stage busy/idle information for one of the link stages of network 1200. Stage busy/idle information is combined concurrently from all of the memories 1312 to hunt for an idle path from a specified network 1200 inlet to a specified network 1200 outlet. Network 1200 has eight paths from a specified inlet to a specified outlet. Each stage memory 1312 stores the stage busy/idle bits for all eight paths at one location addressable based on the specified inlet and outlet. The stage busy/idle bits are read concurrently for all paths and all stages. Eight busy/idle check units 1314 concurrently determine the overall busy/idle status of all eight paths. An idle path select unit 1316 selects one of the idle paths for use for a particular communication. All of the stage memories 1312 are concurrently updated to redefine the selected path as busy. Signals are transmitted to the node stage controllers 1201 through 1209 to enable the selected path for communication and information defining the path is written into path memory 1318. When a disconnection request is received, the stage busy/idle information is changed concurrently in all stage memories 1312 to again reflect an idle status. Signals are transmitted to the node stage controllers 1201 through 1209 (FIG. 38) to disable communication over the path and the path information is deleted from path memory 1318 (FIG. 1).

In network 1200, it is very probable that two connection requests are not in conflict, i.e., none of the eight network 1200 paths from a first inlet to a first outlet conflict with any of the eight network 1200 paths from a second inlet to a second outlet. A disjoint path check unit 1306 (FIG. 46) determines whether any network paths conflict for the two connection requests. Stage memories 1312 are accessed to find an idle path from the second inlet to the second outlet before being updated only when it is determined that there is no possible conflict. The disjoint path check is effected by logically combining corresponding bits of inlet binary numbers associated with the first and second inlets and logically combining corresponding bits of outlet binary numbers associated with the first and second outlets.

In a first plural processing technique, busy/idle information is read from stage memories 1312 and subsequently processed by the busy/idle check units 1314 and the idle path select unit 1316 to identify an idle path. Concurrently with the path identification processing, the stage memories 1312 are accessed again to effect another, non-conflicting path hunt.

An alternative network controller 1301 (FIG. 45) has duplicate, first and second memories 1312 for each stage. In a second plural processing technique, the first memories 1312 and the second memories 1312 are read concurrently to perform two path hunts. Identified paths are subsequently marked busy in both the first memories 1312 and the second memories 1312. Controller 1301 also employs the first plural processing technique to further reduce connection request processing times.

DRAWING DESCRIPTION

Figure 1:
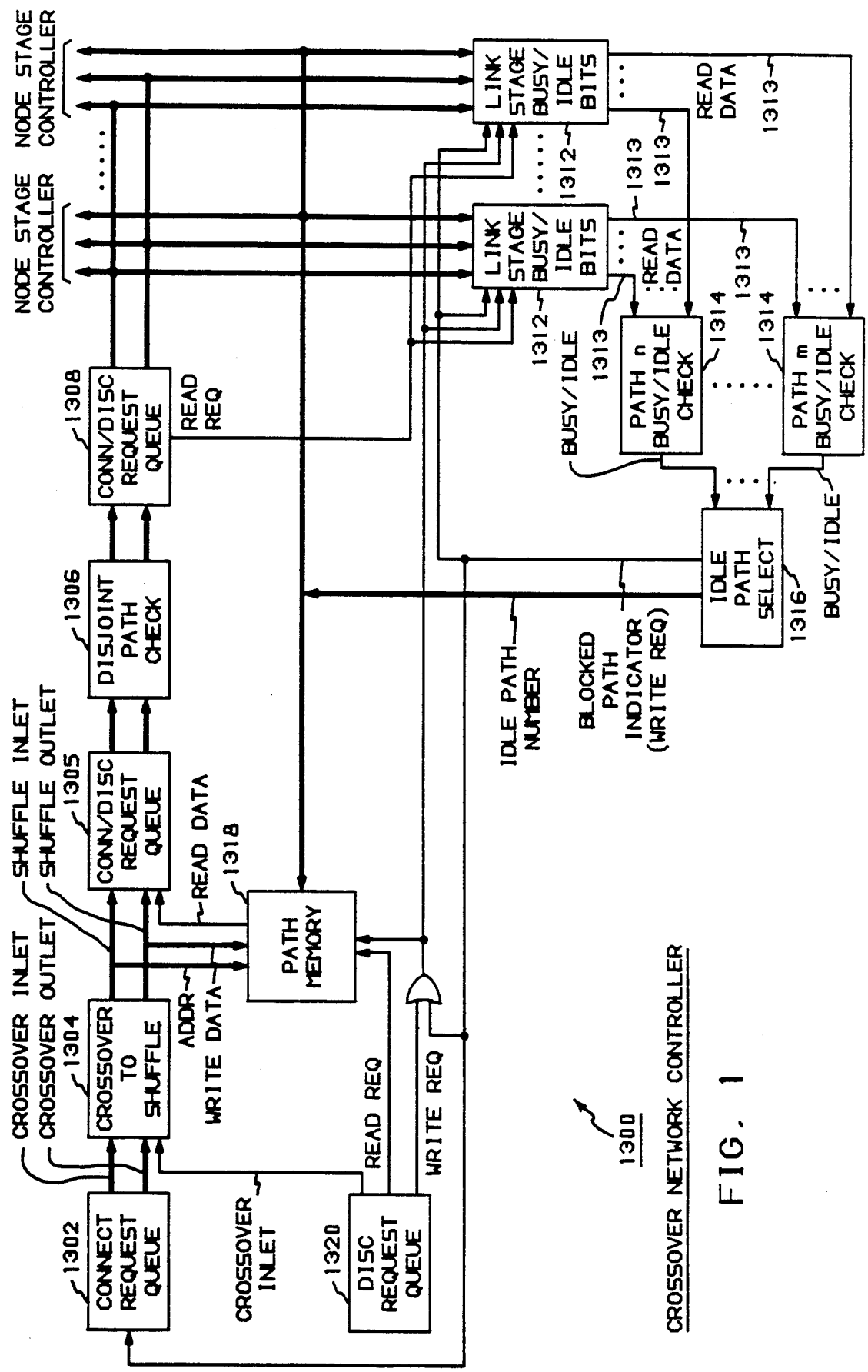
FIG. 1 is a diagram of an illustrative network controller for controlling the 512×512 multi-stage crossover network of FIG. 38.
Figure 2:
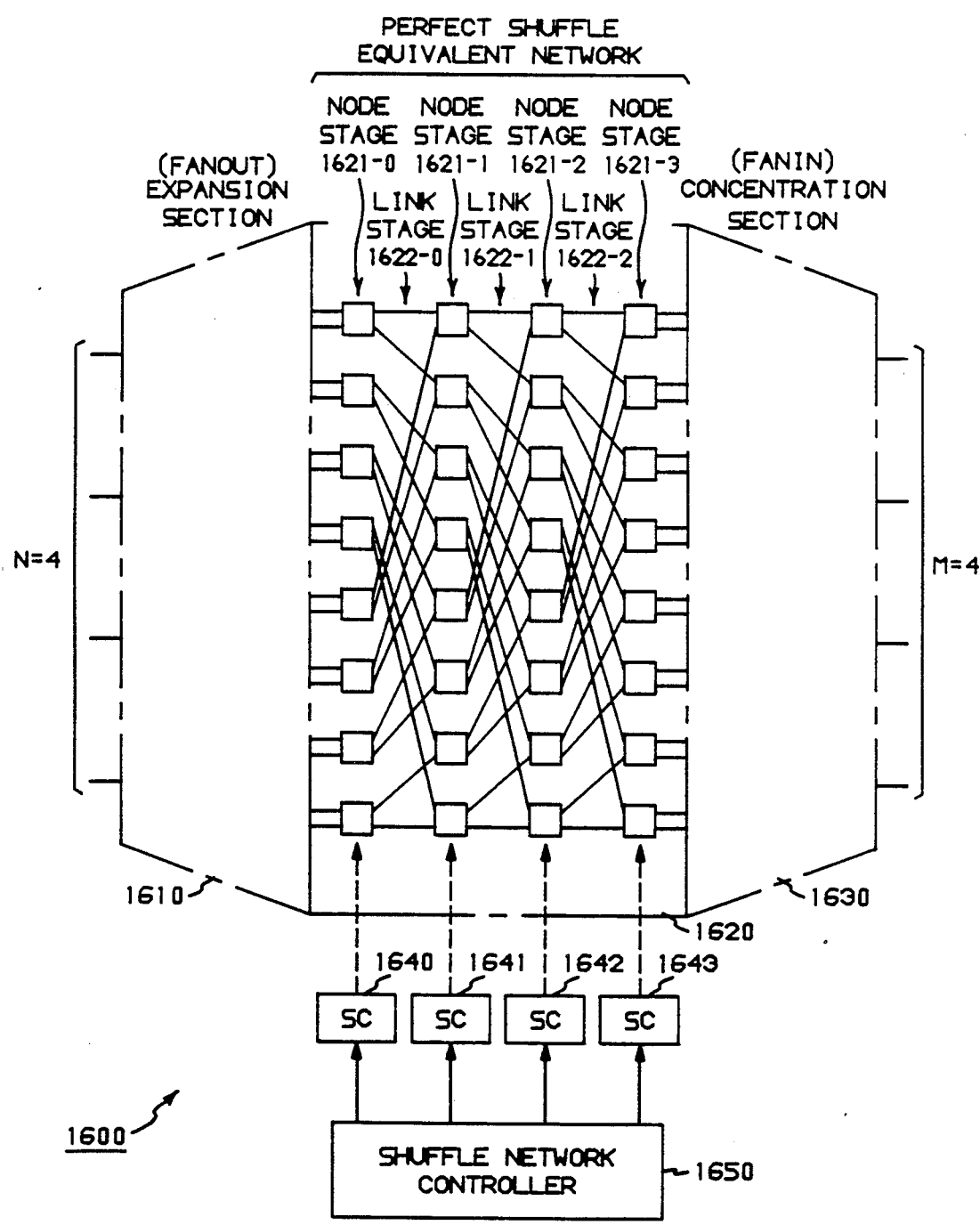
FIG. 2 is a diagram of an illustrative network topology for a system comprising expansion, a perfect shuffle equivalent network, and concentration.
Figure 3:
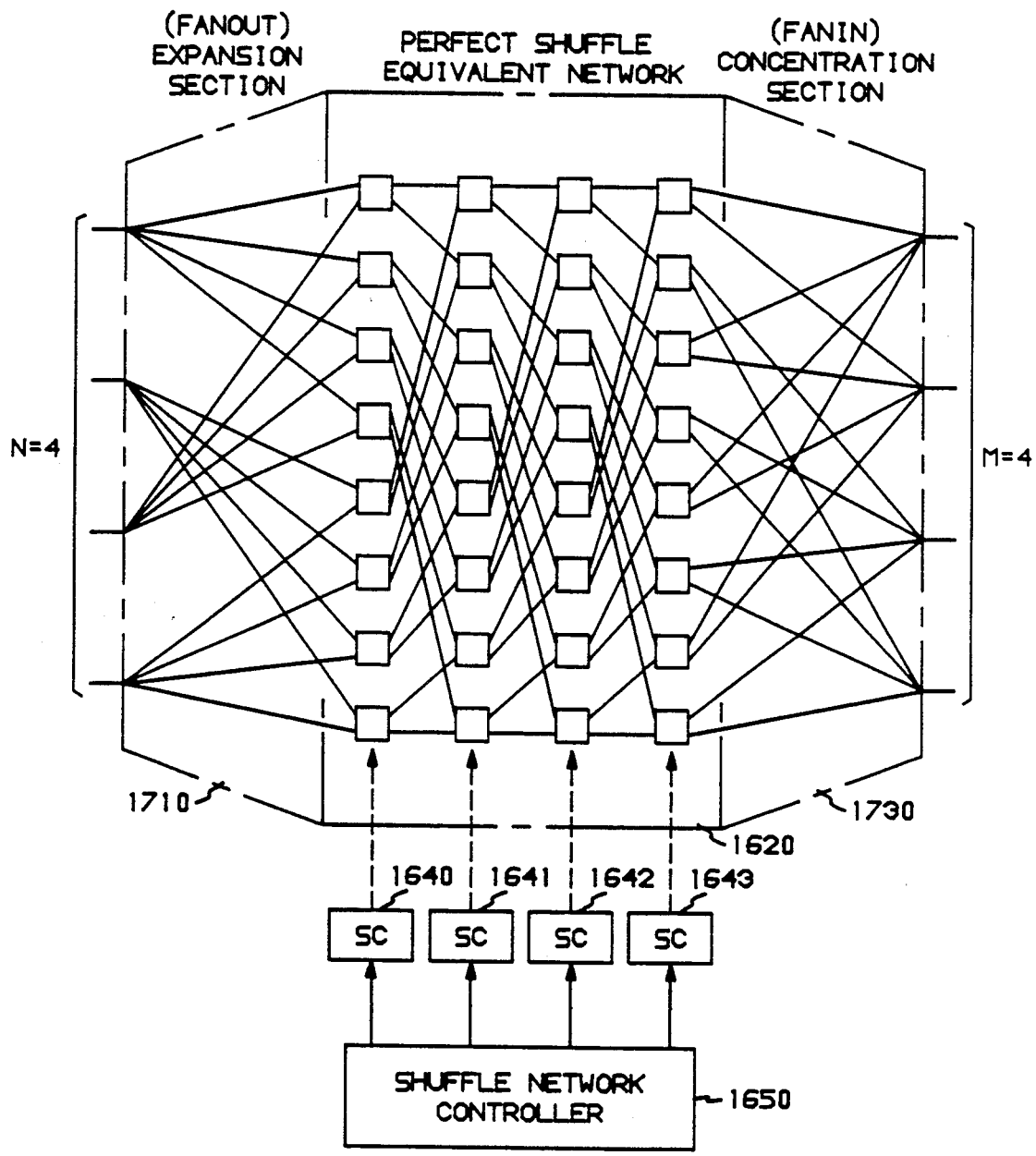
Figure 4:
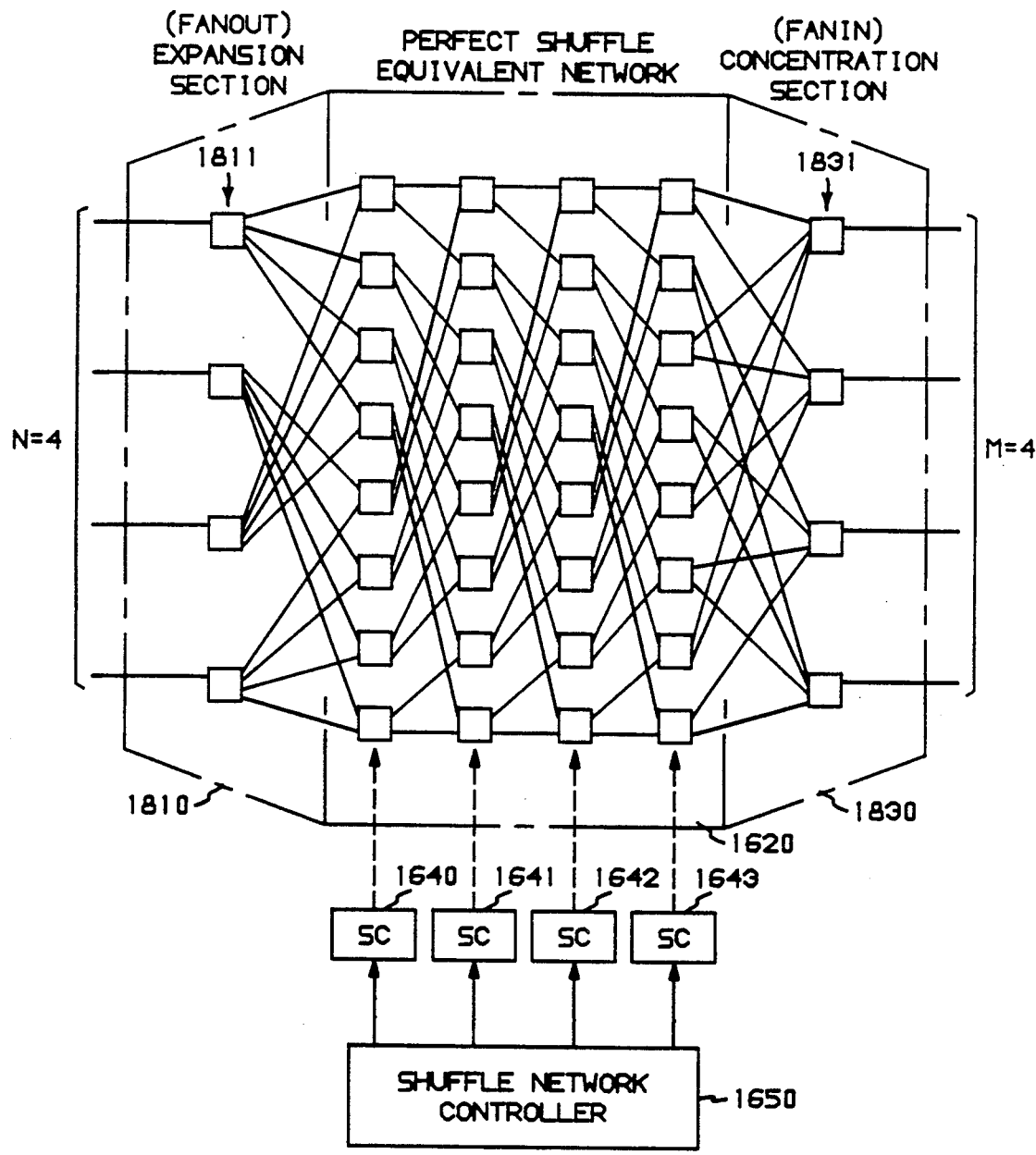
Figure 5:
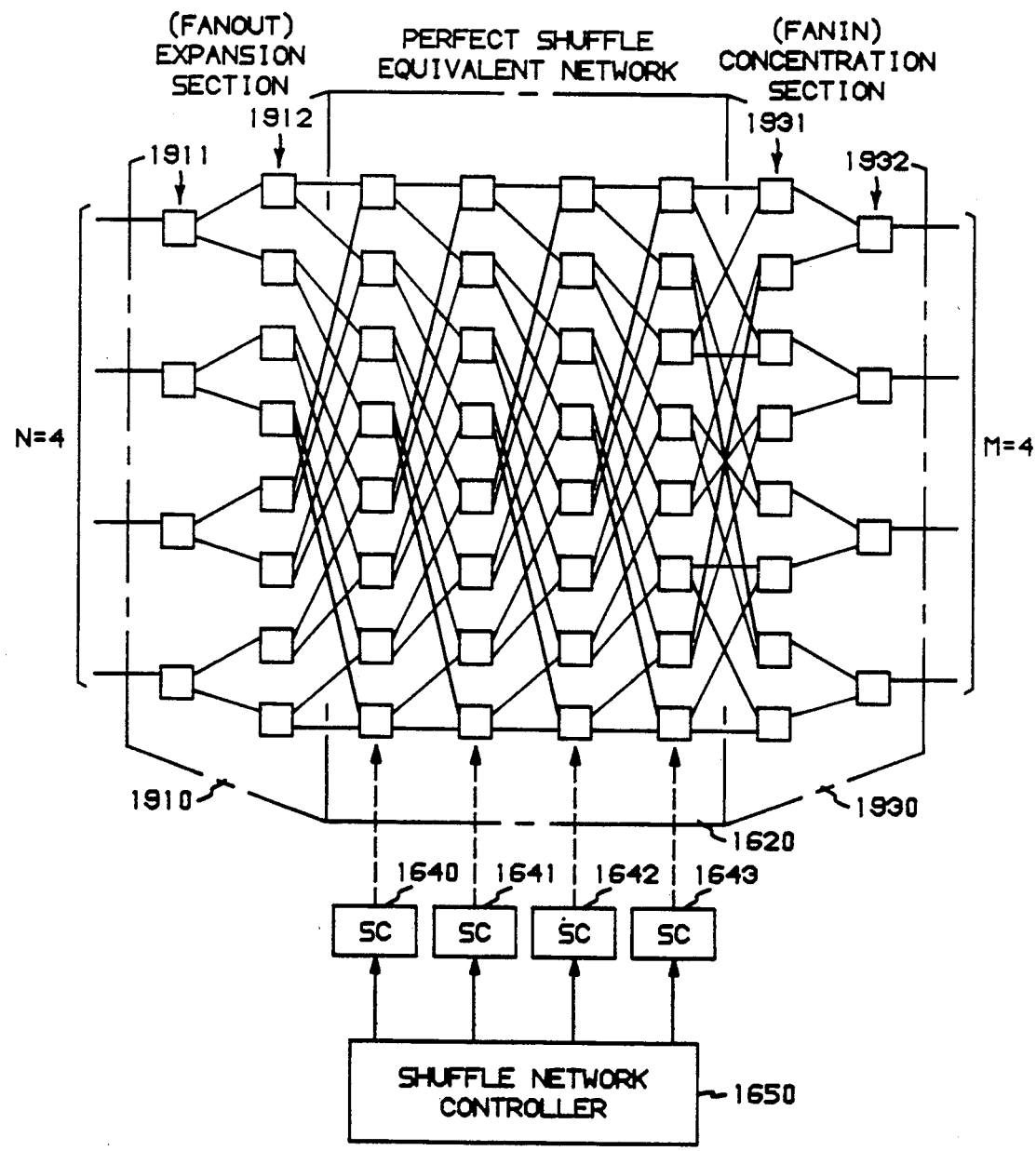
Figure 6:
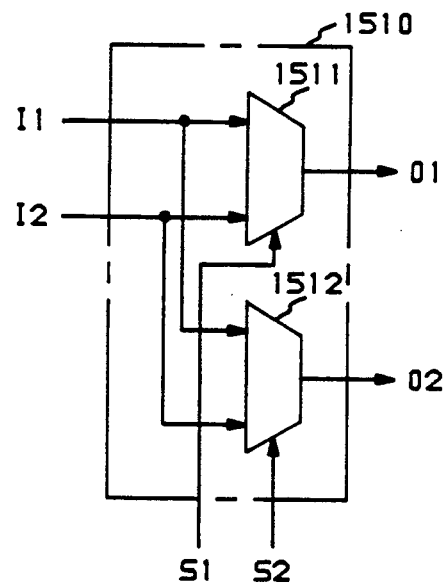
Figure 7:
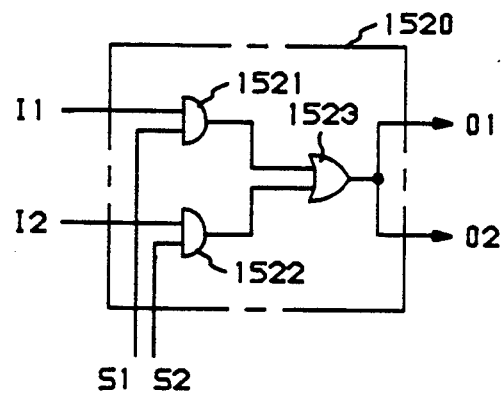
Figure 8:
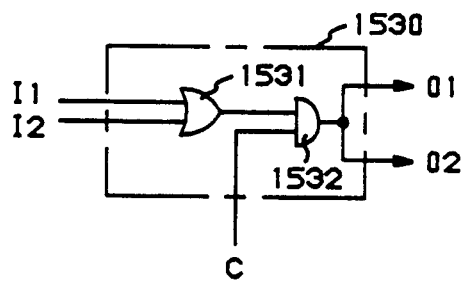
Figure 9:
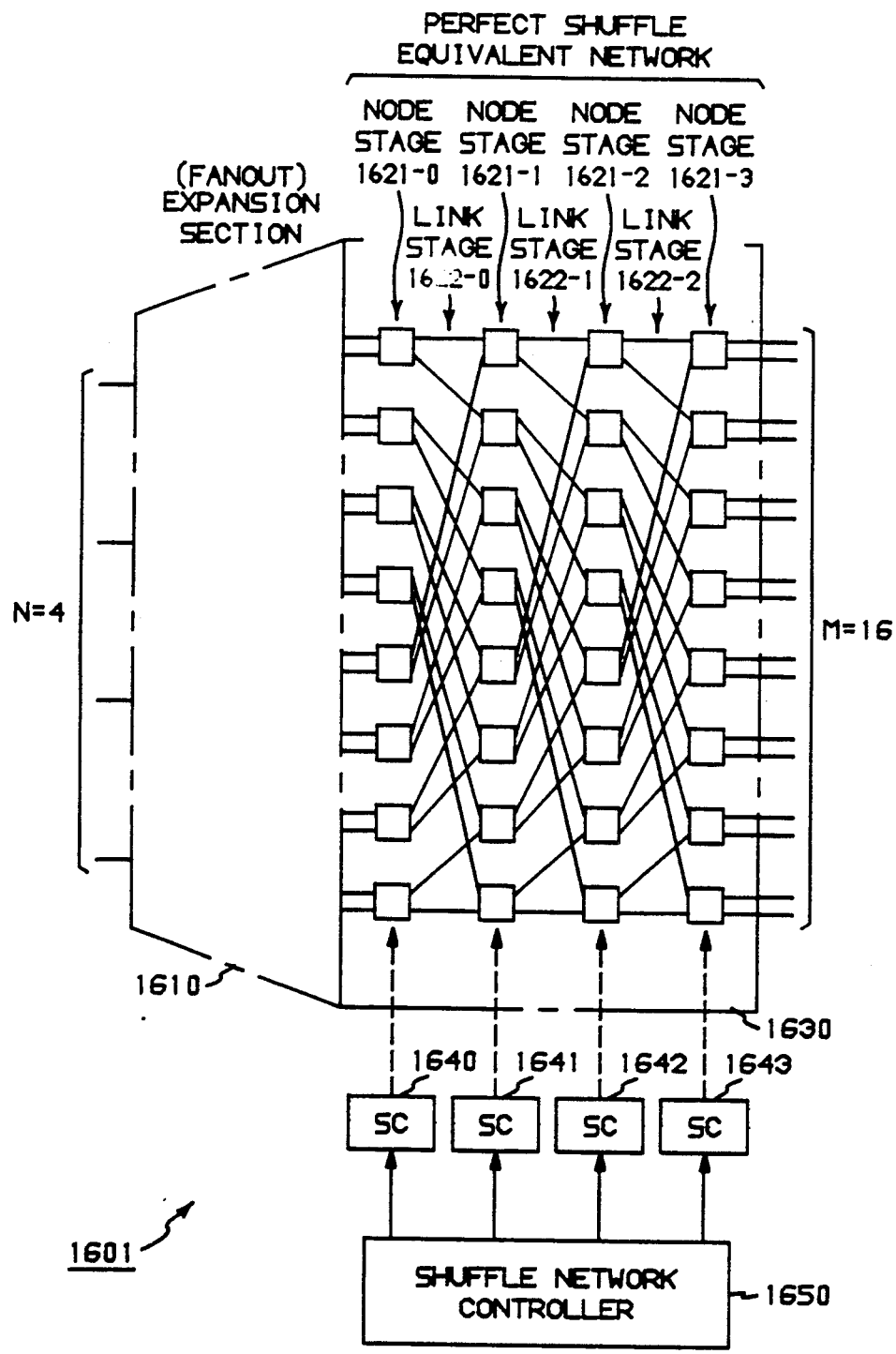
Figure 10:
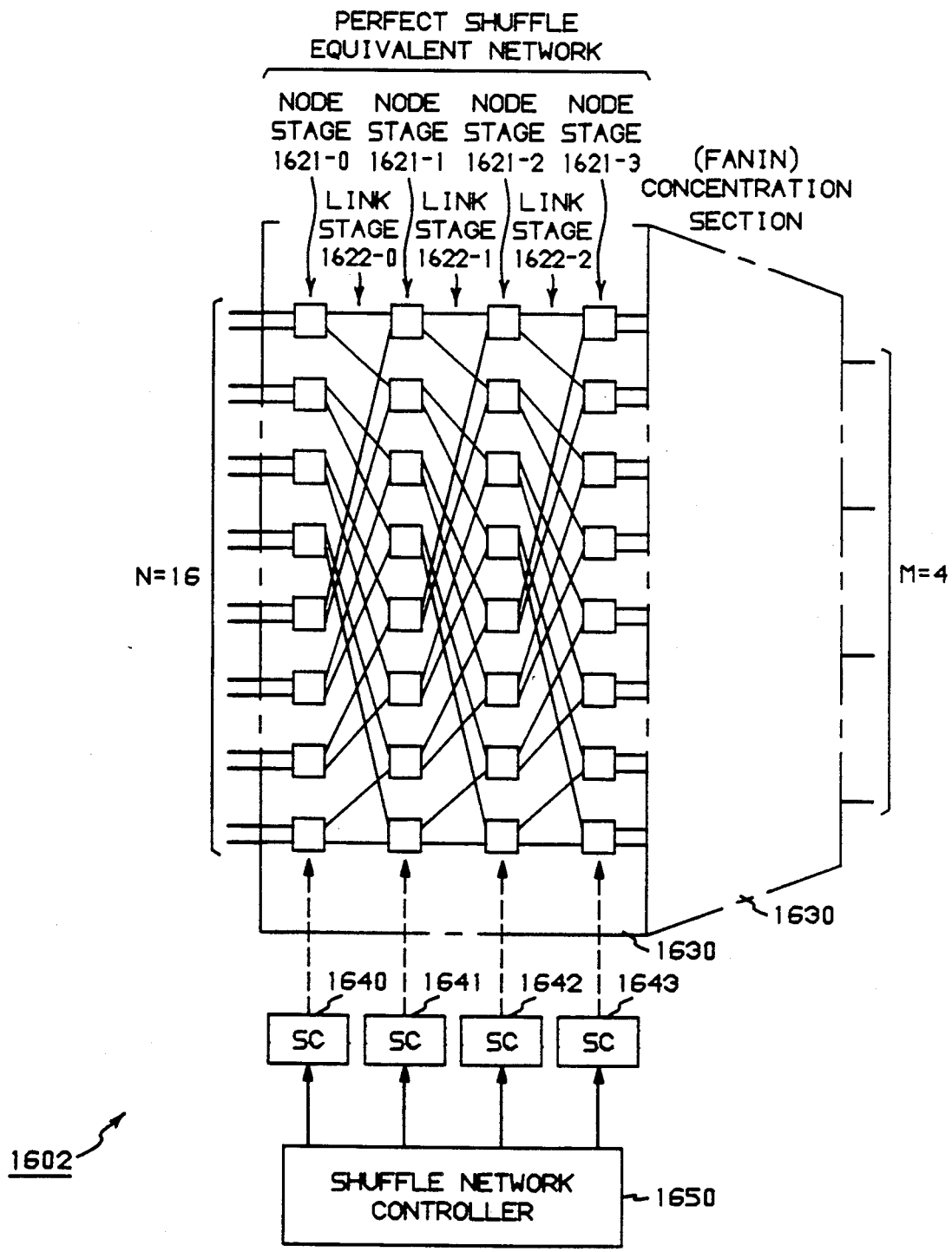
Figure 11:
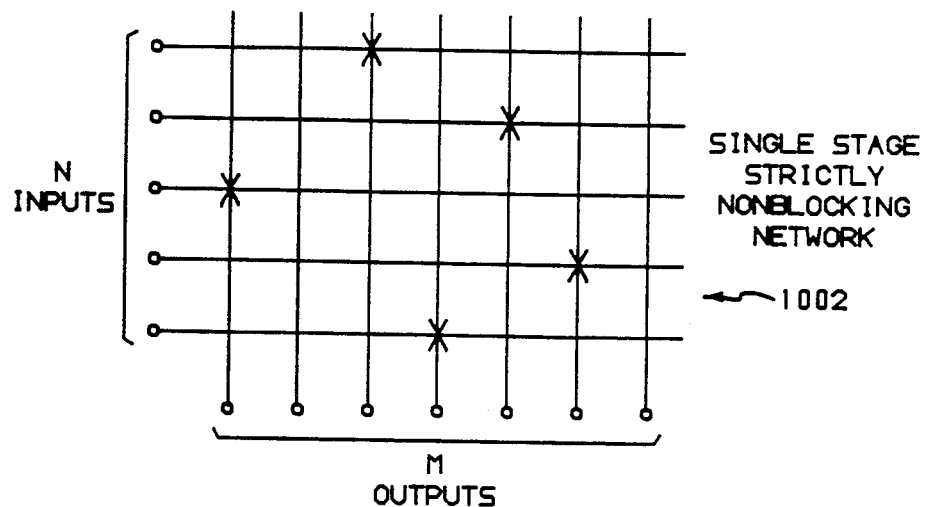
Figure 12:
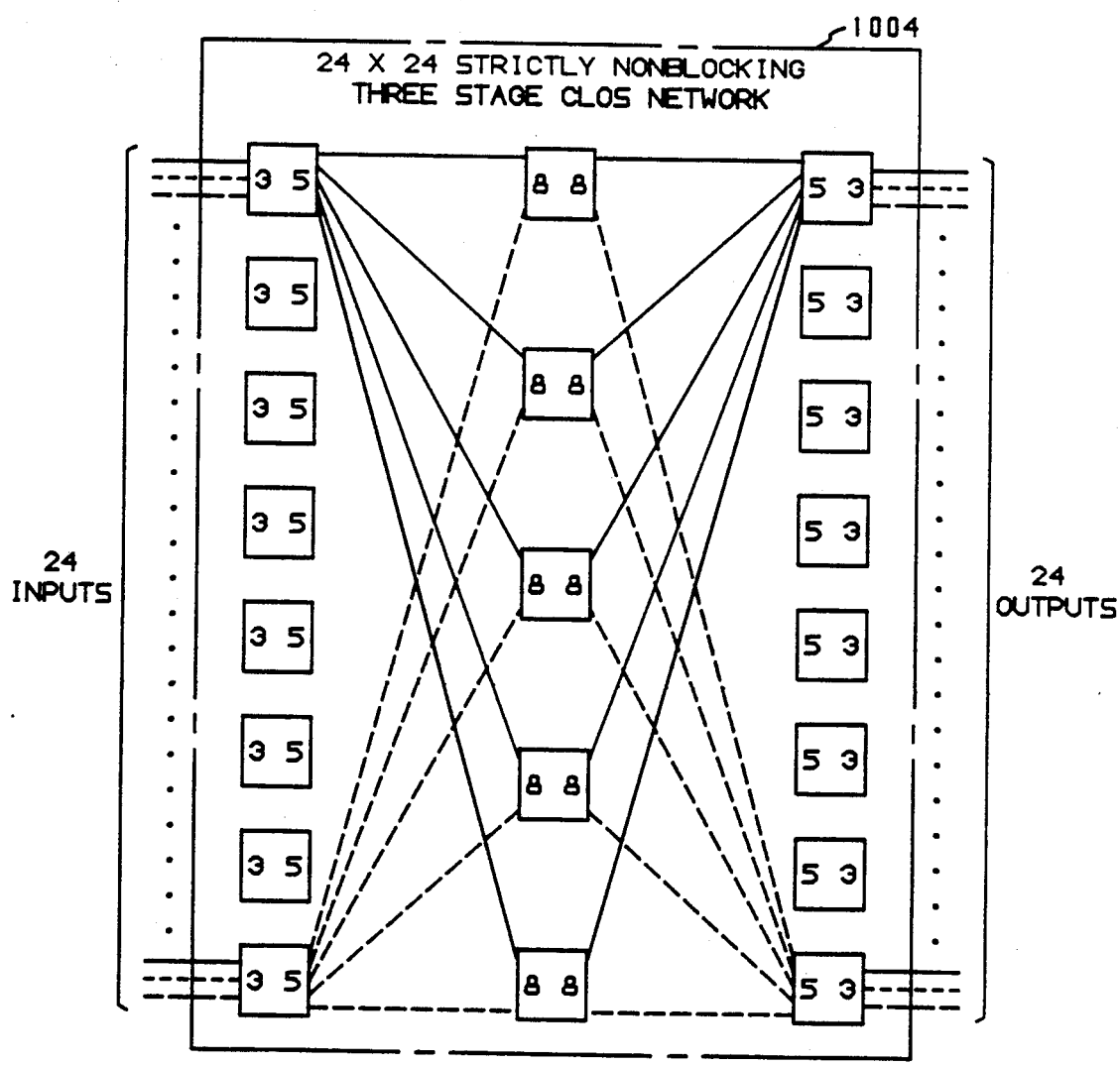
Figure 13:
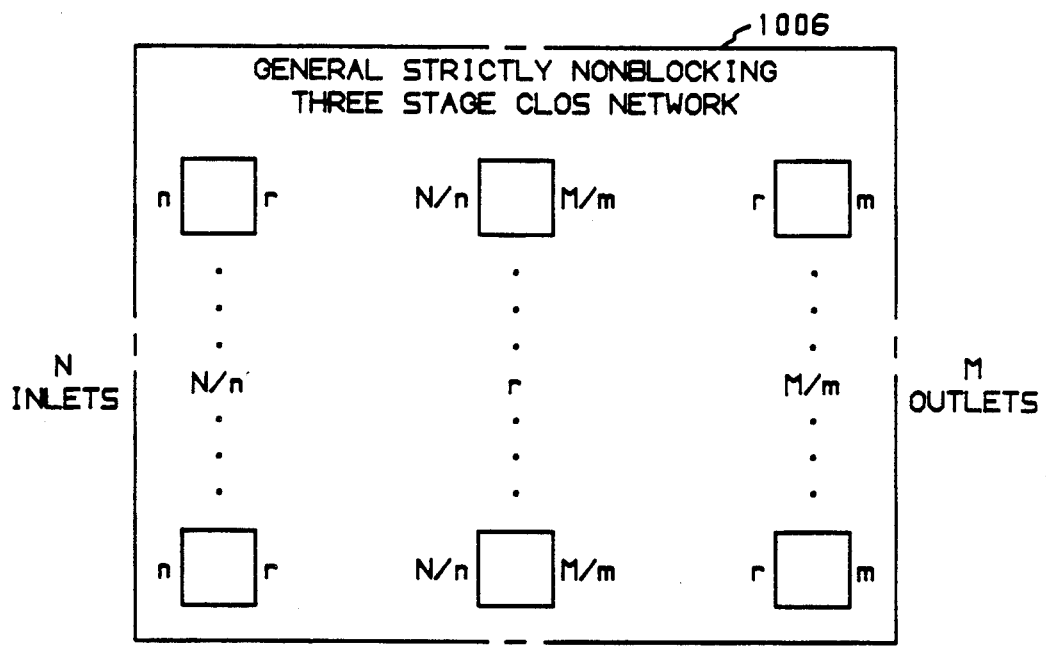
Figure 14:
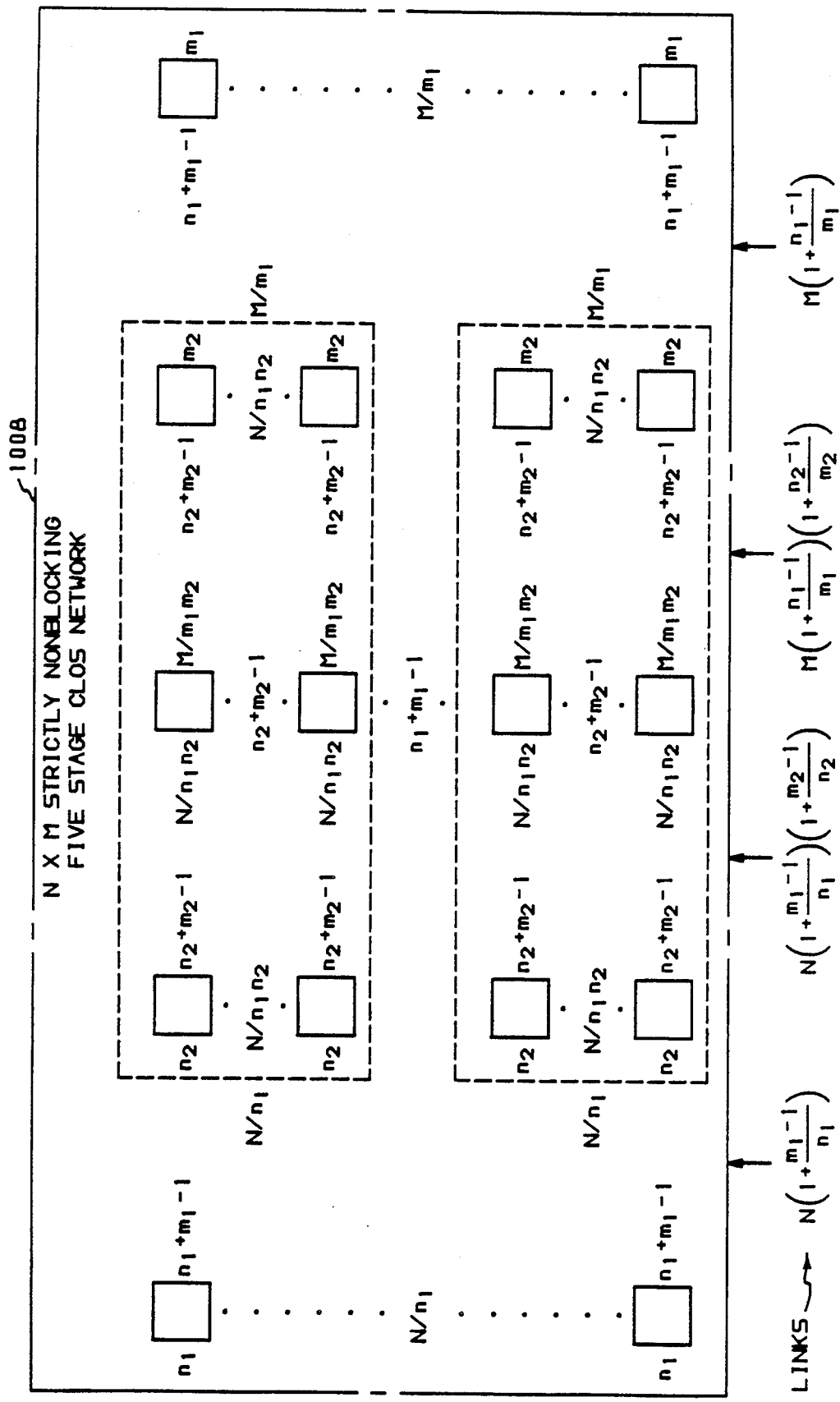
Figure 17:
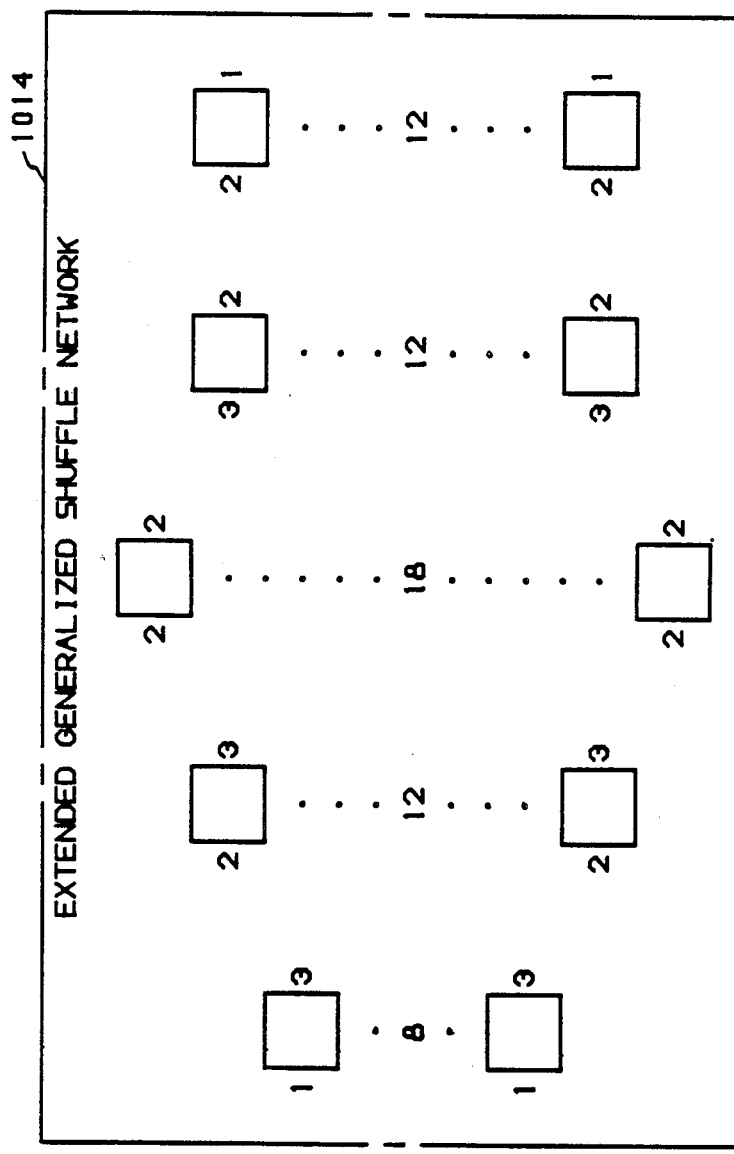
Figure 18:
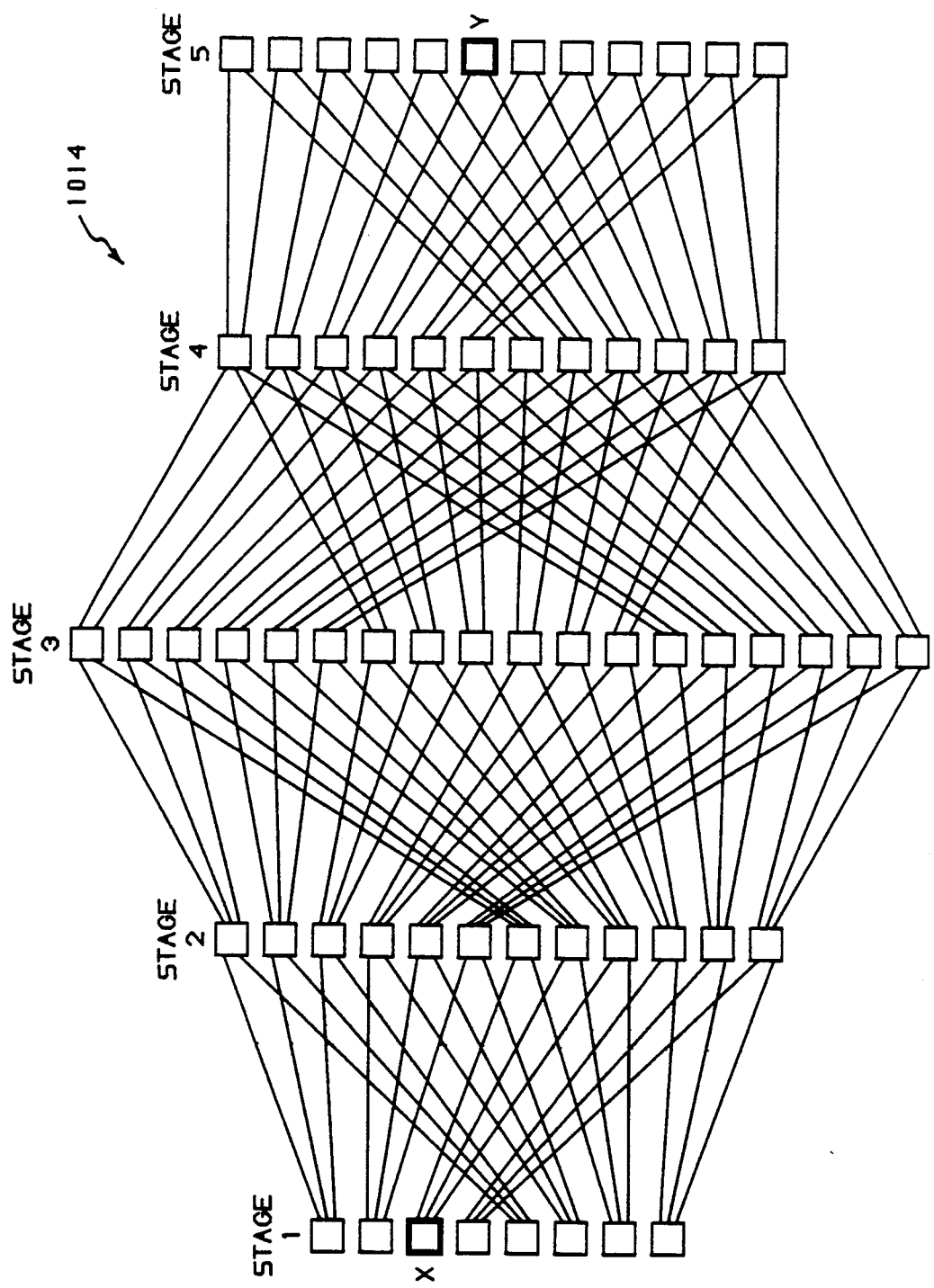
Figure 19:
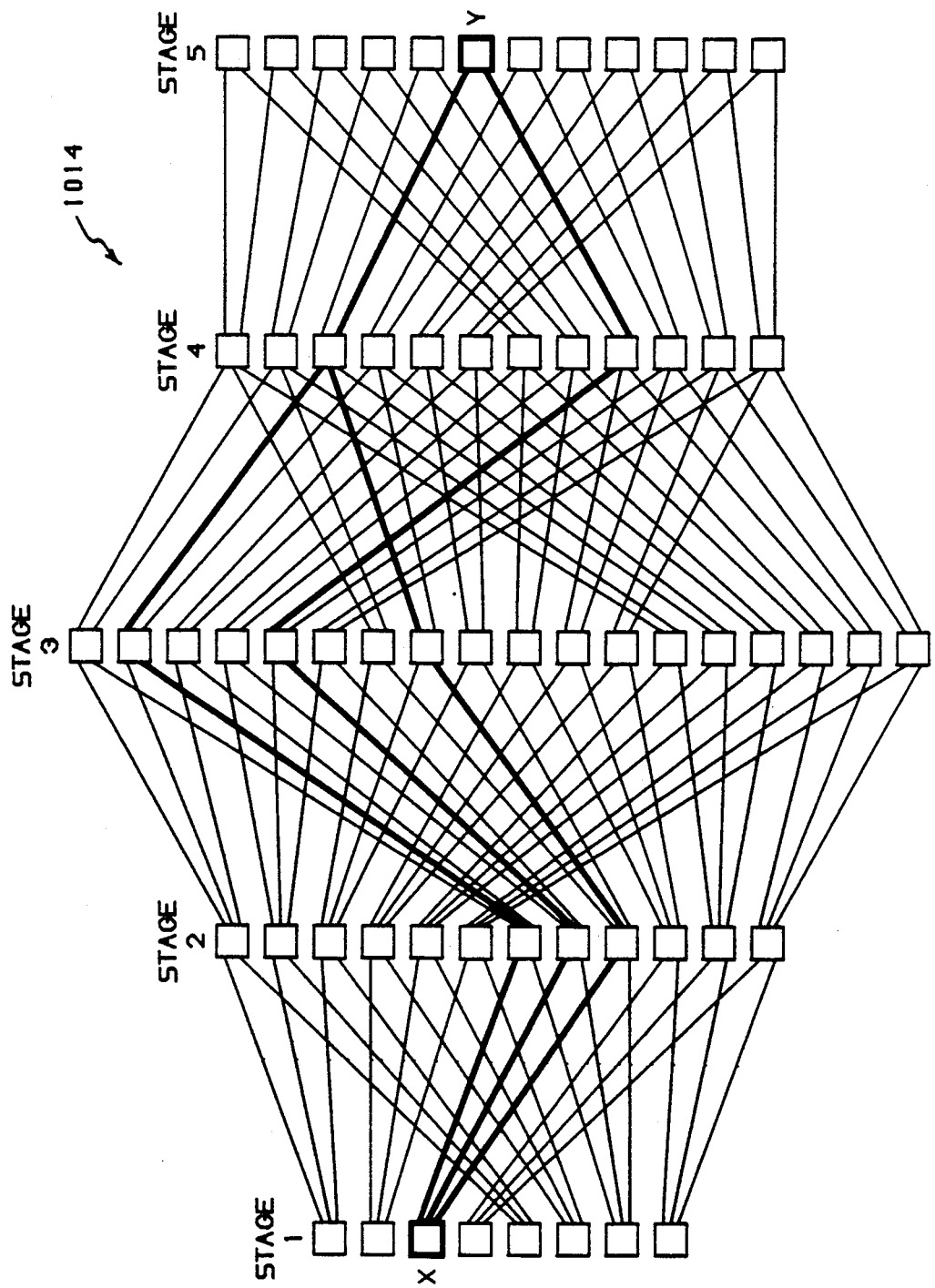
Figure 20:
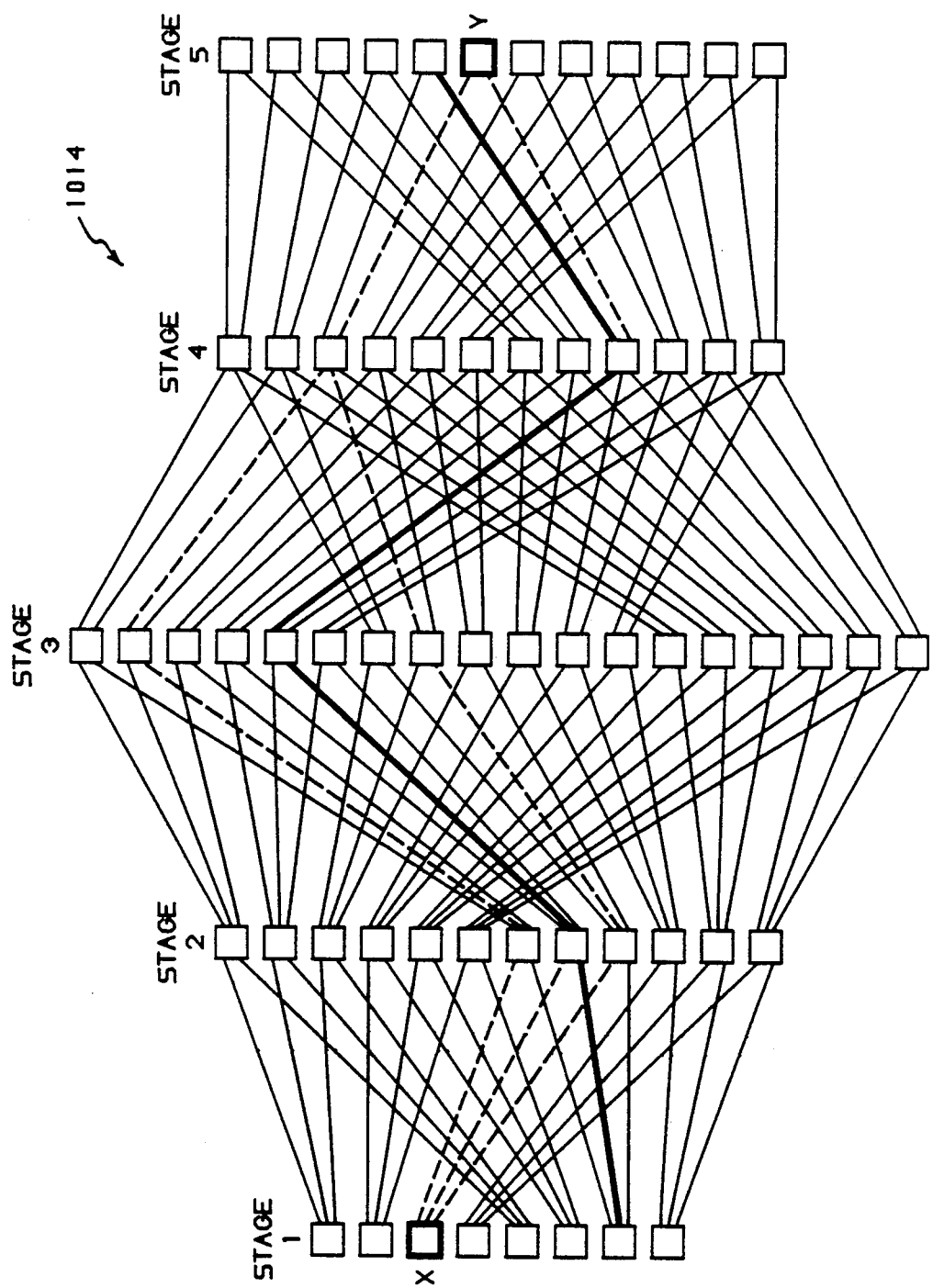
Figure 21:
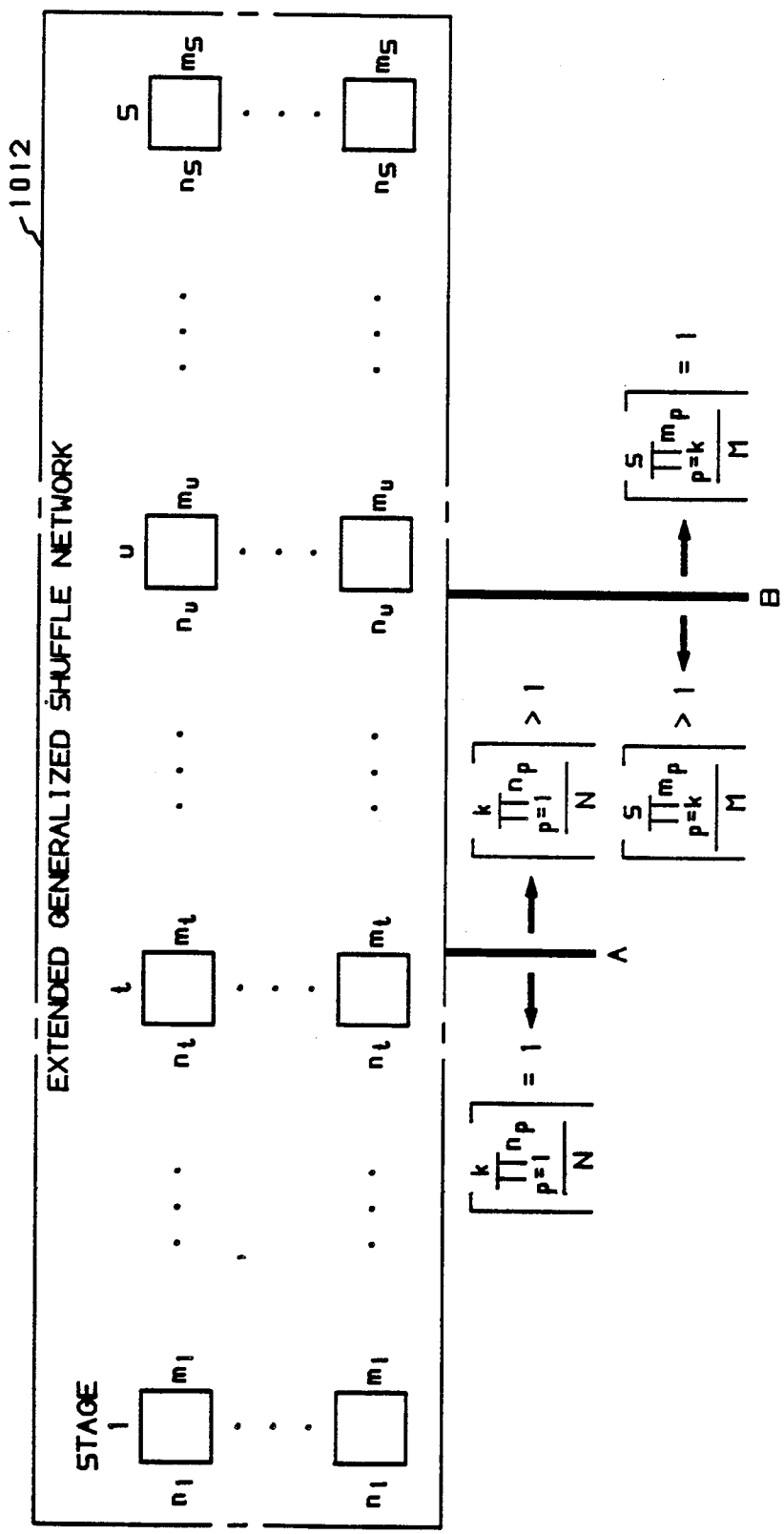
Figure 22:
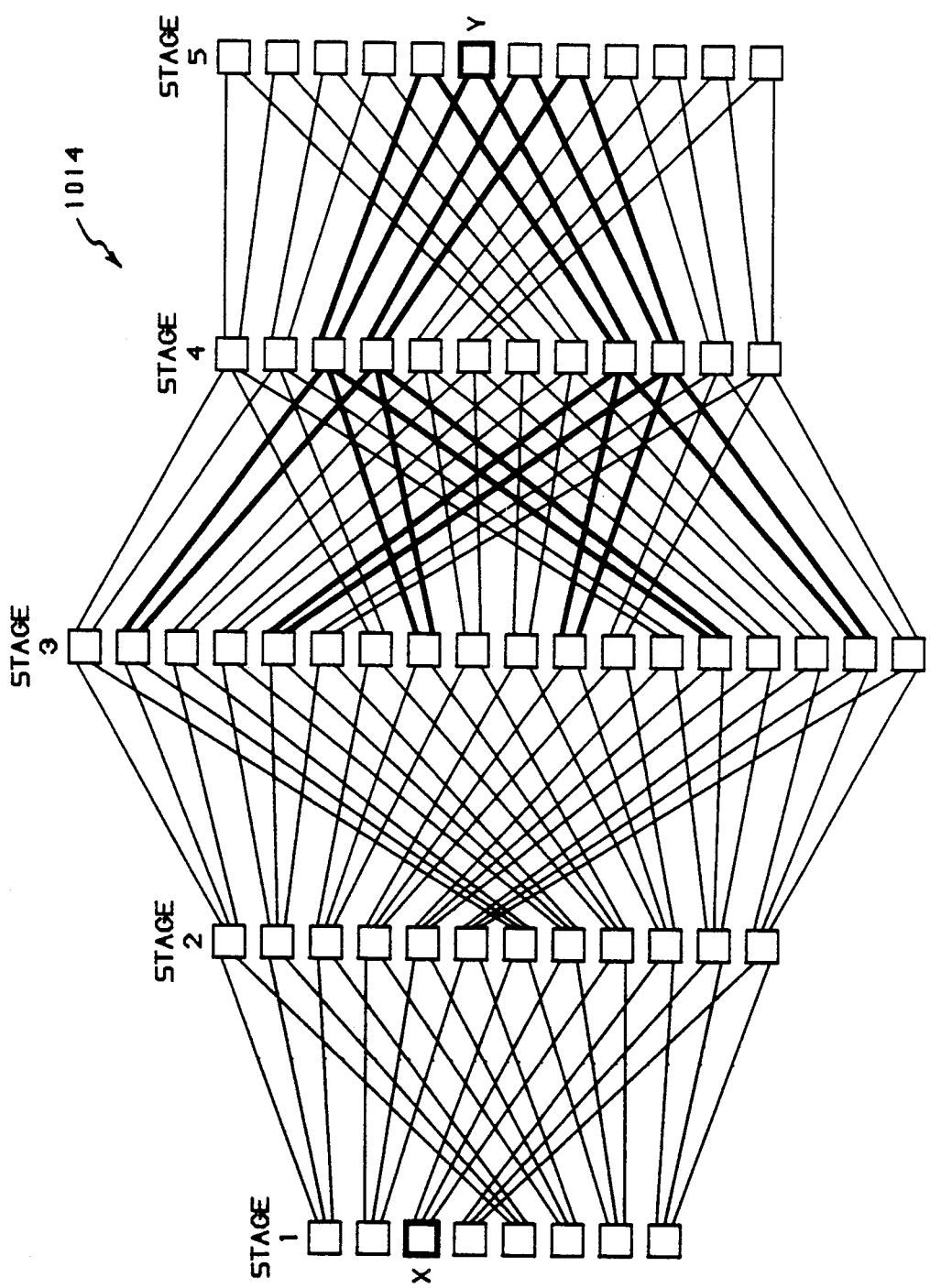
Figure 23:
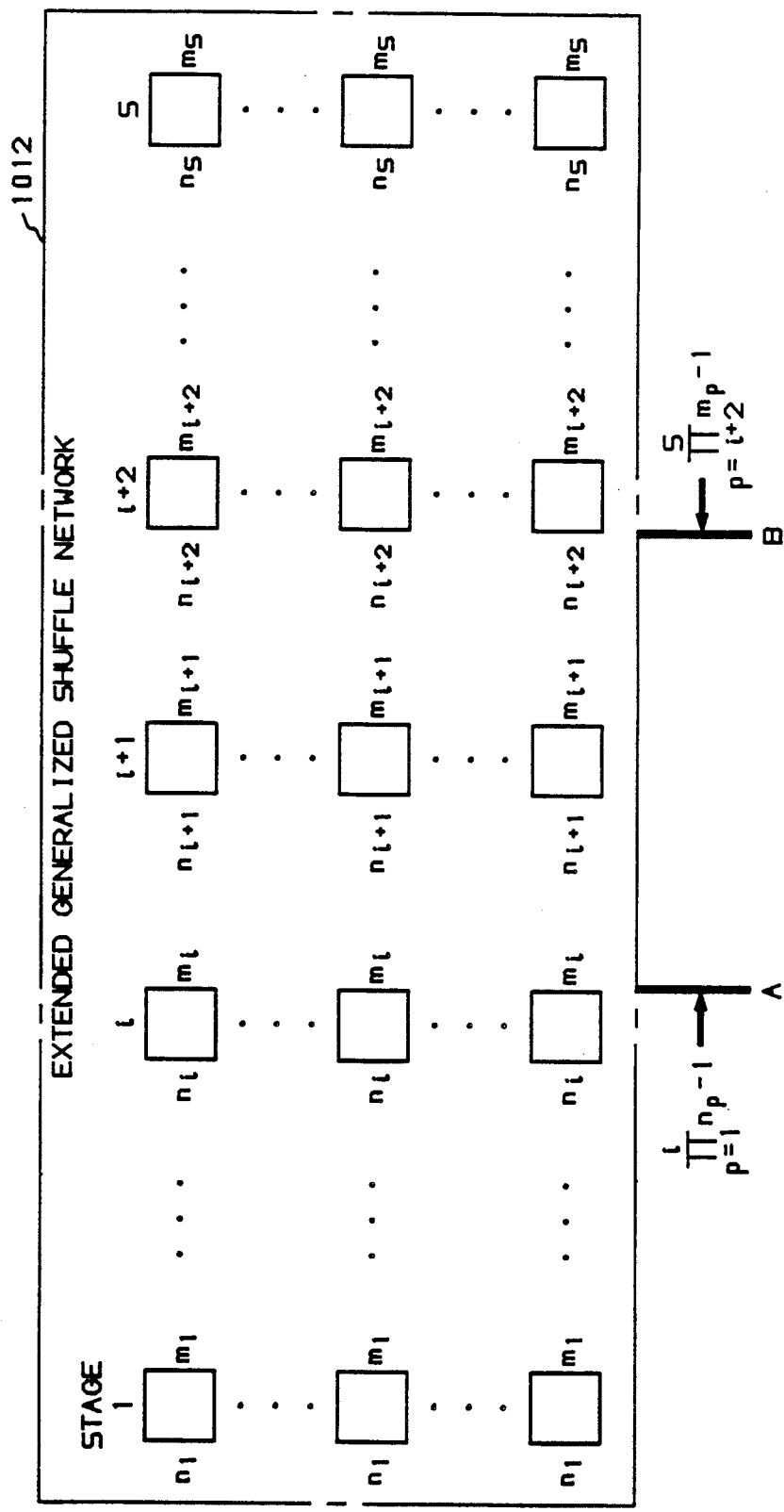
Figure 24:
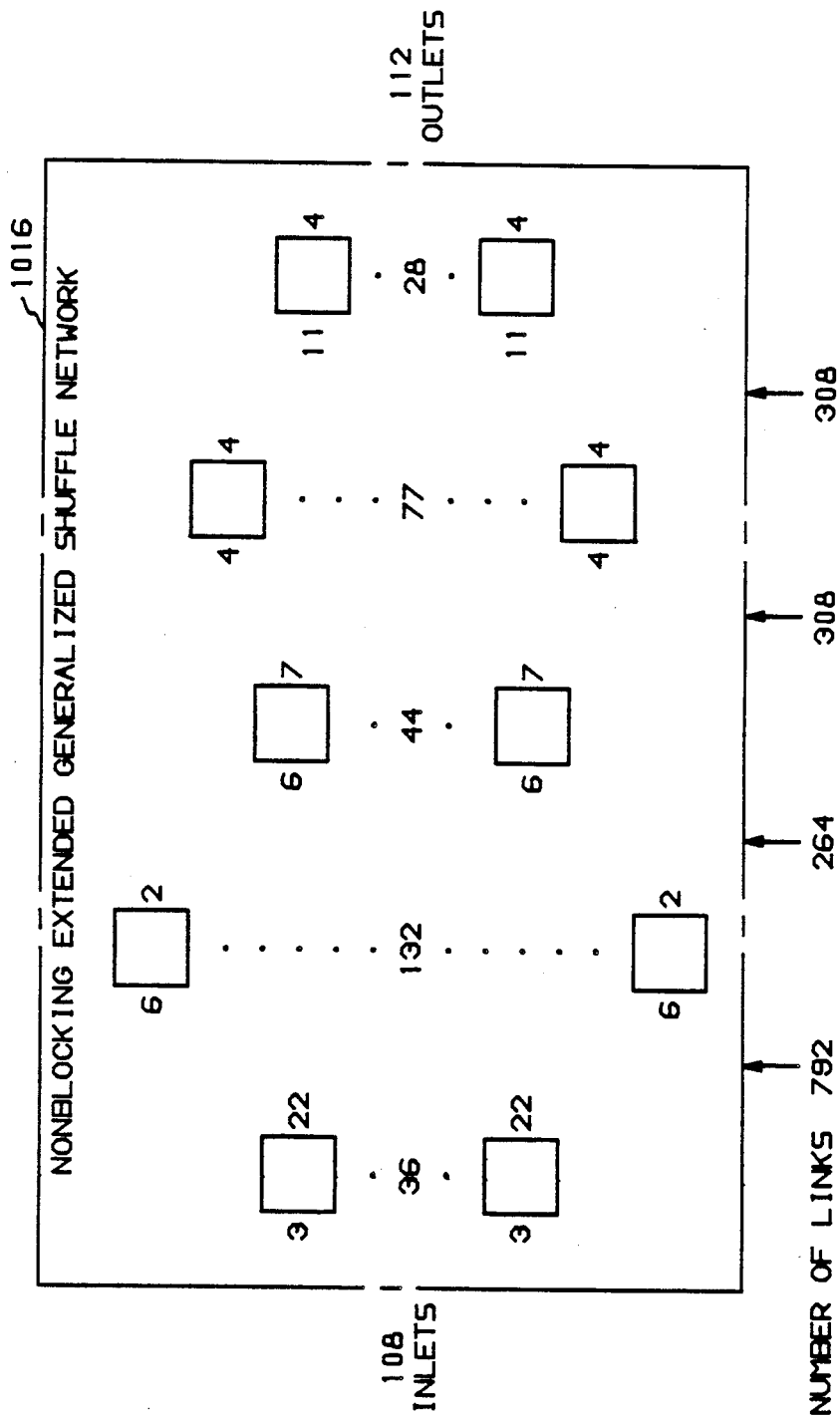
Figure 25:
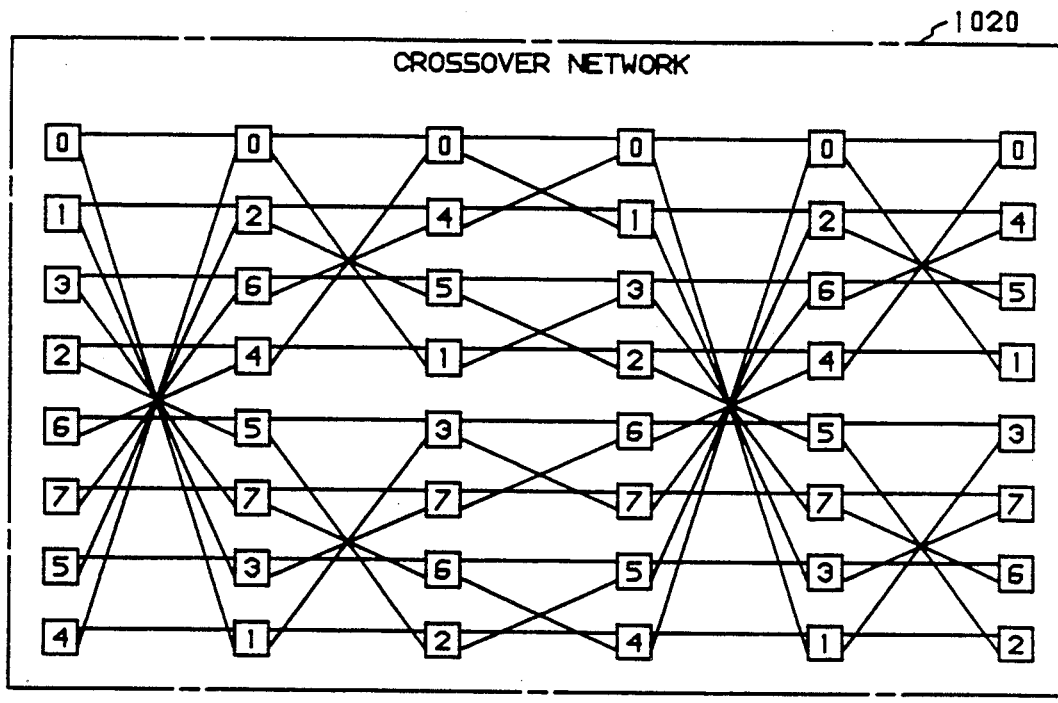
Figure 26:
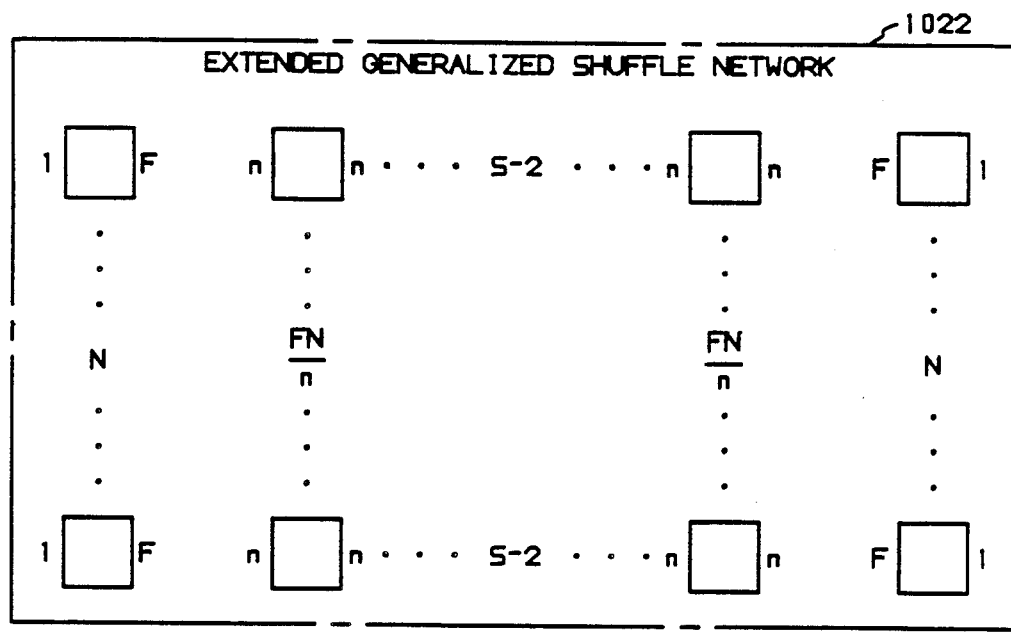
Figure 27:
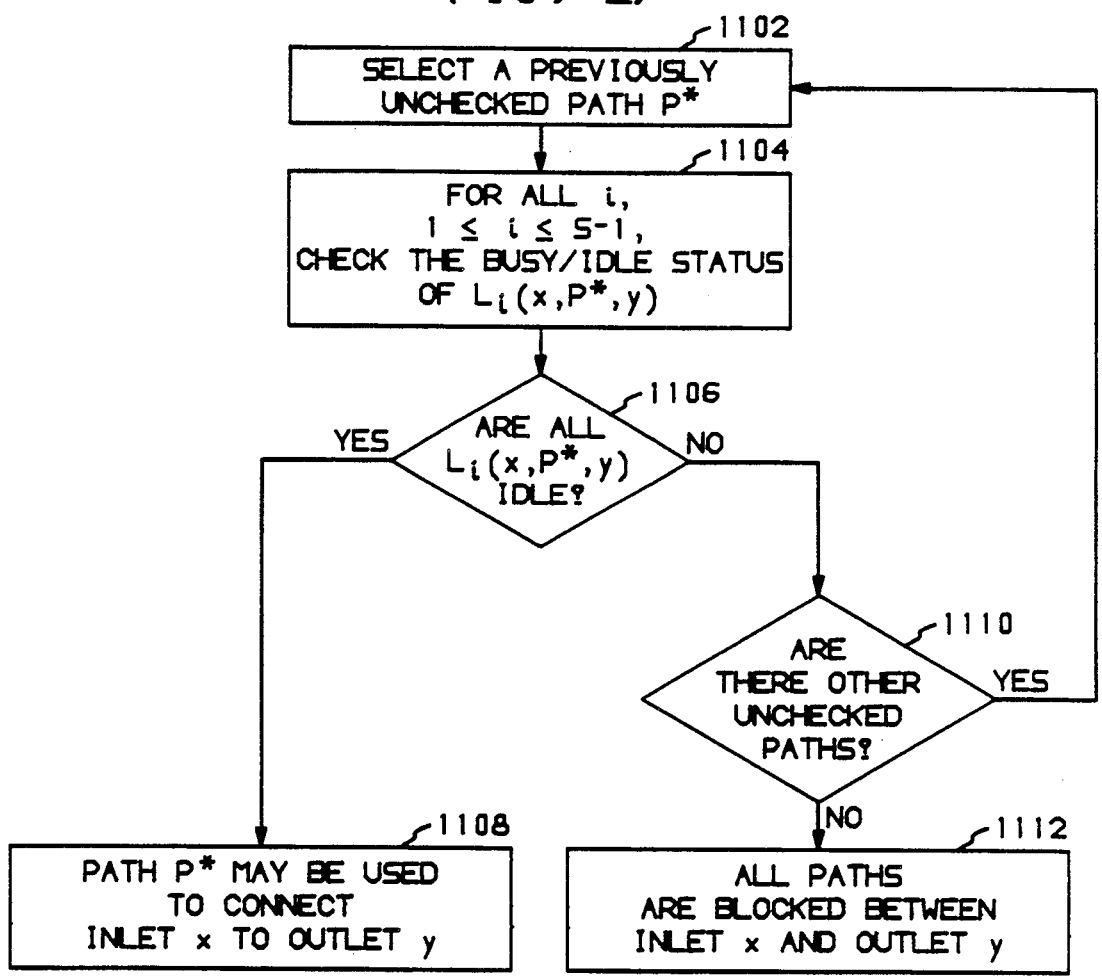
Figure 28:
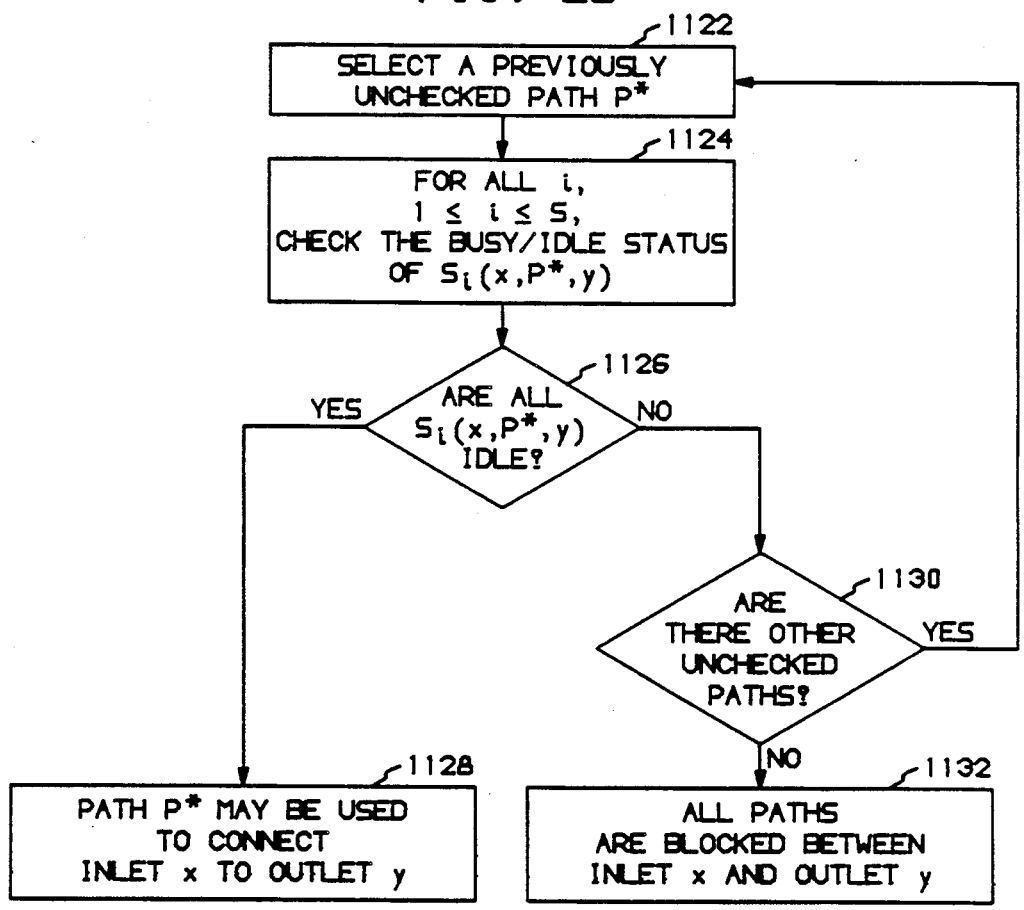
Figure 29:
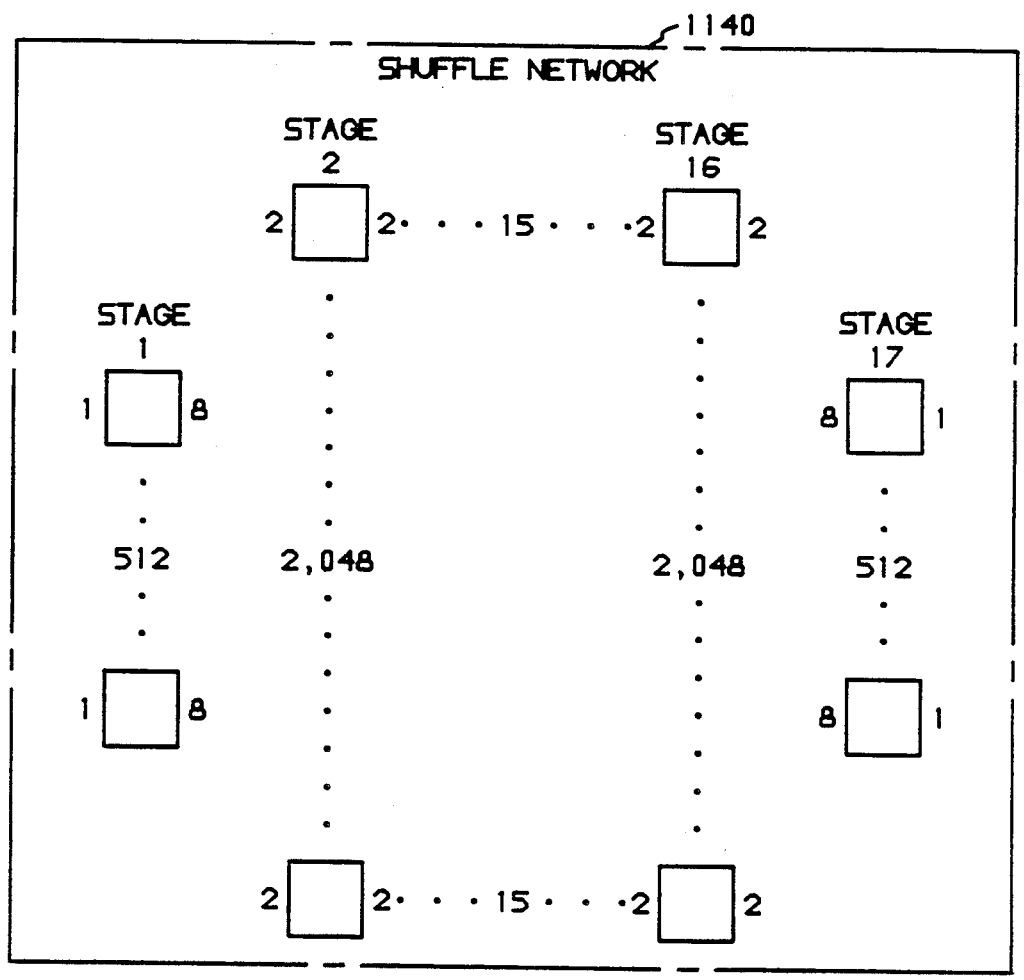
Figure 30:
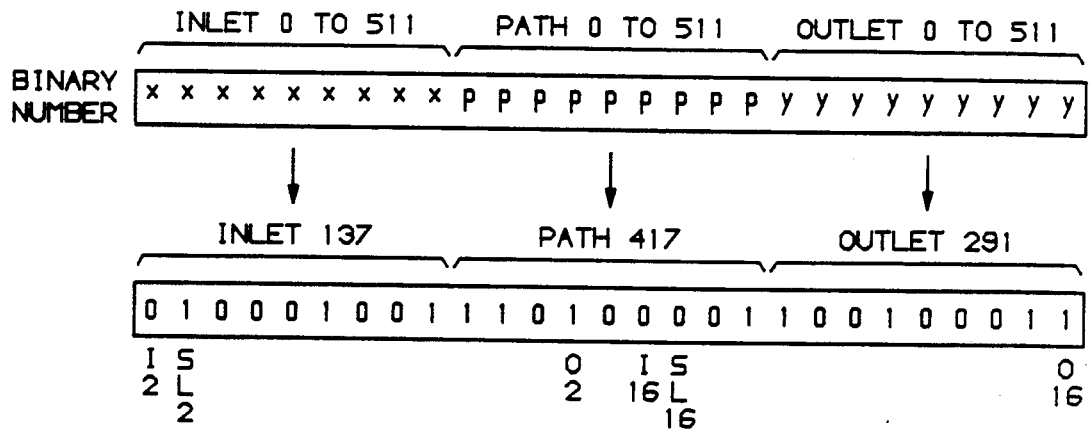
Figure 31:
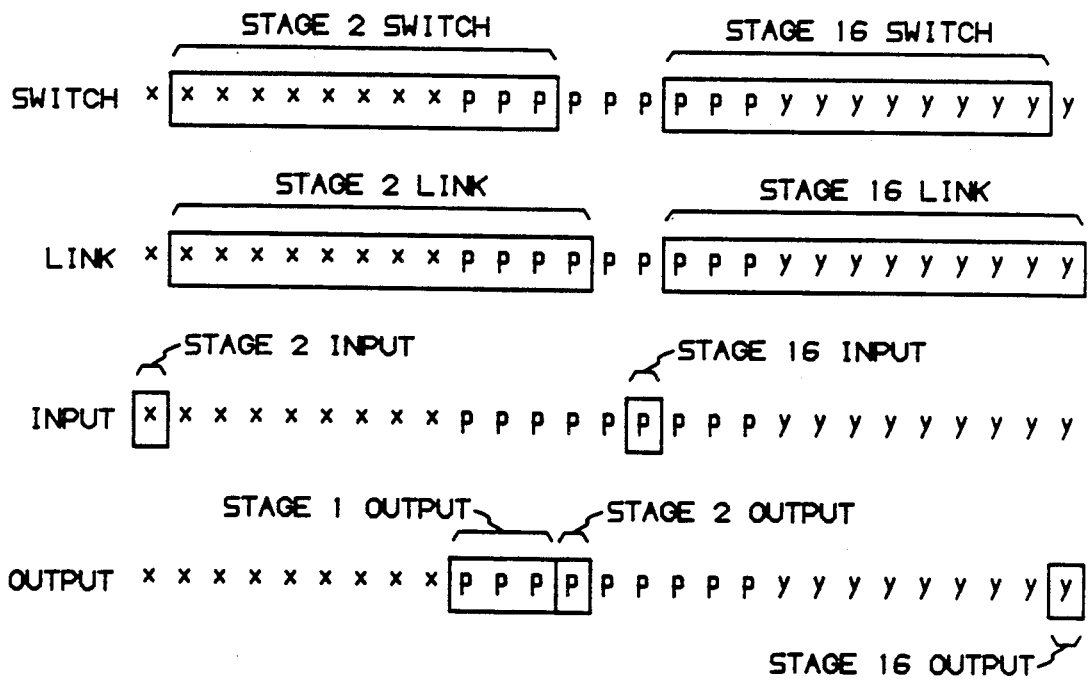
Figure 32:
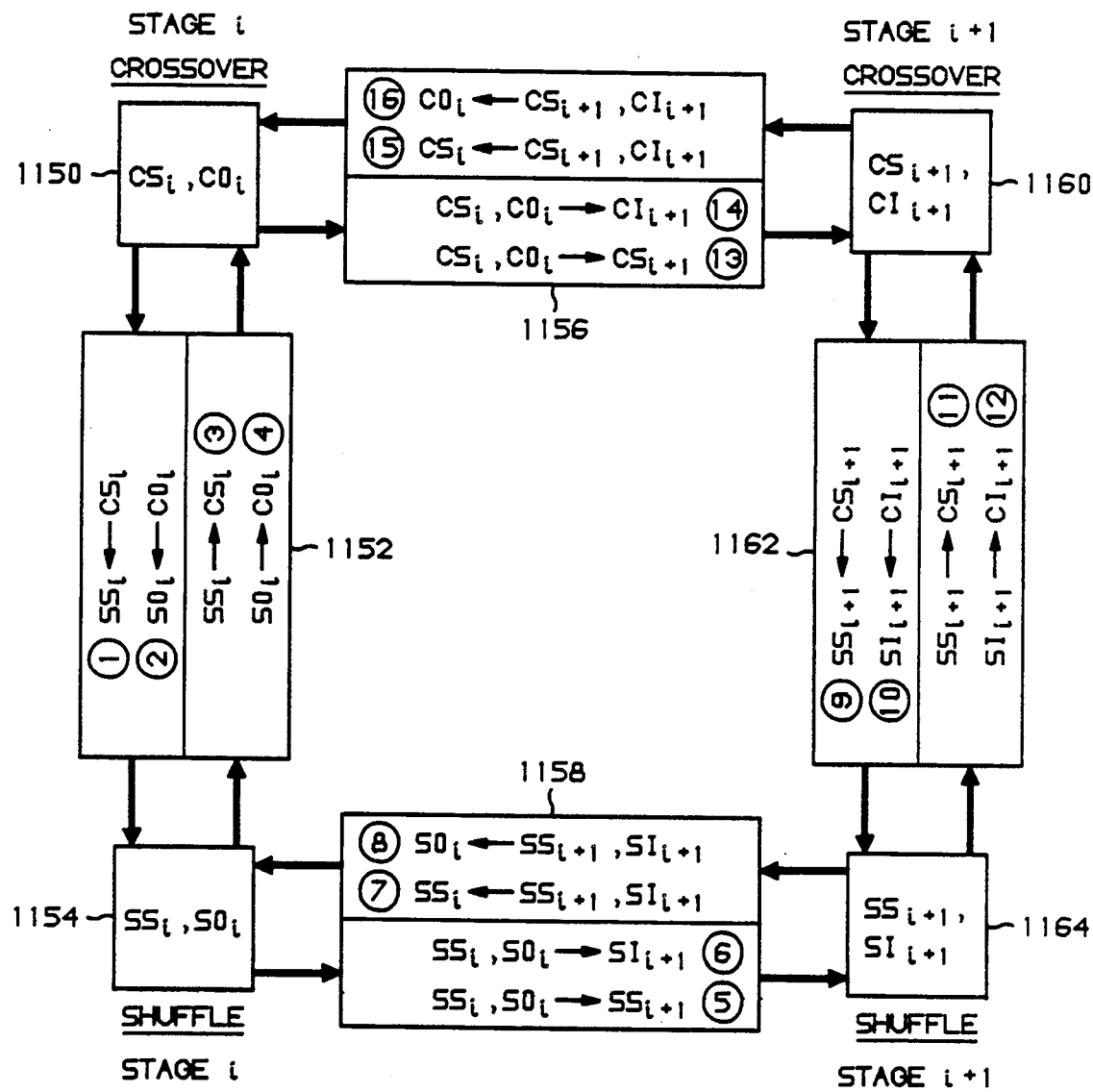
Figures 33, 34:
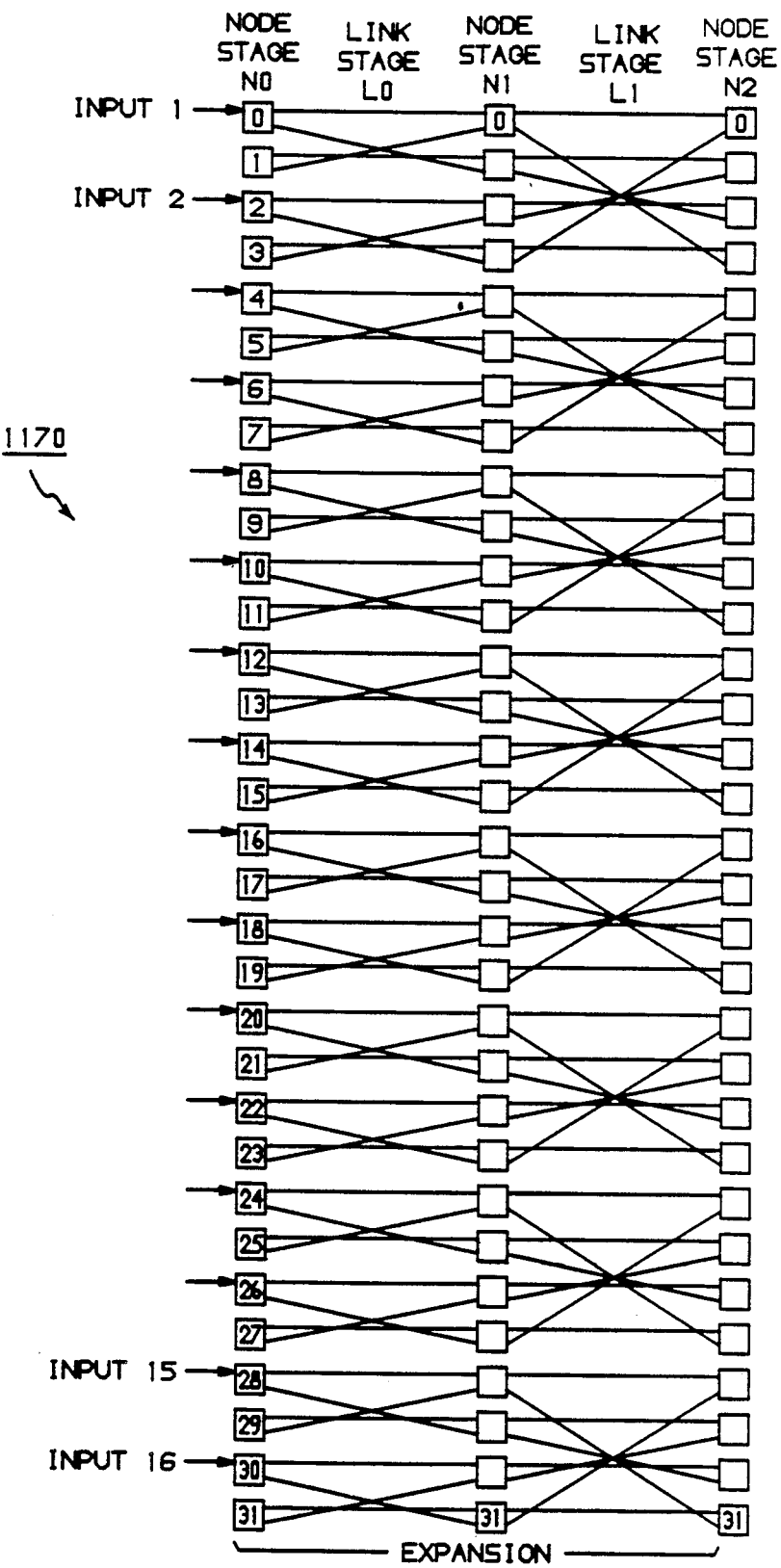
Figure 35:
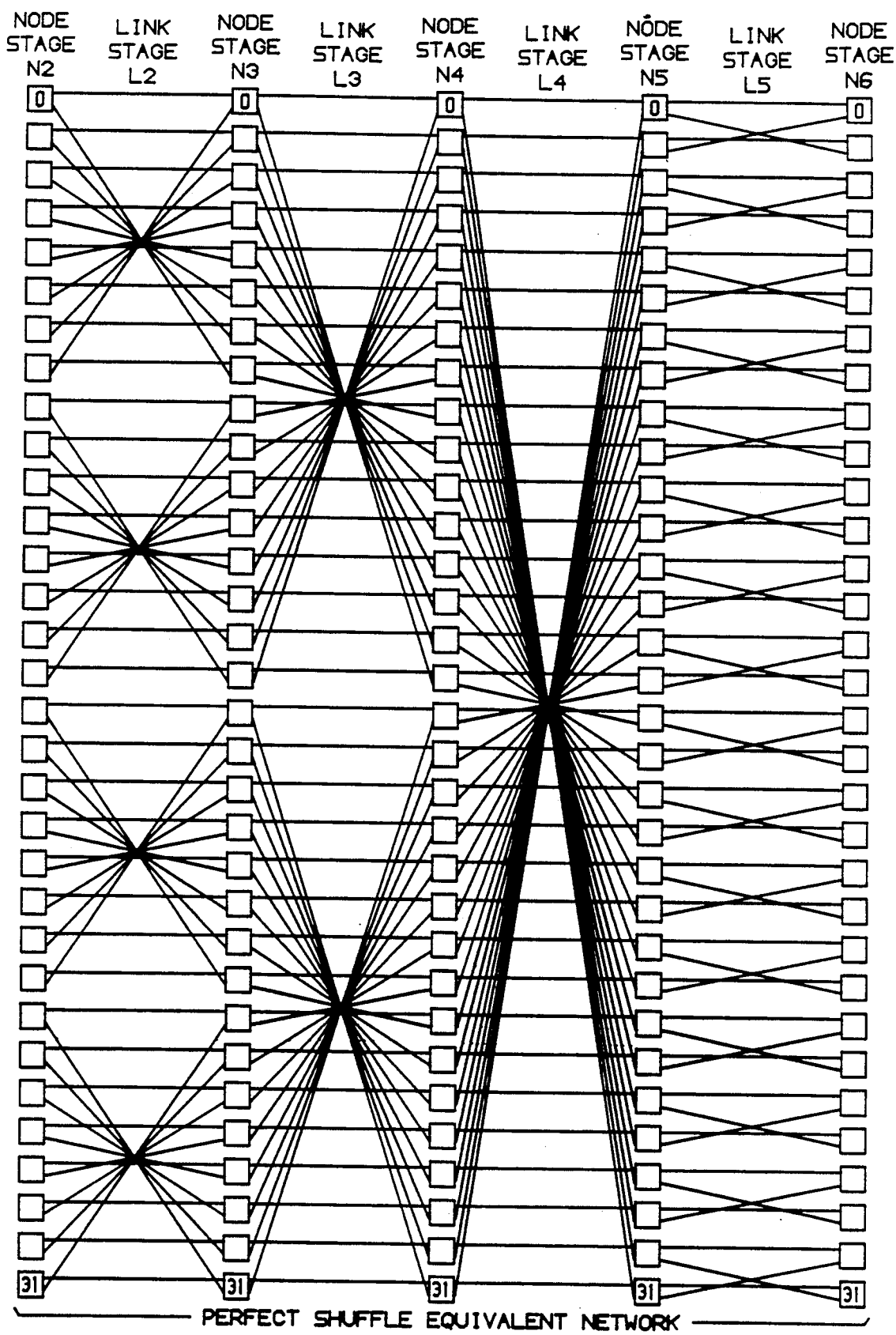
Figure 36:
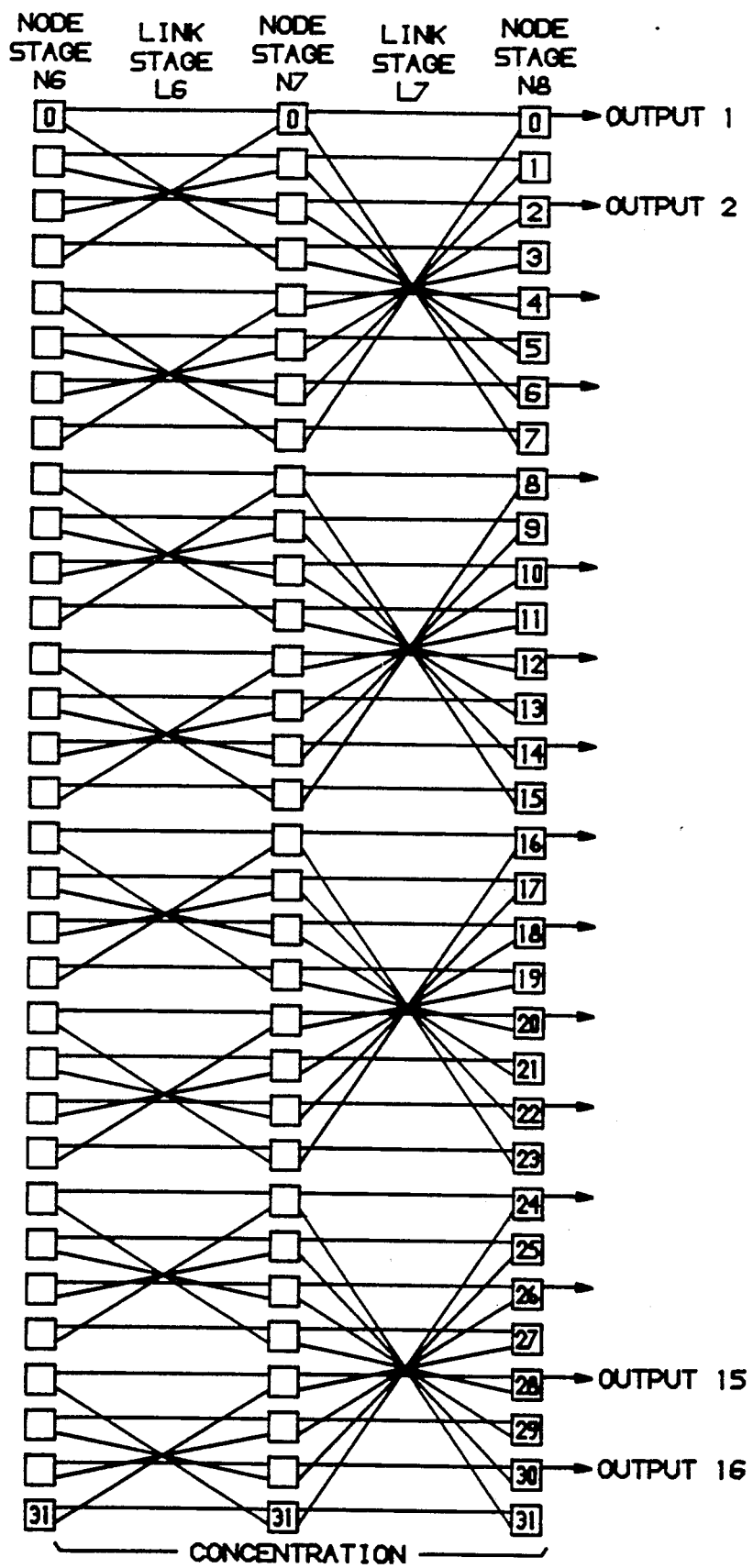
Figure 37:
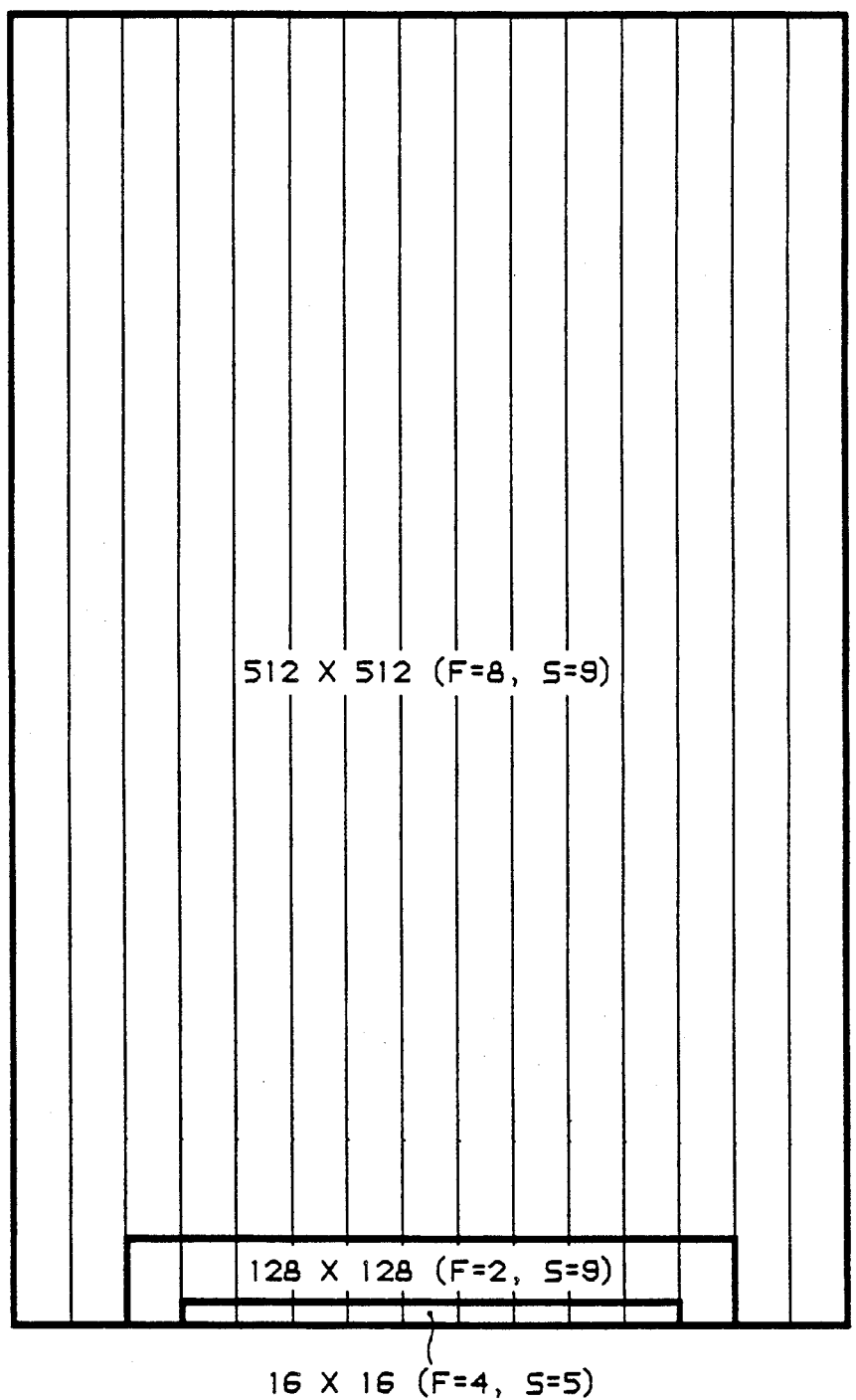
Figure 38:
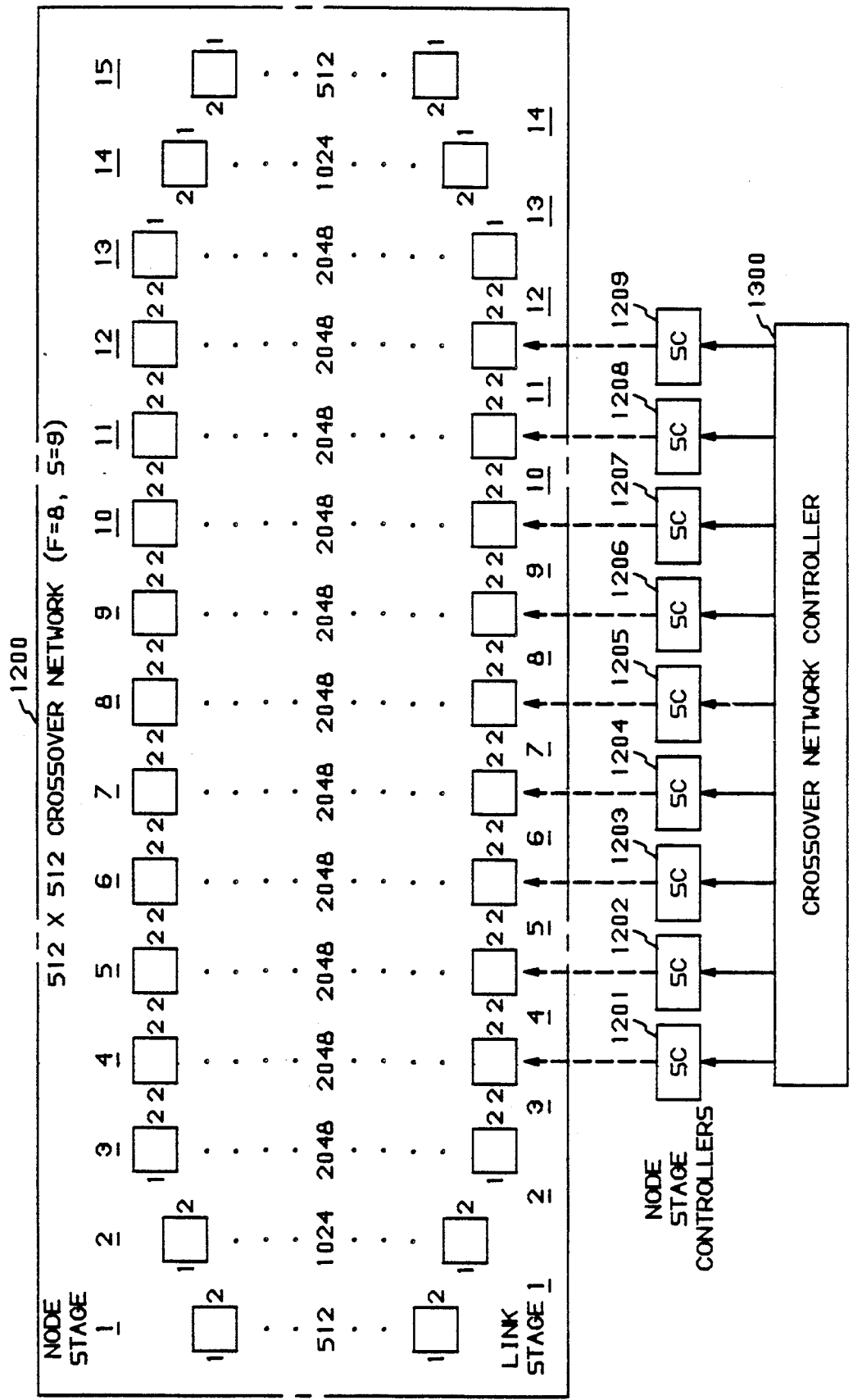
Figure 39:
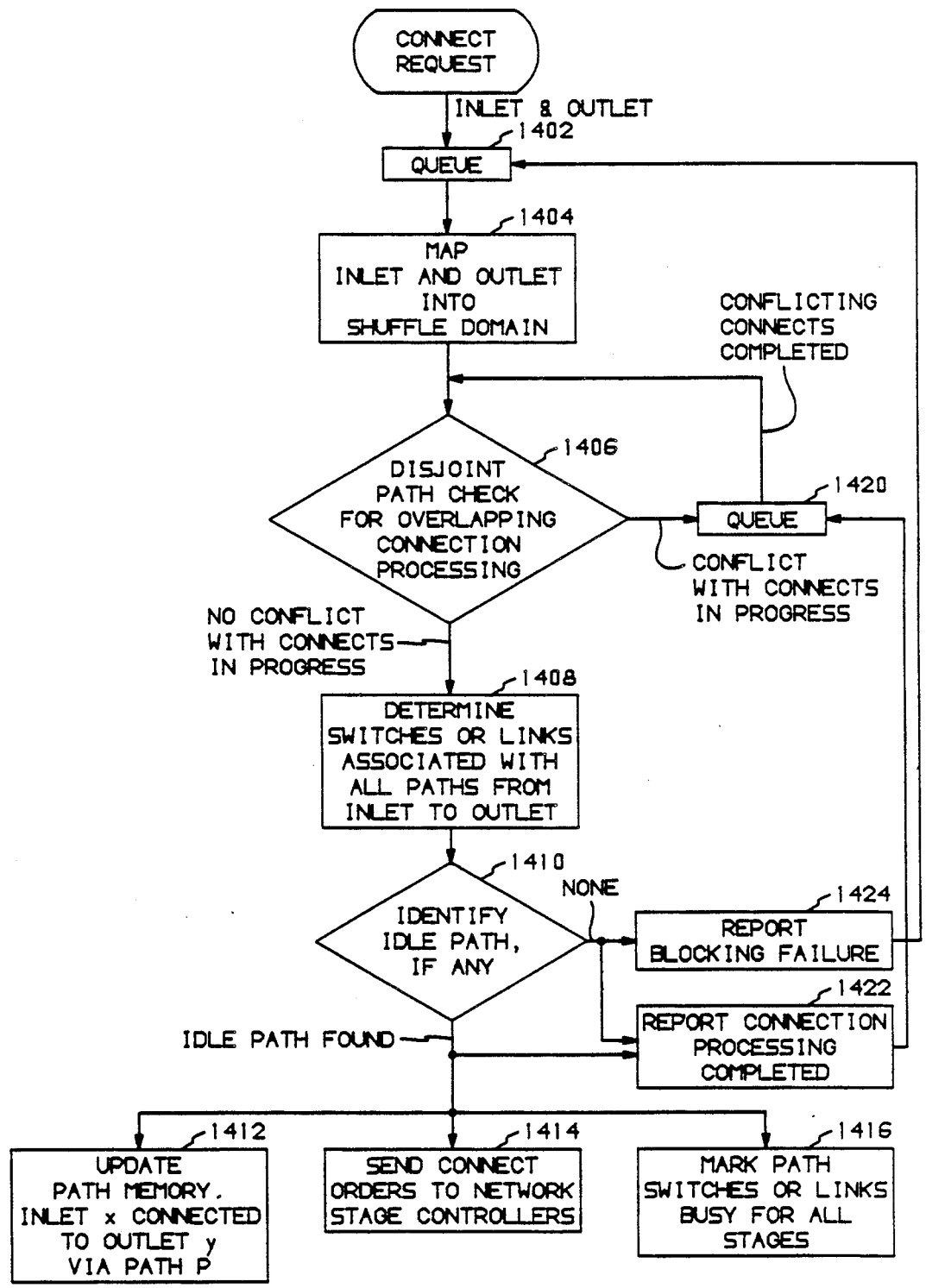
Figure 40:
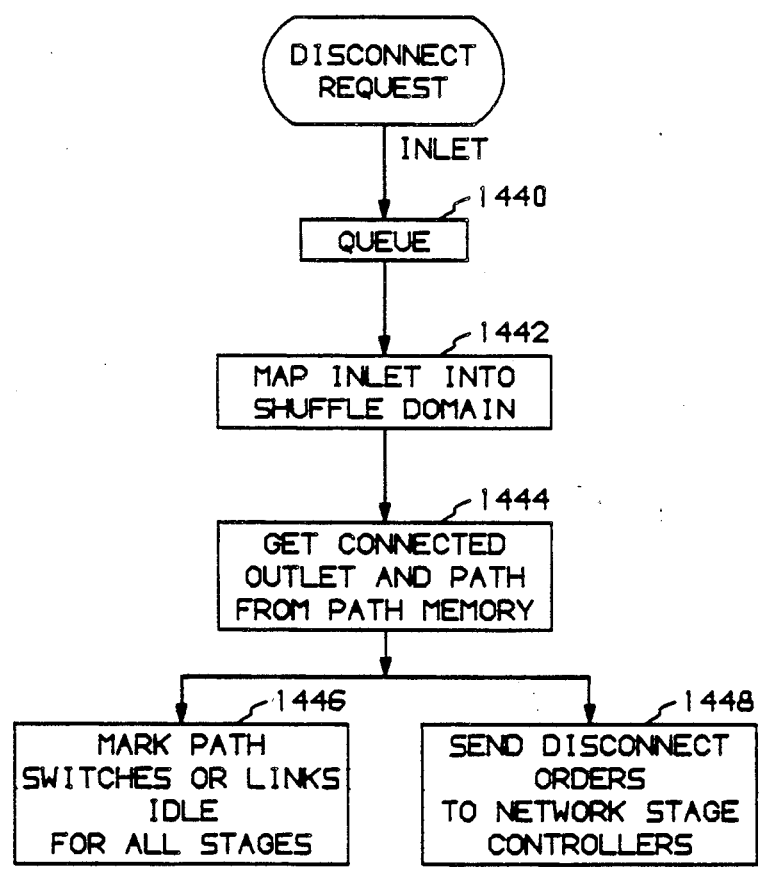
Figures 41, 42:
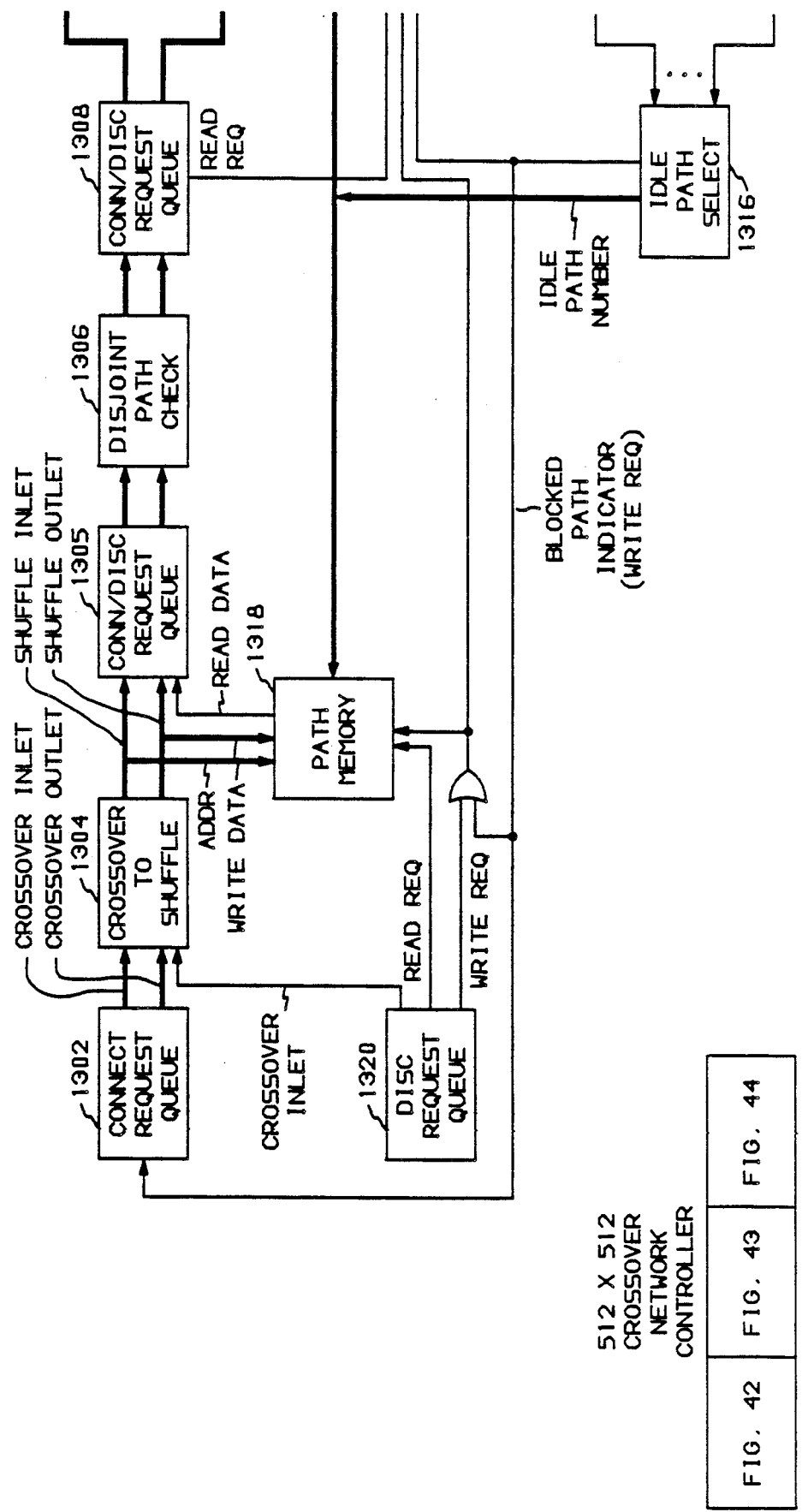
Figure 43:
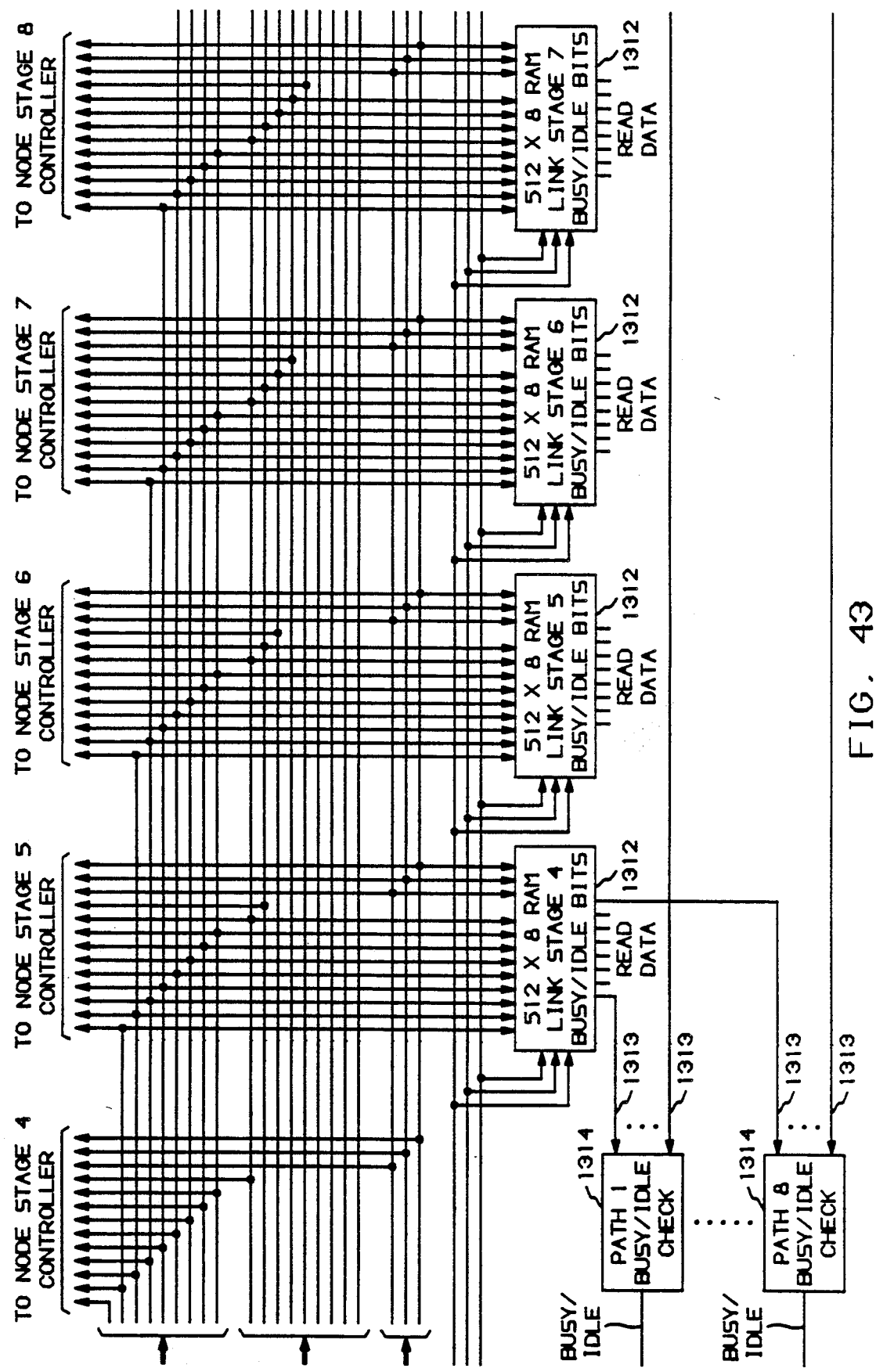
Figure 44:
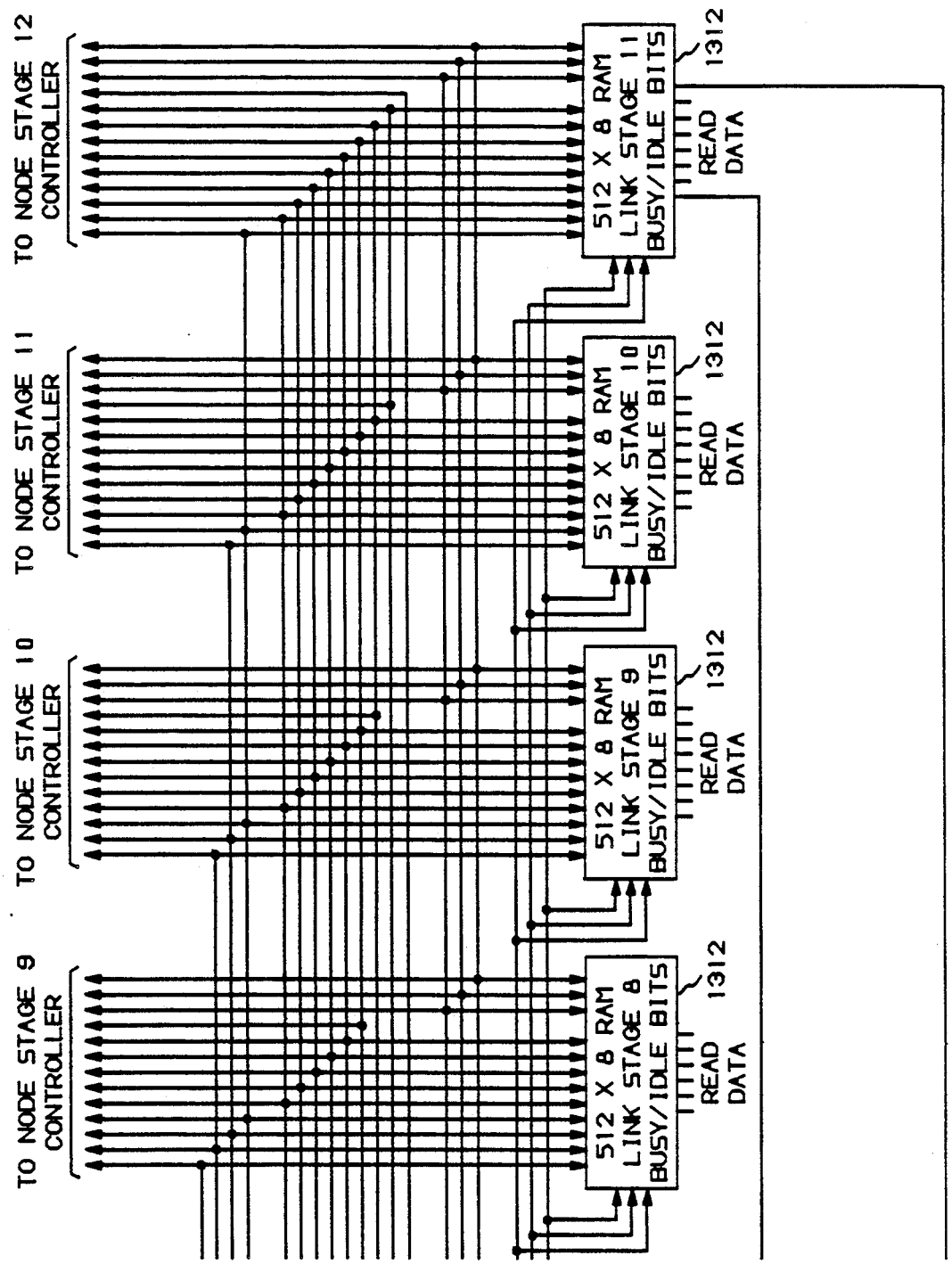
Figure 45:
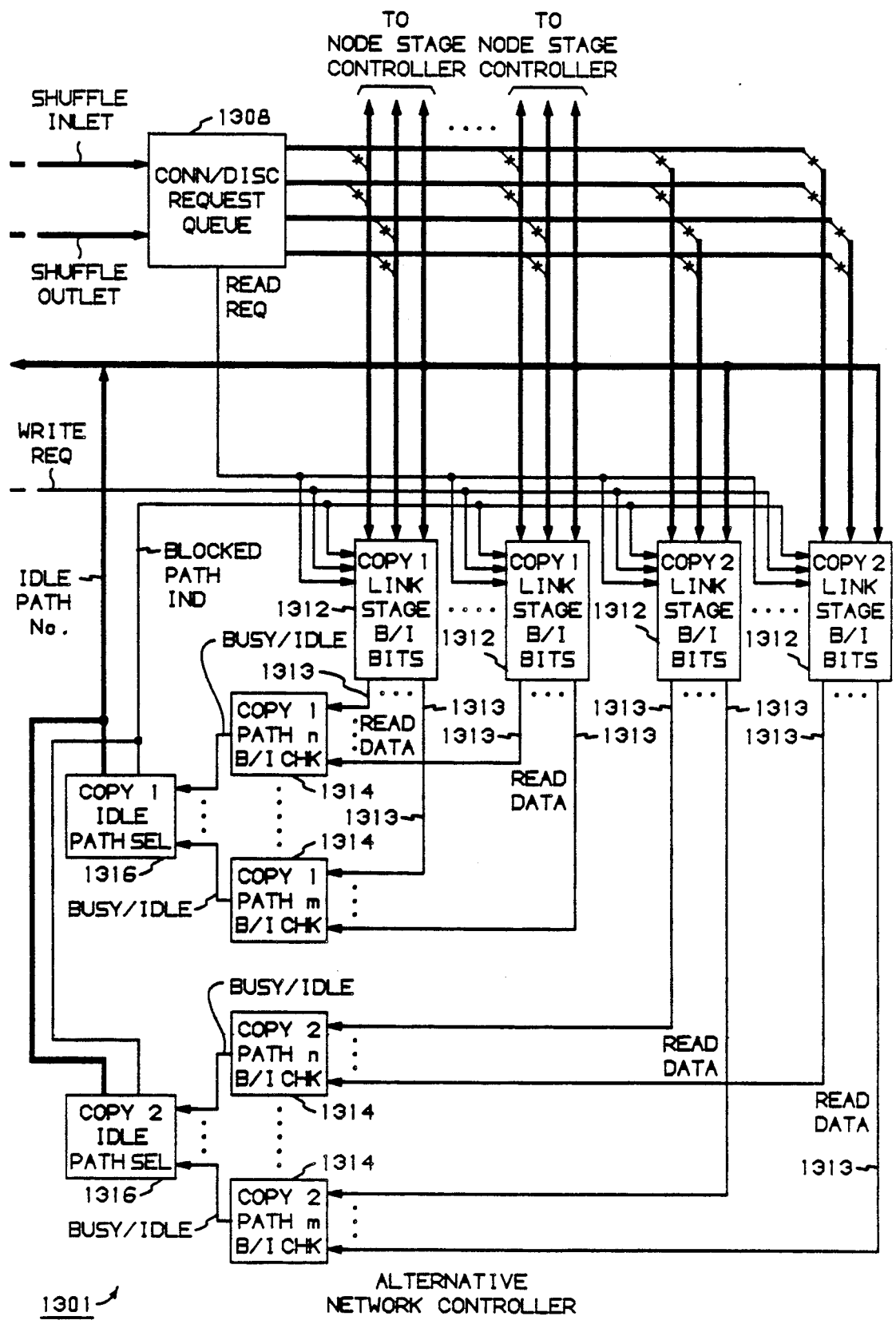
Figure 46:
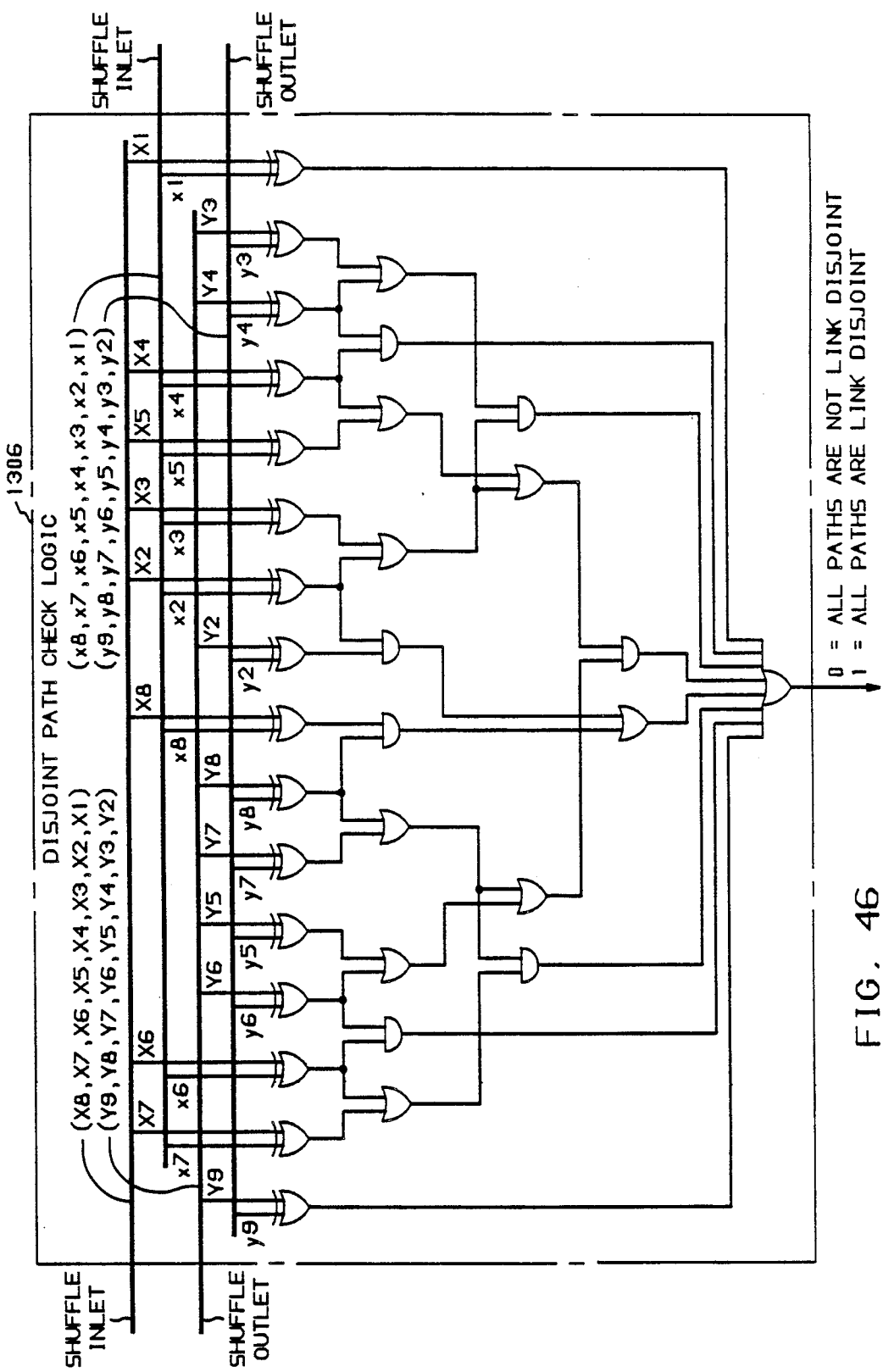
Figures 47, 48, 49:
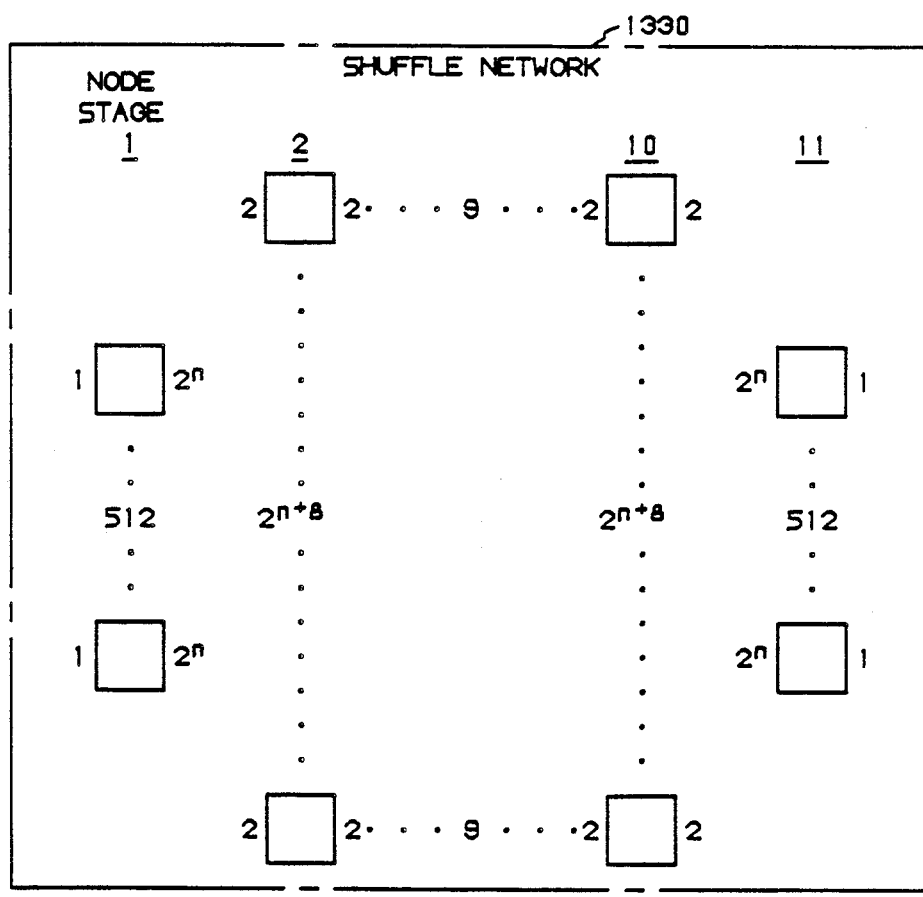
Figure 51:
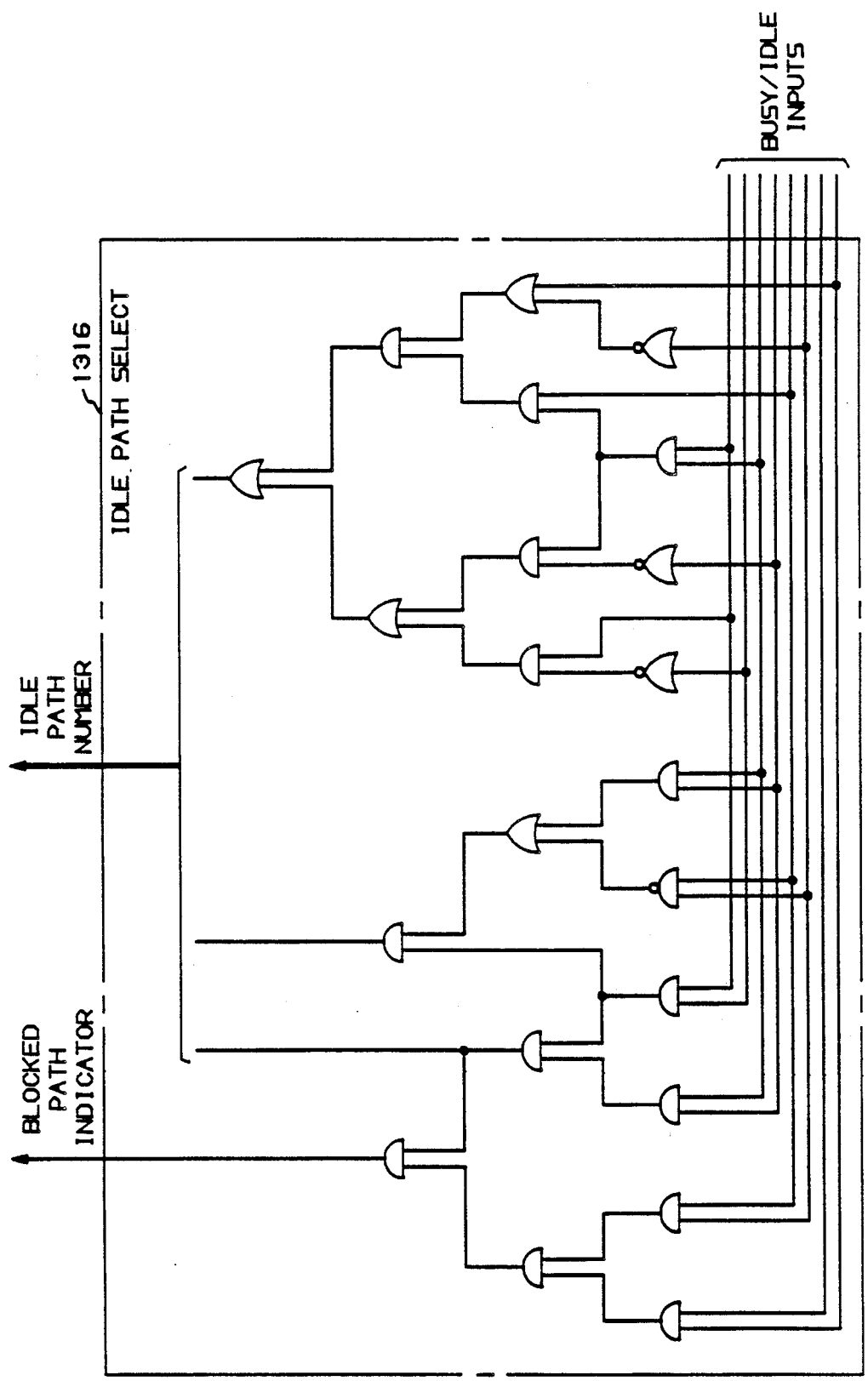

FIGS. 3, 4, and 5 are diagrams of the network topology of FIG. 2 but with different expansion and concentration implementations;

FIGS. 6, 7, and 8 are diagrams of a full capacity node, a capacity one node with selectivity, and a capacity one node without selectivity, respectively, for use in the system of FIG. 2;

FIG. 9 is a diagram of a network topology similar to that of FIG. 2 but without concentration;

FIG. 10 is a diagram of a network topology similar to that of FIG. 2 but without expansion;

FIG. 11 is a diagram of a single stage strictly nonblocking network;

FIG. 12 is a diagram of a strictly nonblocking three stage Clos network;

FIG. 13 is a diagram of a general sticky nonblocking three stage Clos network;

FIG. 14 is a diagram of a strictly nonblocking five stage Clos network;

FIG. 15 is a diagram of a multistage interconnection network (MIN);

FIG. 16 is a diagram of a particular type of MIN, referred to herein as an extended generalized shuffle (EGS) network;

FIGS. 17 and 18 are diagrams of an example EGS network;

FIG. 19 is a diagram illustrating a channel graph $L(x,y)$ from inlet x to outlet y of the network of FIGS. 17 and 18;

FIG. 20 is a diagram showing a single intersecting call in addition to the channel graph $L(x,y)$ of FIG. 19;

FIGS. 21 and 23 are diagrams of the network of FIG. 16 that are used in deriving nonblocking criteria for the network;

FIG. 22 is a diagram of the network of FIG. 18 that is used in describing a network property referred to therein a the forward-backward invariance property (FBIP);

FIG. 24 is a diagram of an example nonblocking EGS network;

FIG. 25 is a diagram of a particular perfect shuffle equivalent network—the crossover (or half crossover network);

FIG. 26 is a diagram of an EGS network representing an important special case of perfect shuffle equivalent networks;

FIG. 27 is a path hunt processing flow chat used to effect the path hunt function in an EGS network of FIG. 16 with full capacity nodes;

FIG. 28 is a path hunt processing flow chart used to effect the path hunt function in an EGS network of FIG. 16 with capacity one nodes;

FIG. 29 is a diagram of an exemplary shuffle network used in explaining the relationship of the switches and links of a shuffle network to the inlet, path and outlet numbers;

FIG. 30 is a diagram illustrating the concatenation of binary representations of inlet, path, and outlet numbers for the network of FIG. 29 to form a single binary number;

FIG. 31 is a diagram illustrating the determination of switches, links, inputs and outputs for the network of FIG. 29 from a single binary number;

FIG. 32 is a schematic illustration of the transformations between various stages of two isomorphic network types—crossover networks nd shuffle networks—where the transformations are specified herein in Tables 1-3;

FIGS. 34-36, when arranged in accordance with FIG. 33, comprise a diagram of a $16 \times 16$ two-dimensional crossover network using one-dimensional array of nodes;

FIG. 37 is a diagram illustrating the relative sizes of the $16 \times 16$ crossover network of FIGS. 34-36, a $128 \times 128$ crossover network, and a $512 \times 512$ crossover network of FIG. 38;

FIG. 38 is a diagram of a $512 \times 512$ crossover network and a corresponding crossover network controller, FIG. 39 is a connection request processing flow chart for the crossover network controller of FIG. 38;

FIG. 40 is a disconnect request processing flow chart for the crossover network controller of FIG. 38;

FIGS. 42-44, when arranged in accordance with FIG. 41, comprise a diagram of a hardware logic circuit implementation of the crossover network controller of FIG. 38;

FIG. 45 is a diagram of an alternative network controller embodiment that has duplicate copies of the network controller memories;

FIG. 46 is a diagram of a disjoint path check unit of the controller of FIGS. 42-44;

FIG. 47 is a timing diagram illustrating overlap path hunt processing by the controller of FIGS. 42-44;

FIG. 48 is a timing diagram illustrating overlap path hunt processing by the alternative controller of FIG. 45;

FIG. 49 is a diagram of a network having a first stage of $1 = 2^n$ elements, a last stage of $2^n \times 1$ elements, and for which the disjoint path check unit of FIG. 46 is applicable;

FIG. 5 is a diagram of a crossover to shuffle mapping unit of the controller of FIGS. 42-44; and FIG. 51 is a diagram of an idle path select unit of the controller of FIGS. 42-44.

DETAILED DESCRIPTION

The description which follows is arranged in two parts. First, a reduced blocking network topology is described. Advantageously, the topology is implementable in the photonics domain. Network control arrangements are then described for rapidly finding paths and establishing communications through such reduced blocking networks.

NETWORK TOPOLOGY

FIG. 2 is a diagram of a system 1600 comprising an expansion (fanout) section 1610, a perfect shuffle equivalent network 1620, and a concentration (fanin) section 1630. System 1600 has $N=4$ and $M=4$ outlets. Perfect shuttle equivalent network 1620 has four node stages 1621-0, 1621-1, 1621-2 and 1621-3 comprising $2 \times 2$ nodes, and three link stages 1622-0, 1622-1 and 1622-2 each effecting the same perfect shuffle interconnection of successive node stages. Expansion section 1610 expands the $N=4$ inlets to 16 (more than N) inputs of the first node stage 1621-0. Concentration section 1630 concentrates 16 (more than M) outputs of the last node stage 1621-3 to the $M=4$ outlets. System 1600 has at least two paths between each of the N inlets and each output of the last node stage. Individual nodes of the node stages 1621-0, 1621-1, 1621-2 and 1621-3 are controlled by corresponding stage controllers 1640, 1641, 1642, 1643 in response to instructions from a shuffle network controller 1650.

Three alternative implementations for the expansion section 1610 and concentration section 1630 are shown in FIGS. 3, 4 and 5. In expansion section 1710 (FIG. 3), each of the $N=4$ inlets is directly connected to four of the inputs of node stages 1621-0. In concentration section 1730, four outputs of node stage 1621-3 are directly connected to each of the $M=4$ outlets. Expansion section 1810 (FIG. 4) has a single stage 1811 of $1 \times 4$ nodes and concentration section 1830 has a single stage 1831 of $4 \times 1$ nodes. Expansion section 1910 (FIG. 5) has two stages 1911 and 1912 of $1 \times 2$ nodes and concentration section 1930 has two stages 1931 and 1932 of $2 \times 1$ nodes. Each of the expansion sections 1710, 1810, 1910 connects each of the N inlets to multiple inputs of node stage 1621-0 in a perfect shuffle sustaining pattern as defined herein. Each of the concentration sections 1730, 1830, 1930 connects multiple outputs of node stage 1621-3 to each of the M outlets in a perfect shuffle sustaining pattern as defined herein.

Three alternative $2 \times 2$ switching nodes 1510, 1520, and 1530 for use in system 1600 are shown in FIGS. 6, 7 and 8. A node with n inputs and m outputs is said to be a full capacity node if it is able to convey $\min\{n,m\}$ signals at the same time. A node is said to be a capacity one node if it is able to convey only one signal at a time. A capacity one node may have selectivity of either inputs or outputs or may have no selectivity.

Node 1510 (FIG. 6), a fully capacity node, comprises two selectors 1511 and 1512. Selector 1511 connects either of the node inputs I1 and I2 to node output O1 in response to a selection signal S1. Selector 1512 connects either of the node inputs I1 and I2 to node output O2 in response to a selection signal S2.

Node 1520 (FIG. 7), a capacity one node with input selectivity, comprises two AND-gates 1521 and 1522, and an OR-gate 1523. AND-gate 1521 transmits a signal from input I1, via OR-gate 1523, to both outputs O1 and O2 in response to a selection signal S1. AND-gate 1522 transmits a signal from input I2, via OR-gate 1523, to both outputs O1 and O2 in response to a selection signal S2. Only one of the selection signals S1 and S2 is a logic one at any time.

Node 1530 (FIG. 8), a capacity one node without selectivity, comprises an OR-gate 1531 and an AND-gate 1532. When a control signal C is a logic one, AND-gate 1532 transmits the logic union of the signals at the inputs I1 and I2, to both outputs O1 and O2. When the control signal C is a logic zero, AND-gate 1532 transmits a logic zero to both outputs O1 and O2. Only one of the inputs I1 and I2 receives an active signal at any time.

Node 1530 represents a special case of a more general switching node referred to herein as an nxm-module. An nxm-module, which as n inputs and m outputs, either routes the logical union of the signals at the n inputs to all of the m outputs, or routes none of the signals at the n inputs to any of the m outputs. If a network of nxm-modules is controlled such that at most one input of an nxm-module has an active signal, the nxm-module functions to either route the signal to all of the m outputs or to leave the m outputs idle. Node 1530 is a 2×2-module, also referred to herein as a 2-module.

When system 1600 (FIG. 5) is implemented using 2-modules, such as node 1530, as the switching nodes of perfect shuffle equivalent network 1620 as well as in expansion section 1910 and concentration section 1930, the 2-modules of perfect shuffle equivalent network 1620 are individually disabled or enabled as necessary such that none of the 2-modules has more than one active input signal. The 2-modules of the last expansion node stage 1912 are also individually disabled or enabled (not shown in FIG. 5) such that a signal received at a given one of the N inlets is transmitted to only two 2-modules of node stage 1621-0. To improve the tolerance of system 1600 to faults, such as a particular 2-module output becoming locked at one logic value, all the expansion and concentration 2-modules may be controllable.

FIG. 9 is a diagram of a system 1601 having N=4 inlets and M=16 outlets. System 1601 is identical to system 1600 (FIG. 2) except that concentration section 1630 is not required.

FIG. 19 is a diagram of a system 1602 having N=16 inlets and M=4 outlets. System 1602 is identical to system 1600 (FIG. 2) except that expansion section 1610 is not required.

Before describing the blocking characteristics of systems such as system 1600, the fundamental principles of strictly nonblocking networks are discussed. The condition for a network to be strictly nonblocking is that the minimum number of paths between any input-output pair must exceed the maximum number of paths which can be blocked between that pair. However, a sufficient (but non necessary) condition for a network to be strictly nonblocking is that the minimum number of paths between any input-output pair exceeds the maximum number of paths which can be blocked between any input-output pair. In equation form, this sufficient condition is expressed as:

PATHS ≧ BLOCKED PATHS+1.

A helpful network attribute is that the number of paths and blocked paths varies only slightly (or not at all) for any input-output pair selection.

A single stage strictly nonblocking network 1002 is shown in FIG. 11. In network 1002, the minimum number of paths between any input-output pair is equal to one. There are no blocked paths because each horizontal rail is uniquely associated with an input and each vertical rail is uniquely associated with an output. Therefore, we have

PATHS = 1 ≧ BLOCKED PATHS+1 = 0+1.

Accordingly, network 1002 is a strictly nonblocking network. In network 1002, there are N×M crosspoints but only min {N,M} are ever used at one time. To make a more efficient network, multiple stages are employed so as to create more paths than possible blocked paths while simultaneously decreasing the number of crosspoints.

A 24×24 strictly nonblocking three stage Clos network 1004 is shown in FIG. 12. There are five paths between each inlet and outlet, one through each middle stage switch. Any inlet (outlet) may have two paths blocked by the other two inlets (outlets) on its switch. If these two pairs of blocked paths are disjoint, a total of four paths are blocked. Thus, applying the strictly nonblocking condition, we have 5≧(2+2)+1. The number of crosspoints in network 1004 is 3×5×8+8×8×5+5×3×8=560. For comparison, a 24×24 crossbar network has 576 crosspoints.

A general strictly nonblocking three stage Clos network 1006 is shown in FIG. 13. (The inter-stage links are omitted in FIG. 13.) Applying the strictly nonblocking condition to network 1006, the minimum number of paths between any input-output pair is equal to r. The maximum number of blocked paths is equal to $(n-1)+(m-1)$ and therefore whenever $r \geq n+m-1$, network 1006 is strictly nonblocking. Note that an S+2 stage Clos network can be recursively produced from an S stage Clos network by simply replacing each switch in a given stage with a three stage Clos network. A strictly nonblocking five stage Clos network 1008 as shown in FIG. 14 with the number of links between stages indicated thereon. Two problems in implementing Clos networks in the photonic domain are: (1) non-square, non-small switching elements, and (2) different numbers of links between stages (increasing geometrically toward the center).

A multistage interconnection network (MIN) 1010 is shown in FIG. 15 and is defined by the following five conditions:

(1) a MIN has some arbitrary number S stages of nodes,
(2) there are $r_i$ nodes in stage i, each having $n_i$ inputs and $m_i$ outputs,
(3) nodes in different stages may have different values of $n_i$ and $m_i$,
(4) for $1 \leq i \leq S-1$, the outputs of nodes in stage i are connected (via links) to the inputs of nodes in stage i+1, and
(5) $r_i m_i = r_{i+1} n_{i+1}$ for $1 \leq i \leq S-1$.

An extended generalized shuffle (EGS) network 1012 is shown in FIG. 16. An EGS network is a MIN with a particular specified link interconnection pattern. In any stage i the nodes are numbered consecutively from 0 to $r_i - 1$ and the outputs on a particular node are numbered consecutively from 0 to $m_i - 1$. The outputs of the stage i nodes are then numbered consecutively from 0 to $r_i m_i - 1$; output $o_i$ on node $x_i$ is numbered $x_i m_i + o_i$. The EGS interconnection pattern is stated as follows: stage i output $x_i m_i + o_i$ is connected to node $(x_i m_i + o_i)_{mod\ r_{i+1}}$ in stage i+1. This interconnection pattern assigns links consecutively to nodes in the next stage (the so called perfect shuffle.). An important implication of the EGS interconnection pattern is that the number of paths between any two nodes in two given stages never differs by more than one. For i<j, the number of paths between a node in stage i and a node in stage j is either $$\left\lceil \prod_{k=i}^{j-1} m_k/r_j \right\rceil = \left\lceil \prod_{k=i+1}^{j} n_k/r_i \right\rceil \text{ or}$$

$$\left\lfloor \prod_{k=i}^{j-1} m_k/r_j \right\rfloor = \left\lfloor \prod_{k=i+1}^{j} n_k/r_i \right\rfloor,$$

where ⌈x⌉ denotes the smallest integer ≧x and ⌊x⌋ denotes the largest integer ≦x. Consider an EGS network with $N = n_1 r_1$ inlets and $m = m_s r_s$ outlets. The minimum number of paths between any inlet-outlet pair is given by $$\left\lfloor \prod_{k=1}^{S-1} m_k/r_S \right\rfloor = \left\lfloor \prod_{k=1}^{S} m_k/M \right\rfloor =$$

$$\left\lfloor \prod_{k=2}^{S} n_k/r_1 \right\rfloor = \left\lfloor \prod_{k=1}^{S} n_k/N \right\rfloor.$$

An example EGS network 1014 is shown in FIGS. 17 and 18. To determine the number of paths between input x and output y, we calculate $$\text{Paths} = \left\lfloor \prod_{k=1}^{S} m_k/M \right\rfloor = \lfloor 3 \times 3 \times 2 \times 2 \times 1 / 12 \rfloor =$$

$$\lfloor 36/12 \rfloor = 3.$$

The channel graph L(x,y) of input x and output y is the union of all paths between x and y. To ascertain an upperbond on the number of blocked paths, we must determine the number of calls which can intersect any channel graph and also the number of paths that each call can block. The channel graph L(x,y) is shown by dark lines in FIG. 19.

The channel graph L(x,y) is shown by dashed lines in FIG. 20. A single intersecting call (shown by dark lines in FIG. 20) blocks one of the three paths of L(x,y). Consider a call that intersects L(x,y) on j-i links from node stage i to node stage j (j>i). Denote a link from node stage k to node stage k°1 as a stage k link. The number of paths between input x and output y blocked by link i of the intersecting call C(i,j) is given by the product of the number of paths from x to the stage i node of C(i,j) and the number of paths from the stage i=1 node of C(i,j) to y. The maximum number of paths from any input (or stage 1 node) to any stage i node is $$\left\lceil \prod_{k=2}^{i} n_k/r_1 \right\rceil = \left\lceil \prod_{k=1}^{i} n_k/N \right\rceil$$

and the maximum number of paths from any stage i+1 node to any output (or stage S node) is $$\left\lceil \prod_{k=i+1}^{S-1} m_k/r_S \right\rceil = \left\lceil \prod_{k=i+1}^{S} m_k/M \right\rceil.$$

Thus, the maximum number of paths between X and y blocked by link i of C(i,j) is $$\left\lceil \prod_{k=1}^{i} n_k/N \right\rceil \times \left\lceil \prod_{k=i+1}^{S} m_k/M \right\rceil.$$

The additional number of paths blocked by link i+1 is given by $$\left\lceil \prod_{k=1}^{i+1} n_k/N \right\rceil \times \left\lceil \prod_{k=i+2}^{S} m_k/M \right\rceil -$$

$$\left\lceil \prod_{k=1}^{i} n_k/N \right\rceil \times \left\lceil \prod_{k=i+2}^{S} m_k/M \right\rceil.$$

The second term subtraction corrects for the fact that the first term includes some paths blocked by link i; namely, all those paths reaching link i+1 via link i. Employing a similar correction for each remaining link of C(i,j) we have that the number of paths blocked by C(i,j) is given by $$\text{BLOCKED PATHS}(i,j) \leq \sum_{k=1}^{j-1} \left\lceil \frac{\prod_{p=1}^{k} n_p}{N} \right\rceil \left\lceil \frac{\prod_{p=k+1}^{s} m_p}{M} \right\rceil - \sum_{k=i}^{j-2} \left\lceil \frac{\prod_{p=1}^{k} n_p}{N} \right\rceil \left\lceil \frac{\prod_{p=k+2}^{s} m_p}{M} \right\rceil.$$

Referring to network 1012 (FIG. 21), consider the following. Since $n_1 \leq N$ and $$\prod_{p=1}^{k} n_p$$

is nondecreasing in k, there must exist some stage t such that for $1 \leq k \leq t$, $$\left\lceil \frac{\prod_{p=1}^{k} n_p}{N} \right\rceil = 1 \text{ and for } t + 1 \leq k \leq S, \left\lceil \frac{\prod_{p=1}^{k} n_p}{N} \right\rceil > 1.$$

Similarly, there must exist a stage u such that for $u \leq k \leq S$, $$\left\lceil \frac{\prod_{p=k}^{S} m_p}{M} \right\rceil = 1 \text{ and for } 1 \leq k \leq u - 1, \left\lceil \frac{\prod_{p=k}^{S} m_p}{M} \right\rceil > 1.$$

The relationship $$\left\lceil \frac{\pi_{p=1}^{t+1} n_p}{N} \right\rceil > 1$$

implies that all inlets have at least one path to every stage t+1 node and therefore that intersecting call C(i,j) must have $i \leq t+1$ and similarly, because $$\left\lceil \frac{\pi_{p=u-1}^{S} m_p}{M} \right\rceil > 1,$$

must have $j \geq u-1$. Using all of this information, we are able to establish that the expression for blocked path becomes $$\text{BLOCKED PATHS}(i,j) \leq \left\lceil \frac{\pi_{p=i+1}^{S} m_p}{M} \right\rceil +$$

$$\left\lceil \frac{\pi_{p=1}^{j-1} n_p}{N} \right\rceil + \sum_{k=t+1}^{u-2} \left\lceil \frac{\pi_{p=1}^{k} n_p}{N} \right\rceil \times$$

$$\left(\left\lceil \frac{\pi_{p=k+1}^{S} m_p}{M} \right\rceil - \left\lceil \frac{\pi_{p=k+2}^{S} m_p}{M} \right\rceil\right) -$$

$$\left\lceil \frac{\pi_{p=t+2}^{S} m_p}{M} \right\rceil$$

where, conventionally, it is understood that the summation term $$\sum_{k=t+1}^{u-2}$$

equals zero if $t+1 > u-2$ and the product term $$\pi_{p=t+2}^{S}$$

equals one if $t+2 > S$. Note that $$\left\lceil \frac{\pi_{p=i+1}^{S} m_p}{M} \right\rceil$$

is a function of the entry point i and that $$\left\lceil \frac{\pi_{p=1}^{j-1} n_p}{N} \right\rceil$$

is a function of the departure point j. In addition, $$\sum_{k=t+1}^{u-2} \left\lceil \frac{\pi_{p=1}^{k} n_p}{N} \right\rceil \left(\left\lceil \frac{\pi_{p=k+1}^{S} m_p}{M} \right\rceil - \left\lceil \frac{\pi_{p=k+2}^{S} m_p}{M} \right\rceil\right) - \left\lceil \frac{\pi_{p=t+2}^{S} m_p}{M} \right\rceil$$

is a constant for all intersecting calls. Therefore, the upperbound on paths blocked by a single intersecting call is a separable function of the entry point, departure point, plus a constant.

We are now left with determining the maximum number of calls that can intersect a channel graph. Since the number of paths blocked by a single intersecting call is a separable function of the entry point, departure point, plus a constant, we need only determine the maximum number of calls which can enter and depart at each stage. We do not have to associate the entry and departure points of a given call. We are now ready to consider an important property of EGS networks (called the forward-backward invariance property) which holds for any set of consecutive stages of the network meeting a particular condition. If the forward-backward invariance property holds for certain portions of the network, the maximum number of entering and departing calls at each stage can be drastically reduced.

The forward-backward invariance property (FBIP) can be stated as follows: every stage j node which can be reached by a given stage i node reaches exactly the same set of stage i nodes. The FBIP holds for stages i and j in an EGS network if $$\pi_{k=i}^{j-1} m_k$$

pps divides $r_j$. The paths between certain stage 3 and stage 5 nodes for network 1014 are shown by dark lines in FIG. 22. Note that every stage 5 node which can be reached by a given stage 3 node reaches exactly the same set of stage 3 nodes. The FBIP is important because it drastically reduces intersecting calls and produces multistage modularity.

With reference to network 1012 shown in FIG. 23, assume that FBIP holds for stages 1 through i, i.e., $$\pi_{p=1}^{i} n_p - 1$$

divides $r_i$. Thus, every stage i node which can be reached by some inlet x reaches exactly the same set of first stage nodes or inlets. Since any stage i node can reach at most $$\pi_{p=1}^{i}$$

inlets (the products of the $n_p$ fanouts from stage i through stage 1), at most $$\prod_{p=1}^{i} n_p - 1$$

calls can enter the channel graph L(x,y) from stage 1 through stage i (point A in FIG. 23). Similarly, if FBIP holds for stages i+2 through S, then at most $$\prod_{p=i+2}^{S} m_p - 1$$

calls can depart from stage i+2 through stage S (point B in FIG. 23). For worst case considerations, we assume that all calls which enter at or before stage i depart at or before stage i+1 and all calls which depart at or after stage i+2 enter at or after stage i+1. Thus, for a given i, $1 \leq i \leq S-2$, the number of calls intersecting a channel graph is upperbounded by $$\prod_{p=1}^{i} n_p - 1 + \prod_{p=i+2}^{s} m_p - 1.$$

Minimizing for i and considering that at most min{N−1,M−1} calls can intersect a channel graph, we have that the maximum number of calls $\omega$ intersecting a channel graph is given by:

$$\omega = \min_{1 \leq i \leq S-2} \left\{ \prod_{p=1}^{i} n_p + \prod_{p=i+2}^{S} m_p - 2, N-1, M-1 \right\}.$$

The arguments which are used to obtain this result are valid if FBIP holds for all stages 1 through i in which $$\prod_{p=1}^{i} n_p \leq \omega$$

and also for all stages j through S in which $$\prod_{p=j}^{S} m_p \leq \omega.$$

We have thus far determined that there are:

(1) at least $\left\lfloor \dfrac{\prod_{k=1}^{S} m_k/M}{} \right\rfloor$ paths between any input-output pair, (2) at most $\left\lceil \dfrac{\prod_{p=i+1}^{S} m_p}{M} \right\rceil + \left\lceil \dfrac{\prod_{p=1}^{j-1} n_p}{N} \right\rceil +$ $$\sum_{k=i+1}^{u-2} \left\lceil \frac{\prod_{p=1}^{k} n_p}{N} \right\rceil \times$$

$$\left( \left\lceil \frac{\prod_{p=k+1}^{S} m_p}{M} \right\rceil - \left\lceil \frac{\prod_{p=k+2}^{S} m_p}{M} \right\rceil \right) - \left\lceil \frac{\prod_{p=i+2}^{S} m_p}{M} \right\rceil$$

paths blocked by a call entering a channel graph at stage i and departing at stage j, and (3) at most $\omega = \min\limits_{1 \leq i \leq S-2} \left\{ \prod\limits_{p=1}^{i} n_p + \prod\limits_{p=i+2}^{S} m_p - 2, N-1, M-1 \right\}$ calls intersecting a channel graph if $\prod\limits_{p=1}^{i} n_p$ divides N for $\prod\limits_{p=1}^{i} n_p \leq \omega$ and $\prod\limits_{p=j}^{S} m_p$ divides M for $\prod\limits_{p=j}^{S} m_p \leq \omega$.

So, all we have left to determine are the maximum numbers of calls which can enter and depart at each stage of the channel graph.

Recall that at most $$\prod_{p=1}^{i} n_p - 1$$

calls can enter L(x,y) in network 1012 (FIG. 23) at point A from stage 1 through stage i. But also, at most $\omega$ calls can enter from stage 1 through stage i. Also recall that at most $$\prod_{p=i+2}^{S} m_p - 1$$

calls can depart L(x,y) from point B of network 1012 from stage i+2 through stage S. But also, at most $\omega$ calls can depart from stage i+2 through stage S. Thus, as many as $$\min \left\{ \prod_{p=1}^{i} n_p - 1, \omega \right\}$$

calls can enter from stage 1 through stage i, and as many as $$\min \left\{ \prod_{p=1}^{i-1} n_p - 1, \omega \right\}$$

calls can enter from stage 1 through stage i−1. Assuming a maximum number of calls entering through stage i−1, we have at most $$\min\left\{\prod_{p=1}^{i} n_p - 1, \omega\right\} - \min\left\{\prod_{p=1}^{i-1} n_p - 1, \omega\right\}$$

calls entering at stage i. And similarly, we have at most $$\min\left\{\prod_{p=i}^{S} m_p - 1, \omega\right\} - \min\left\{\prod_{p=i+1}^{S} m_p - 1, \omega\right\}$$

calls departing at stage i. We are now able to state the fundamental condition for strictly nonblocking EGS networks.

$$\left\lfloor \prod_{k=1}^{S} m_k/M \right\rfloor \geq \sum_{i=1}^{S} \left( \left( \min\left\{\prod_{p=1}^{i} n_p - 1, \omega\right\} - \right.\right.$$

$$\left.\min\left\{\prod_{p=1}^{i-1} n_p - 1, \omega\right\} \right) \times \left\lceil \frac{\prod_{p=i+1}^{S} m_p}{M} \right\rceil +$$

$$\left( \min\left\{\prod_{p=1}^{S} m_p - 1, \omega\right\} - \min\left\{\prod_{p=i+1}^{S} m_p - 1, \omega\right\} \right) \times$$

$$\left\lceil \frac{\prod_{p=1}^{i-1} n_p}{N} \right\rceil + \omega \times \left( \sum_{k=i+1}^{u-2} \left\lceil \frac{\prod_{p=1}^{k} n_p}{N} \right\rceil \times \right.$$

$$\left. \left( \left\lceil \frac{\prod_{p=k+1}^{S} m_p}{M} \right\rceil - \left\lceil \frac{\prod_{p=k+2}^{S} m_p}{M} \right\rceil \right) - \right.$$

$$\left. \left\lceil \frac{\prod_{p=t+2}^{S} m_p}{M} \right\rceil \right) + 1, \text{ where } \left\lfloor \prod_{k=1}^{S} m_k/M \right\rfloor$$

is the minimum number of paths between any input-output pair, $$\min\left\{\prod_{p=1}^{i} n_p - 1, \omega\right\} - \min\left\{\prod_{p=1}^{i-1} n_p - 1, \omega\right\}$$

is the maximum number of entering calls at stage i, $$\left\lceil \frac{\prod_{p=i+1}^{S} m_p}{M} \right\rceil$$

is the number of paths blocked by calls entering at stage i, $$\min\left\{\prod_{p=1}^{S} m_p - 1, \omega\right\} - \min\left\{\prod_{p=i+1}^{S} m_p - 1, \omega\right\}$$

is the maximum number of departing calls at stage i, $$\left\lceil \frac{\prod_{p=1}^{i-1} n_p}{N} \right\rceil$$

is the number of paths blocked by the call departing at stage i, $\omega$ is the maximum number of intersecting calls, and $$\sum_{k=t+1}^{u-2} \left\lceil \frac{\prod_{p=1}^{k} n_p}{N} \right\rceil \left( \left\lceil \frac{\prod_{p=k+1}^{S} m_p}{M} \right\rceil - \right.$$

$$\left. \left\lceil \frac{\prod_{p=k+2}^{S} m_p}{M} \right\rceil \right) - \left\lceil \frac{\prod_{p=t+2}^{S} m_p}{M} \right\rceil$$

is a constant component of blocked paths for all intersecting calls.

This can then be stated as a fundamental theorem for strictly nonblocking EGS networks: any EGS network which has $N = n_1 r_1$ inlets and $M = m_s r_s$ outlets and in which $$\prod_{p=1}^{i} n_p \text{ divides } N \text{ for } \prod_{p=1}^{i} n_p \leq \omega \text{ and}$$

$$\prod_{p=j}^{S} m_p \text{ divides } M \text{ for } \prod_{p=j}^{S} m_p \leq \omega,$$

and in which $$\left\lfloor \prod_{k=1}^{S} m_k/M \right\rfloor \geq \omega \times$$

$$\left( \sum_{k=t+1}^{u-2} \left\lceil \frac{\prod_{p=1}^{k} n_p}{N} \right\rceil \left( \left\lceil \frac{\prod_{p=k+1}^{S} m_p}{M} \right\rceil - \right.\right.$$

$$\left.\left. \left\lceil \frac{\prod_{p=k+2}^{S} m_p}{M} \right\rceil \right) - \left\lceil \frac{\prod_{p=t+2}^{S} m_p}{M} \right\rceil \right) + 1 +$$

$$\sum_{i=1}^{S} \left( \left( \min\left\{\prod_{p=1}^{i} n_p - 1, \omega\right\} - \min\left\{\prod_{p=1}^{i-1} n_p - 1, \omega\right\} \right) \times \right.$$

$$\left\lceil \frac{\prod_{p=i+1}^{S} m_p}{M} \right\rceil +$$

$$\left(\min\left\{\prod_{p=1}^{S} m_p - 1, \omega\right\} - \min\left\{\prod_{p=i+1}^{S} m_p - 1, \omega\right\}\right) \times$$

$$\left\lceil \frac{\prod_{p=1}^{i-1} n_p}{N} \right\rceil \right),$$

where t is the largest value of i such that $$\prod_{p=1}^{i} n_p \leq N,$$

u is the smallest value of i such that $$\prod_{p=1}^{S} m_p \leq M, \text{ and}$$

$$\omega = \min_{1 \leq i \leq S-2}\left(\prod_{p=1}^{i} n_p + \prod_{p=i+2}^{S} m_p - 2, N-1, M-1\right)$$

is strictly nonblocking for point-to-point connections.

The previous development assumed full capacity nodes (capacity=min{$n_i, m_i$}). Similar developments can be made for capacity one nodes with selectivity, and for capacity one nodes without selectivity. Separate results are merged via the introduction of a variable $\alpha$, where $\alpha=1$ for full capacity nodes, $\alpha=0$ for capacity one nodes with selectivity, and $\alpha=-1$ for capacity one nodes without selectivity. The fundamental theorem for strictly nonblocking EGS networks is then stated as follows: any EGS network (where $\alpha=1$ for full capacity nodes, $\alpha=0$ for capacity one nodes with selectivity, and $\alpha=-1$ for capacity one nodes without selectivity) which has $N=n_1r_1$ inlets and $M=m_sr_s$ inlets and in which $$\prod_{p=1}^{i} n_p \text{ divides } N \text{ for } \prod_{p=1}^{i} n_p \leq \omega \text{ and}$$

$$\prod_{p=j}^{S} m_p \text{ divides } M \text{ for } \prod_{p=j}^{S} m_p \leq \omega, \text{ and in which}$$

$$\left\lfloor \frac{\prod_{k=1}^{S} m_k/M}{} \right\rfloor \geq \omega \times$$

$$\left(\sum_{k=t+1}^{u-1-\alpha} \left\lceil \frac{\prod_{p=1}^{k} n_p}{N} \right\rceil \left(\left\lceil \frac{\prod_{p=k+\alpha}^{S} m_p}{M} \right\rceil - \right.\right.$$

$$\left.\left.\left\lceil \frac{\prod_{p=k+1+\alpha}^{S} m_p}{M} \right\rceil\right) - \left\lceil \frac{\prod_{p=t+1+\alpha}^{S} m_p}{M} \right\rceil\right) + 1 +$$

$$\sum_{i=1}^{S} \left(\left(\min\left\{\prod_{p=1}^{i} n_p - 1, \omega\right\} - \min\left\{\prod_{p=1}^{i-1} n_p - 1, \omega\right\}\right) \times \right.$$

$$\left\lceil \frac{\prod_{p=i+\alpha}^{S} m_p}{M} \right\rceil +$$

$$\left(\min\left\{\prod_{p=1}^{S} m_p - 1, \omega\right\} - \min\left\{\prod_{p=i+1}^{S} m_p - 1, \omega\right\}\right) \times$$

$$\left\lceil \frac{\prod_{p=1}^{i-\alpha} n_p}{N} \right\rceil \right),$$

where t is the largest value of i such that $$\prod_{p=1}^{i} n_p \leq N,$$

u is the smallest value of i such that $$\prod_{p=1}^{S} m_p \leq M, \text{ and } \omega =$$

$$\min_{1 \leq i \leq S-1-\alpha}\left(\prod_{p=1}^{i} n_p + \prod_{p=i+1+\alpha}^{S} m_p - 2, N-1, M-1\right)$$

is strictly nonblocking for point-to-point connections. The great design flexibility of EGS networks stems primarily from the fact that the conditions for nonblocking operation are global and are based solely on N, M, $\alpha$, and various $n_i$ and $m_i$ products. Thus, in general, nonblocking conditions do not depend on the relationship between a particular $n_i$ and $m_i$.

An example nonblocking EGS network 1016 is shown in FIG. 24. If the output links in each stage of this network are assigned consecutively to the nodes in the next stage (perfect shuffle), then any idle input can be connected to any idle output, regardless of the current connection state of the network, i.e., the network is strictly nonblocking.

A multistage interconnection network (MIN) G is said to be a perfect shuffle equivalent network if either of the following two conditions holds.

Condition 1

For every stage i of G there exists a one-to-one mapping $\phi_i$ from the $r_i$ stage i nodes of G onto the integer set $\{0,1,\ldots,r_i-1\}$ such that node $\alpha$ in stage i of G is connected to node $\beta$ in stage i+1 of G if and only if $$\phi_{i+1}(\beta) \in \{(\phi_i(\alpha) \times m_i + o_i) \bmod r_{i+1} : o_i \in \{0,1,\ldots,m_i-1\}\}.$$

Condition 2

For every stage i of G there exists a one-to-one mapping $\psi_i$ from the $r_i$ stage i nodes of G onto the integer set $\{0,1, \ldots, r_i - 1\}$ such that node $\beta$ in stage $i+1$ of G is connected to node $\alpha$ in stage $i$ of G if and only if $$\psi_i(\alpha) \epsilon \{(\psi_{i+1}(\beta) \times n_{i+1} + i_{i+1}) \bmod r_i : i_{i+1} \epsilon \{0,1, \ldots, n_{i+1} - 1\}\}.$$

Note that an EGS network is a perfect shuffle equivalent network in that Condition 1 holds when each $\phi_i$ is simply the identity mapping. Let $$C_1 = \{\phi_i : i \epsilon \{1,2, \ldots, S\}\}$$

represent a set of S mappings $\phi_i$ satisfying Condition 1 and let $$C_2 = \{\psi_i : i \epsilon \{1,2, \ldots, S\}\}$$

represent a set of S mappings satisfying Condition 2.

An expanding means is said to connect each of the N inlets of G to multiple inputs of the first stage nodes of G in a perfect shuffle sustaining pattern if either of the following two conditions holds.

Condition 1e $C_1$ exists, $$\frac{n_1 r_1}{N} = F,$$

an integer, and there exits a one-to-one mapping $\phi_I$ from the N inlets of G onto the integer set $\{0,1, \ldots, N-1\}$ such that inlet $\alpha$ is connected to node $\beta$ in stage 1 of G if and only if $$\phi_1(\beta) \epsilon \{(\phi_I(\alpha) \times F + o_I) \bmod r_1 : o_I \{0,1, \ldots, F - 1\}\},$$

where $\phi_1 \epsilon C_1$.

Condition 2e $C_2$ exists, $$\frac{n_1 r_1}{N} = F,$$

an integer, and there exists a one-to-one mapping $\psi_I$ from the N inlets of G onto the integer set $\{0,1, \ldots, N-1\}$ such that node $\beta$ in stage 1 of G is connected to inlet $\alpha$ of G if and only if $$\psi_I(\alpha) \epsilon \{(\psi_1(\beta) \times n_1 + i_1) \bmod N : i_1 \epsilon \{0,1, \ldots, n_1 - 1\}\},$$

where $\psi_1 \epsilon C_2$.

A concentrating means is said to connect multiple outputs of the last stage S of nodes of G to each of the M outlets of G in a perfect shuffle sustaining pattern if either of the following two conditions holds.

Condition 1c $C_1$ exists, $$\frac{n_s r_s}{M} = F,$$

an integer, and there exits a one-to-one mapping $\phi_o$ from the M outlets of G onto the integer set $\{0,1, \ldots, M-1\}$ such that node $\alpha$ in stage S of G is connected to outlet $\beta$ if and only if $$\phi_o(\beta) \epsilon \{(\phi_S(\alpha) \times m_S + o_S) \bmod M : o_S \epsilon \{0,1, \ldots, m_S - 1\}\},$$

where $\phi_S \epsilon C_1$.

Condition 2c $C_2$ exists, $$\frac{n_s r_s}{N} = F,$$

an integer, and there exits a one-to-one mapping $\psi_o$ from the M outlets of G onto the integer set $\{0,1, \ldots, M-1\}$ such that outlet $\beta$ is connected to node $\alpha$ in stage S of G if and only if $$\psi_S(\alpha) \epsilon \{(\psi_o(\beta) \times F + i_o) \bmod r_S : i_o \epsilon \{0,1, \ldots, F - 1\}\},$$

where $\psi_S \epsilon C_2$.

Network G with such expanding and concentrating means can be equivalently represented as an S+2 stage perfect shuffle equivalent network comprised of an expansion stage of N ×F nodes, followed by the S stages of G, followed by a concentration stage of M F'×1 nodes. If Condition 1 (2) holds $\phi_I(\psi_I)$ is applied to the N inlet nodes and inlet node $\alpha$ is connected to node $\beta$ in stage 1 of G according to Condition 1e (2e) and $\phi_o(\psi_o)$ is applied to the M outlet nodes and node $\alpha$ in stage S of G is connected to outlet node $\beta$ according to Condition 1c (2c).

Crossover network 1020 shown in FIG. 25 is a perfect shuffle equivalent network. This can easily be verified by examining the labeling of the nodes in each stage and the interconnection between stages. The existence of such regularized physical interconnection patterns of perfect shuffle equivalent networks is important for implementation consideration.

In a crossover network with $2^k$, $2 \times 2$ nodes per stage, each link stage i is comprised of a crossover interconnection pattern having $2^{r_i}$ partitions, where $r_i$ $I(k) = \{0,1, \ldots, k-1\}$. The values selected for the various $r_i$ greatly affect the performance and connectivity of the network.

One very useful pattern of $r_i$ selection (that produces a perfect shuffle equivalent network) is to have $r_1, r_2, \ldots, r_k$ be given by any permitting of I(K) and for $i \geq k$, $r_i = r_j$ where $j = 1 + (i-1) \bmod k$; i.e. $r_{k+1} = r_1, r_{k+2} = r_2, \ldots, r_{2k} = r_k$, etc. Many other useful patterns exist that correspond to networks not in the perfect shuffle equivalent network family.

EGS network 1022 shown in FIG. 26 represents an important special case of perfect shuffle equivalent networks. In network 1022 $S \geq 3$, $n_1 32$ 1, $m_1 = F$, $r_1 = N$, $n_S = F$, $M_2 = 1$, $r_2 = N$, and for $2 \leq i \leq S-1$, $n_i = m_i = n$, and $$r_i = \frac{FN}{n}.$$

LET:
P(B) = probability that a given idle inlet and outlet cannot be connected (blocked).
P(F) = probability that a given n×n node in stage 2 through S−1 is unusable due to a failure.

OCC = probability that a given inlet or outlet is busy.
$\alpha = 0$ for capacity one $n \times n$ nodes (with selectivity).
$\alpha = 1$ for full capacity $n \times n$ nodes.
THEN:
 N,F,n,S,P(B),OCC, and $\alpha$ are approximately related by $$P(B) \approx \left[1 - \left(1 - P(F) - \frac{(n-1)OCC}{n^\alpha F}\right)^{S-2-\alpha}\right]^{\frac{FnS-2}{N}}$$

For $3 \leq S \leq 2\log_n N + 1 - \alpha$
LET:
 $P_s(B) = P(B)$ for a network with S stages
THEN:
 $P_{s+1}(B)$ and $P_s(B)$ are approximately related by
 $P_{s+1}(B) \approx P_s(B)^{[n(1-P(F))-(n-1)n^{1-\alpha} \times OCC/F]}$
If $$F > \frac{(n-1)OCC}{n^\alpha(1 - P(F))},$$

then the exponent is greater than one and $P_s(B)$ decreases double exponentially in S; i.e., $$\log\left(\log \frac{1}{P_S(B)}\right)$$

plotted versus S is a straight line. To demonstrate this dramatic effect assume $P_S(B) = 10^{-1}$ and $P_{s+1}(B) = [P_s(B)]^2$. Then $P_{s+1} = (10^{-1})^2 = 10^{-2}$, $P_{s+2}(B) = [10^{-2}]^2 = 10^{-4}$, $P_{s+3}(B) = [10^{-4}]^2 = 10^{-8}$, $P_{s+4}(B) = [10^{-8}]^2 = 10^{-16}$, etc. Thus, in such a network we have reduced the probability of blocking from $10^{-1}$ to $10^{-16}$ by simply adding four stages.

The previous approximate expression for probability of blocking may be generalized for any perfect shuffle equivalent network G with S stages of nodes, with stage i comprised of $n_i \times m_i$ nodes and with $N = n_1 r_1$ inlets and $M = r_s m_s$ outlets. Setting $P(F) = 0$, $OCC = 1$, and $\alpha = 1$ we get the probability of blocking in G, P(G), approximately given by $$P(G) \approx \left[\prod_{i=1}^{S-1}\left[1 - (n_i - 1)\prod_{j=1}^{i-1} \pi n_j / \prod_{j=1}^{i} \pi m_j\right]\right]^{\prod_{j=1}^{S} \pi m_j / M}.$$

$P(G) \leq 0.5$ is a conservative threshold for network G to be useful in applications where blocking probability is at all significant.

Network Control

Recall that network 1012, shown in FIG. 16, is an EGS network having an interconnection pattern that simply assigns links consecutively to switches in the next stage—a perfect shuffle interconnection. The number of paths P between any inlet x and any outlet y in network 1012 is given by $$P = 1 + \left\lfloor \frac{\prod_{j=1}^{S} \pi m_j - 1 - \left(y - x \prod_{j=1}^{S} \pi m_j\right)_{\mod M}}{M} \right\rfloor.$$

Let I(k) denote the integer set $\{0, 1, \ldots, k+1\}$. Denote a given path from inlet x to outlet y by the triple (x,P*,y), where P* is an element of I(P). Path (x,P*,y) will pass through stage i switch $$S_i(x, P^*, y) =$$

$$\left\lfloor \frac{x \prod_{j=1}^{S} \pi m_j = P^*M + \left(y - x \prod_{j=1}^{S} \pi m_j\right)_{\mod M}}{\prod_{j=1}^{S} \pi m_j} \right\rfloor_{\mod r_i}$$

for $1 \leq i \leq S$. Denote a link between stages i and i+1 as a stage i link. Path (x,P*,y) utilizes stage i link $$L_i(x, P^*, y) =$$

$$\left\lfloor \frac{x \prod_{j=1}^{S} \pi m_j = P^*M + \left(y - x \prod_{j=1}^{S} \pi m_j\right)_{\mod M}}{\prod_{j=i+1}^{S} \pi m_j} \right\rfloor_{\mod r_i m_i}$$

for $1 \leq i \leq S - 1$.

FIG. 27 is a path hunt processing flow chart used to effect the path hunt function in network 1012 where the switches are full capacity, i.e., $cap(S_i) = \min\{n_i, m_i\}$. Processing begins with block 1102 where a previously unchecked path P* is selected. In block 1104 the busy/idle status of $L_i(x, P^*, y)$ is checked for all i, $1 \leq i \leq S - 1$. In decision block 1106 a determination is made of whether all the $L_i(x, P^*, y)$ are idle. If all the $L_i(x, P^*, y)$ are idle, processing proceeds from block 1106 to block 1108 where it is concluded that path P* may be used to connect inlet x to outlet y. If it is determined in block 1106 that all the $L_i(x, P^*, y)$ are not idle, processing continues with decision block 1110. In block 1110 it is determined whether there are other unchecked paths. If there are, processing returns to block 1102 and the processing flow chart is repeated for a new unchecked path. However, if in decision block 1110 it is determined that there are no other unchecked paths, processing branches to block 1112 where it is concluded that all paths are blocked between inlet x and outlet y. The links $L_i$ are checked in the flow chart of FIG. C1 because the switches of network 1012 were assumed to be full capacity.

FIG. 28 is a path hunt processing flow chart used to effect the path hunt function in network 1012 where the switches are capacity one, i.e. cap $(S_i) = 1$. Processing begins with block 1122 where a previously unchecked path P* is selected. In block 1124 the busy/idle status of $S_i(x, P^*, y)$ is checked for all i, $1 \leq i \leq S$. In decision block 1126 a determination is made of whether all the $S_i(x, P^*, y)$ are idle. If all the $S_i(x, P^*, y)$ are idle processing proceeds from block 1126 to block 1128 where it is concluded that path P* may be used to connect inlet x to outlet y. If it is determined in block 1126 that all the $S_i(x, P^*, y)$ are not idle, processing continues with decision block 1130. In block 1130 it is determined whether there are other unchecked paths. If there are, processing returns to block 1122 and the processing flow chart is repeated for a new unchecked path. However, if in decision block 1130 it is determined that there are no other unchecked paths, processing branches to block 1132 where it is concluded that all paths are blocked between inlet x and outlet y. The switches $S_i$ are checked in the flow chart of FIG. 28 because the switches of network 1012 were assumed to be of capacity one.

It is significant to note that in performing the path hunt for network 1012, parallel operations are possible. All $S_i(x,P^*,y)$ or $L_i(x,P^*,y)$ busy/idle statuses for all i and $P^*$ may be read concurrently, and then all P paths can be determined busy or idle concurrently. A specific path is then chosen from those found idle, if any.

If the network under consideration is not EGS network, but is an isomorphic version of an EGS network, inlet x and outlet y must be mapped into their EGS equivalents before applying the routing algorithm(s). A reverse mapping is required to operate switches.

Overlap operation can be performed on a multiplicity of connections to be made if all paths for each inlet/outlet pair are disjoint from all paths for every other inlet/outlet pair.

For convenience, denote $$\prod_{j=i}^{S} m_j = M_i.$$

If M divides $M_1$, the equations for P, $Sp_i(x,P^*,y)$ given previously become $P = M_1/M$, $$S_i(x,P^*,y) = \left\lfloor \frac{xM_1 + P^*M + y}{M_i} \right\rfloor_{\text{mod } r_i}, \text{ and}$$

$$L_i(x,P^*,y) = \left\lfloor \frac{xM_1 + P^*M + y}{M_{i+1}} \right\rfloor_{\text{mod } r_i m_i}.$$

Consider a network G in which $N = M = 2^n$, $n_1 = m_2 = 1$, $m_1 = n_2 = 2^k = F$, and, for $2 \leq i \leq S-1$, $n_i = m_i = 2$, where n and k are integers. Then $M_1 = 2^{S-2} \times F = 2^{S-2} \times 2^k = 2^{S+k-2}$ and $$P = \frac{M_1}{M} = \frac{2^{S+k-2}}{2^n} = 2^{S+k-n-2}.$$

We also have $r_1 = r_s = N = M = 2^n$ and $$r_i = \frac{2^n \times 2^k}{2} = 2^{n+k-1} \text{ for } 2 \leq i \leq S-1.$$

Additionally, $M_i = 2^{S-i}$ for $2 \leq i \leq S$.

The term $xM_1 + P^*M + y$ thus becomes $x2^{S+k-2} + P^*2^n + y$, x and y range through integer values $0, 1, \ldots, 2^n - 1$ and $P^*$ ranges through integer values $0, 1, \ldots, 2^{S+k-n-2} - 1$. Thus, $P^*2^n$ has values $0, 2^n, 2 \cdot 2^n, 3 \cdot 2^n, \ldots, 2^{S+k-2} - 2^n$ and $P^*2^n + y$ ranges through all integer values from 0 to $2^{S+k-2} - 1$. Also, $x \cdot 2^{S+k-2}$ has values $0, 2^{S+k-2}, \ldots, 2^{S+k+n-2} - 2^{S+k-2}$ and thus $x2^{S+k-2} + P^*2^n + y$ ranges through all integer values from 0 to $2^{S+k+n-2} - 1$. We can thus represent $xM_1 + P^*M + y = x2^{S+k-2} + P^*2^n + y$ as an $S + k + n - 2$ bit binary number as follows $$xM_1 + P^*M + y = \underbrace{xx \ldots x}_{n} \underbrace{pp \ldots p}_{S+k-n-2} \underbrace{yy \ldots y}_{n}$$

Let us consider the expression $$S_i(x,P^*,y) = \left\lfloor \frac{xM_1 + P^*M + y}{M_i} \right\rfloor_{\text{mod } r_i} =$$

$$\left\lfloor \frac{xM_1 + P^*M + y}{2^{S-i}} \right\rfloor_{\text{mod } 2^{n+k-1}} \text{ for}$$

Dividing a binary number by $2^{S-i}$ and taking the floor function is equivalent to shifting the binary number $S-1$ places to the right. Thus, $$\left\lfloor \frac{xM_1 + P^*M + y}{2^{S-i}} \right\rfloor$$

is equivalent to the binary number enclosed in the following rectangle:

$$\underbrace{\boxed{xx \ldots xpp \ldots}}_{k + n + i - 2} \cdot \underbrace{pyy \ldots y}_{S - i}$$

A binary number modulo $2^{n+k-1}$ is given by the rightmost $n+k-1$ bits of the binary number. Thus, $$\left\lfloor \frac{xM_1 + P^*M + y}{2^{S-i}} \right\rfloor_{\text{mod } 2^{n+k-1}}$$

is equivalent to the binary number enclosed in the following rectangle:

$$\underbrace{xx \ldots}_{i - 1} \underbrace{\boxed{xpp \ldots}}_{n + k - 1} \cdot \underbrace{pyy \ldots y}_{S - i}$$

$S_i(x,P^*,y)$ is thus given by a window of $\log_2 r_i$ bits displaced $\log_2 M_i$ bits from the right of the binary representation of $xM_1 + P^*M + y$. Similarly, $L_i(x,P^*,y)$ is given by a window of $\log_2(r_i m_i)$ bits displaced by $\log_2 M_{i+1}$ bits from the right of the binary representation of $xM_1 + P^*M + y$.

The relationship of the switches and links of a shuffle network to the inlet/outlet and path numbers is described herein for the exemplary network 1140, shown in FIG. 29. FIG. 30 illustrates the concatenation of binary representations of inlet 137, path 417, and outlet 291 to from a single binary number. FIG. 31 illustrates that the determination of a particular switch in a given stage can be made simply by selecting a certain number of consecutive bits of the binary number. The particular eleven-bit sequences used to identify the stage 2 switch and the stage 16 switch are illustrated in FIG. 31. Similarly, the twelve-bit sequences used to identify the particular links in stage 2 and stage 16 are also illustrated. The eleven-bit strings identify one out of 2048 switches. The twelve-bit strings identify one out of 4096 links.

Also illustrated in FIG. 31 is the method for identifying the particular inputs and outputs of the various stages, based on the bit(s) adjacent to the bit sequences used to identify the switches and links. For example, the stage 2 and stage 16 inputs are identified and the stage 1, stage 2 and stage 16 outputs are identified. Note that for network 1140, output routing is "self-routing"—independent of the input.

Recall that the crossover network and the shuffle network are isomorphic. The transformations between various stages of the two network types are illustrated schematically in FIG. 32. The particular transformations identified in FIg. 32 are listed herein in Tables 1–3. In FIG. 32 the switch and output of stage i of a crossover network identified in block 1150 and the switch and output of a shuffle network stage i identified in block 1154 are related by transformations 1, 2, 3, and 4 of blocks 1152. Similarly, the switch and input for stage $i+1$ of a crossover network represented in block 1160 and the switch and input for stage $i+1$ of a shuffle network represented in block 1164 are related as defined by transformations 9, 10, 11, and 12 of block 1162. The transformations between stage i and switch and output number for a crossover network and stage $i+1$ switch and input number for a crossover network are specified by transformations 13, 14, 15, and 16 of block 1156. The corresponding relationships between successive stages of a shuffle network are given by transformations 5, 6, 7, and 8 of block 1158. The transformations 1 through 16 are listed in Tables 1–3. For each transformation, the number to be transformed is an n-bit binary number represented by $B_{n-1} \ldots B_1 B_0$.

TABLE 1

$CS_i \longrightarrow SS_i$:  (1)

$$\overbrace{B_{i+1} \oplus B_i, B_{i+2} \oplus B_{i+1}, \ldots, B_{n-1} \oplus B_{n-2}}^{n-i-1}, \overbrace{B_{n-1}}^{1},$$

$$\overbrace{B_1 \oplus B_0, B_2 \oplus B_1, \ldots, B_i \oplus B_{i-1}}^{i}$$

$CO_i \longrightarrow SO_i$: $B_{i+1} \oplus B_i \oplus CO_i$ if $i \leq n-2$;  (2)
$\quad\quad\quad\quad\quad B_{n-1} \oplus CO_i$ if $i = n-1$ $SS_i \longrightarrow CS_i$:  (3)

$$\overbrace{B_i, B_{i+1} \oplus B_i, B_{i+2} \oplus B_{i+1} \oplus B_i, \ldots, \oplus B_{n-1,\ldots,i}}^{n-i}$$

$$\overbrace{\oplus B_{n-1,\ldots,i,0}, \ldots, \oplus B_{n-1,\ldots,i,1,\ldots,i-1}}^{i}$$

$SO_i \longrightarrow CO_i$: $B_{n-i} \oplus SO_i$  (4)

$SS_i, SO_i \longrightarrow SS_{i+1}$: $B_{n-2}, B_{n-3}, \ldots, B_0, SO_i$  (5)

$SS_i, SO_i \longrightarrow SI_{i+1}$: $B_{n-1}$  (6)

TABLE 2

$SS_{i+1}, SI_{i+1} \longrightarrow SS_i$: $SI_{i+1}, B_{n-1}, B_{n-2}, \ldots, B_1$  (7)

$SS_{i+1}, SI_{i+1} \longrightarrow SO_i$: $B_0$  (8)

TABLE 2-continued $CS_{i+1} \longrightarrow SS_{i+1}$:  (9)

$$\overbrace{B_{i+2} \oplus B_{i+1}, B_{i+3} \oplus B_{i+2}, \ldots, B_{n-1} \oplus B_{n-2}, B_{n-1}}^{n-i-2}, \overbrace{B_{n-1}}^{1},$$

$$\overbrace{B_1 \oplus B_0, B_2 \oplus B_1 \ldots, B_{i+1} \oplus B_i}^{i+1}$$

$CI_{i+1} \longrightarrow SI_{i+1}$: $B_{i+1} \oplus B_i \oplus CI_{i+1}$ if $i+1 \geq 1$;  (10)
$\quad\quad\quad\quad\quad B_{n-1} \oplus CI_{i+1}$ if $i+1 = 0$ $CI_i \longrightarrow SI_i$: $B_i \oplus B_{i-1} \oplus CI_i$ if $i \geq 1$;  (10a)
$\quad\quad\quad\quad B_{n-1} \oplus CI_i$ if $i = 0$ $SS_{i+1} \longrightarrow CS_{i+1}$:  (11)

$$\overbrace{B_{i+1}, B_{i+2} \oplus B_{i+1}, B_{i+3} \oplus B_{i+2} \oplus B_{i+1}, \ldots, \oplus B_{n-1,\ldots,i+1}}^{n-i-1},$$

$$\overbrace{\oplus B_{n-1,\ldots,i+1,0}, \ldots, \oplus B_{n-1,\ldots,i+1,0,\ldots,i}}^{i+1}$$

TABLE 3

$SI_{i+1} \longrightarrow CI_{i+1}$: $B_0 \oplus SI_{i+1}$  (12)

$SI_i \longrightarrow CI_i$: $B_0 \oplus SI_i$  (12a)

$CS_i, CO_i \longrightarrow CS_{i+1}$:  (13)

$$\overbrace{B_{n-1}, B_{n-2}, \ldots, B_{i+1}}^{n-i-1},$$

$$\overbrace{B_i \oplus CO_i, B_{i-1} \oplus CO_i, \ldots, B_0 \oplus CO_i}^{i+1}$$

$CS_i, CO_i \longrightarrow CI_{i+1}$: $CO_i$  (14)

$CS_{i+1}, CI_{i+1} \longrightarrow CS_i$:  (15)

$$\overbrace{B_{n-1}, B_{n-2}, \ldots, B_{i+1}}^{n-i-1},$$

$$\overbrace{B_i \oplus CI_{i+1}, B_{i-1} \oplus CI_{i+1}, \ldots, B_0 \oplus CI_{i+1}}^{i+1}$$

$CS_{i+1}, CI_{i+1} \longrightarrow CO_i$: $CI_{i+1}$  (16)

Arrangements for controlling a 512×512 crossover network 1200 (FIG. 38) are now described. To get a better understanding of the size of such a network, first refer to the 16×16 crossover network 1170 (FIGS. 34–36) and note the pattern of crossover connections from stage to stage. FIG. 37 is a representation of the relative sizes of the 16×16 network 1170 and the 512×512 network 1200. Also shown is an intermediate size 128×128 network. Crossover network 1200 (FIG. 38) includes 15 stages; however stages 1, 2, 3, 13, 14, and 15 do not perform a switching function but are used only to implement the fanout/fanin F=8. A crossover network controller 1300 is used to effect path hunt, connect, and disconnect functions for network 1200 via a plurality of stage controllers 1201 through 1209, individual to the stages 4 through 12. For the present example, the nodes of the switching stages 4 through 12 are full capacity switching nodes such as the node of FIG. 5. The nodes of the fanout stages 1,2 and 3 and the nodes of the fanin stages 13, 14, and 15 are simple fanout elements and fanin elements, respectively. Crossover network controller 1300, which may be implemented as a single processor operated under stored program control or as a hardware logic circuit arrangement, implements the control processing shown, for example, in FIGS. 39 and 40 to effect connections and disconnections respectively.

Connection processing (FIG. 39) begins when a network 1200 inlet/outlet pair for a given connection request is stored in a queue in block 1402. When the stored inlet/outlet pair is to be processed, a conversion of the inlet and outlet numbers is made in block 1404 to the corresponding inlet and outlet numbers of the shuffle network topologically equivalent to network 1200. Then in block 1406 a disjoint path check is made using procedures described further herein to determine whether any of the possible paths for this connection request intersect with any of the possible paths for other connection requests being processed concurrently. If there is no conflict with other connection requests in progress, execution proceeds to block 1408 where the switches or links associated with all paths from the inlet to the outlet of the equivalent shuffle network are determined. Since, in network 1200, the switches (or nodes) are full capacity switches, it is sufficient to determine the links of a given path through the network. If the network switches are capacity one switches, it is sufficient to determine the switches of a given path through the network. Once the path components of all paths have been determined, an idle path is identified in block 1410 if such idle path exists. When an idle path is found, a path memory is updated in block 1412 to define the idle path using the inlet, outlet, and path numbers for the equivalent shuffle network. Connection orders are sent in block 1414 to the network stage controllers 1201 through 1209. Further, the path components (switches or links) for the identified path are marketed busy in block 1416 for all stages.

Returning to block 1406, if it is determined that the given connection request is in conflict with other connection requests being processed, information concerning the given connection request in stored in a queue in block 1420. Once an idle path is found in block 1410 for one of the other connection requests, a report is made to the queue of block 1420. The disjoint path check of block 1406 is then repeated. If no idle path is identified in block 1410 for a connection request, blocks 1422 and 1424 are executed. In block 1422, a report is made to the queue of block 1420 that connection processing is complete. In block 1424, a blocking failure report is made to the queue of block 1402 such that the unsuccessful connection request can be processed again later.

Disconnection processing (FIG. 40) begins when a network 1200 inlet for a given disconnection request is stored in a queue in block 1440. When the stored inlet is to be processed, a conversion of the inlet number is made in block 1442 to the corresponding inlet number of the shuffle network topologically equivalent to network 1200. In block 1444, the shuffle inlet number is used to index the path memory to determine the shuffle outlet number and the path number for the connection. Disconnect orders are sent in block 1448 to the network stage controllers 1201 through 1209. Further, the path components (switches or links) for the path being disconnected are again marked idle for all stages.

A hardware embodiment of network controller 1300 is shown in FIGS. 42–44. Connection requests, specifying a particular network 1200 inlet/outlet pair, are stored in a connect request queue 1302. The nine-bit binary crossover inlet number and the nine-bit binary crossover outlet number are transmitted to a crossover to shuffle mapping unit 1304 (FIG. 50) for conversion to the corresponding nine-bit shuffle inlet number and the corresponding nine-bit shuffle outlet number. The shuffle inlet and outlet numbers are stored in a connect/disconnect request queue 1305 and then transmitted to a disjoint path check unit 1306 (FIg. 45). Unit 1306 determines whether the present inlet/outlet number pair defines paths through network 1200 which are link disjoint from the paths associated with another inlet/outlet number pair. When two or more connection requests define disjoint paths through network 1200, multiple connection requests and path hunts can be processed at the same time in what is referred to herein as an overlap mode of operation. The shuffle inlet/outlet numbers are then stored in a connect/disconnect request queue 1308. When a path hunt is to be performed, connect request queue 1308 transmits a read request signal to a plurality of memories 1312 that store the link busy/idle bits for a corresponding one of the link stages 4 through 11 of network 1200. (Link stage i is the stage of links between node stage i and node stage i+1). The nine-bit shuffle inlet and the nine-bit shuffle outlet signals are also transmitted in parallel from connect request queue 1308 and predetermined ones of the inlet and outlet signals are used to address locations of the memories 1312.

Note that in network 1200 there are eight paths associated with any specified inlet/outlet pair. Each memory 1312 has 512 locations, each comprising eight bits. Each of the 512 locations of a given memory 1312 corresponds to a different value of the predetermined nine bits extracted from the binary number formed by concatenating the inlet number, path number, and outlet number in the manner of FIG. 30. However, none of the path number bits are extracted for any of the stages. As a result, a memory 1312 location defines the busy/idle status of a link stage for each of the eight paths associated with a given inlet/outlet number pair. All eight bits of the addressed memory 1312 locations are read and concurrently combined by a plurality of path busy/idle check units 1314, implemented, for example, as multi-input OR-gates. One of the path check units 1314 transmits an idle signal when all of its input signals indicate an idle status of links. An idle path select unit 1316 (FIG. 51) receives the busy/idle signals from each of the units 1314 and selects in a predetermined fashion one of the defined idle paths. Idle path select unit 1316 then transmits the binary number corresponding to the one of the eight paths selected. Unit 1316 also transmits a blocked path indicator if, in fact, there is not path found. The blocked path indicator is fed back to the connect request queue 1302 such that the connection request can be repeated at a later time. The inverse of the blocked path indicator is used as a write request signal to write a busy bit into each of the memories 1312. The idle path number is transmitted to the memories 1312 to additionally identify the particular path and therefore the particular bit of the location addressed by the inlet and outlet numbers. In addition, a path memory 1318 is updated in response to the write request and stores, at an address defined by the shuffle inlet, both the shuffle outlet and the selected idle path number.

A disconnect queue 1320 effects disconnections by transmitting the crossover inlet to be disconnected, to crossover to shuffle mapping unit 1304 for conversion to the corresponding shuffle inlet. The shuffle inlet is then used to address path memory 1318. Disconnect request queue 1320 transmits a read request signal to path memory 1318 and reads the shuffle outlet stored at the location of path memory 1318 defined by the shuffle inlet address. The read shuffle outlet is then transmitted along with the shuffle inlet via queue 1305, disjoint path check unit 1306 and queue 1308 to address memories 1312. The addressed path memory 1318 location also includes the path number of the path to be disconnected. The read path number is transmitted in parallel to each of the memories 1312 to additionally specify the particular bit to be returned to an idle status. Thereafter, disconnect request queue 1320 transmits a write request which effects the change to idle status in the memories 1312 and also deletes information concerning that connection from path memory 1318. Each of the node stage controllers 1201 through 1209 includes a translator which effects a predetermined combination of the shuffle inlet, outlet, and path signals to determine both the node and the node input to node output connection to be enabled as part of a new path or to be disabled for a disconnection. The design of these translators is based on the following logic. Following reasoning similar to that to determine $S_i(x,P^*,y)$ and $L_i(x,P^*,y)$ from a binary representation of $xM_1+P^*M+y$, we may determine $I_i(x,P^*,y)$ (the input used on $S_i(x,P^*,y)$) and $O_i(x,P^*,y)$ (the output used on $S_i(x,P^*,y)$).

$$I_i(x,P^*,y) = \left\lfloor \frac{xM_1 + P^*M + y}{r_i M_i} \right\rfloor_{mi}$$

For $2 \leq i \leq S-1$, $r_i = 2^{n+k-1}$, $M_i = 2^{S-i}$ and $n_i = 2^1$, $I_i(x,P^*,y)$ is given by window of one bit displaced $n = k-1+S-i$ bits from the right of the binary representation of $xM_1+P^*M+y$.

$$O_i(x,P^*,y) = \left\lfloor \frac{xM_1 + P^*M + y}{M_{i+1}} \right\rfloor_{\!\!mod\ mi}$$

$O_i(xP^*,y)$ is then given by a window of one bit displaced $S-i-1$ bits from the right of the binary representation of $xM_1+P^*M+y$.

To map $S_i(x,P^*,y)$, $I_i(x,P^*,y)$, and $O_i(x,P^*,y)$ from the shuffle domain to the crossover domain we employ expressions (3) and (4) in Table 1 and expression (12a) in Table 3, respectively. The required exclusive-OR functions are easily implemented in hardware and the inputs to these functions are obtained directly from the binary representation of $xM_1+P^*M+y$.

Figure 50:
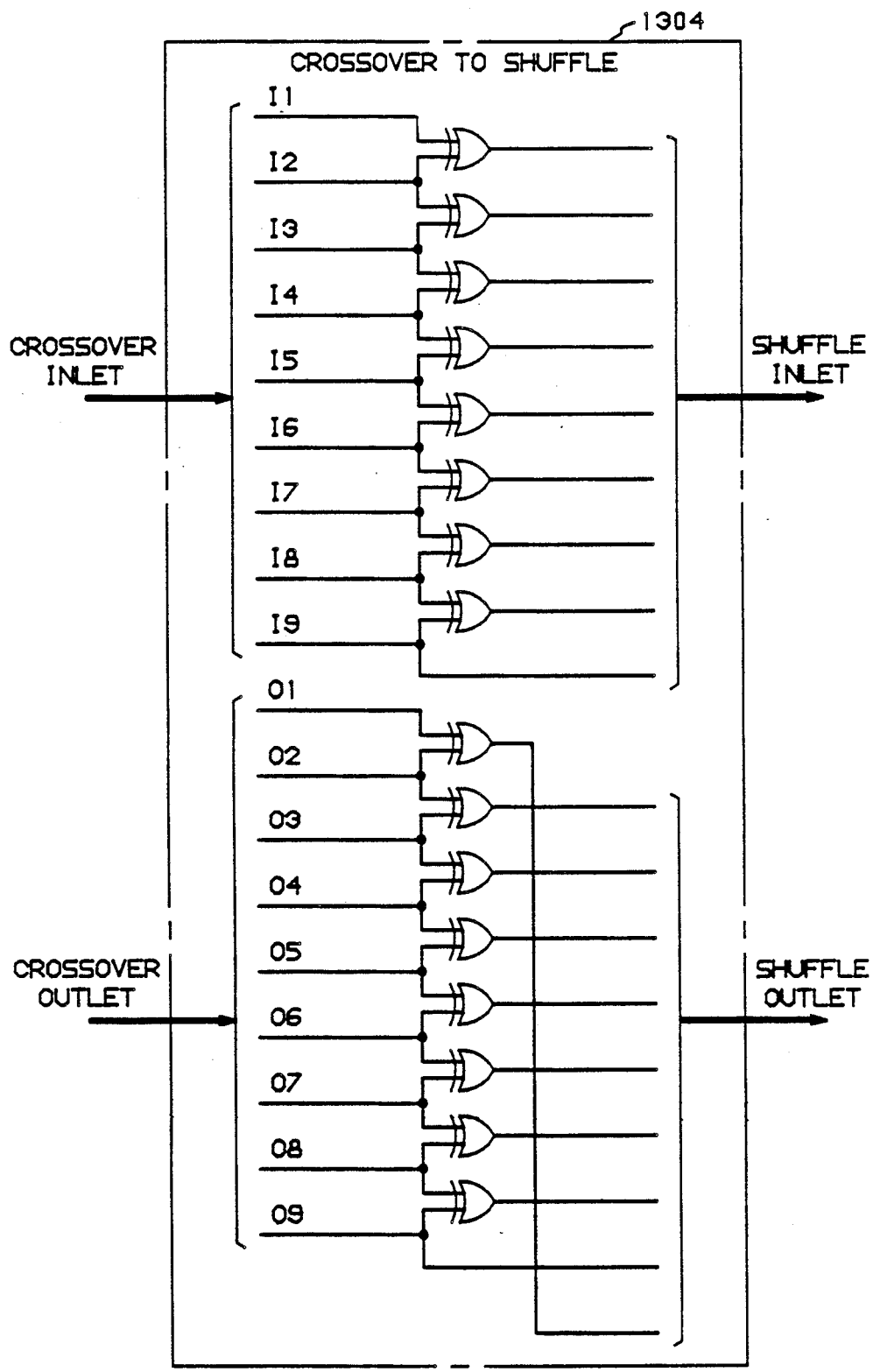

The crossover to shuffle mapping unit 1304 (FIG. 50) comprises a set of exclusive-OR gates combining the appropriate inlet and outlet signals. Since the network has fan-out and fan-in of eight, we may interpret the entire network as being comprised of a total of fifteen stages—three stages for one to eight fan-out, nine stages for switching, and three stages for one to eight fan-in. The fan-out/fan-in is accomplished by selectively equipping only one of each eight inlets/outlets (one inlet/outlet one of four switches). The selected 512 inlet and outlet switches are then mapped to the shuffle domain using expression (1), of Table 1. The resulting logic is indicated in FIG. 50.

The memories 1312 are each 512×8 random access memories storing the link busy/idle bits. The path busy/idle check units 1314 are implemented as OR gates. The select unit 1316 (FIG. 5) is implemented using an arrangement of AND, NAND, OR, and NOR gates to define, using three path signals, the selected idle path, and to generate a single signal for use both as a blocked path indicator and as a write request signal.

The disjoint path check unit 1306 is based on the logic arrangement shown in FIG. 46. The two inlet/outlet pairs checked are designated as (X9, X8, X7, X6, X5, X4, X3, X2, X1)—(Y9, Y8, Y7, Y6, Y5, Y4, Y3, Y2, Y1) and (x9, x8, x7, x6, x5, x4, x3, x2, x1)—(y9, y8, y7, y6, y5, y4, y3, y2, y1). The logic arrangement of unit 1306 is applicable for checking disjoint paths in network 1330, shown in FIG. 49, independent of the fanout as indicated by the first stage of elements being $1\times 2^n$ elements and independent of the fanin as indicated by the last stage of elements being $2^n \times 1$ elements. The logic arrangement of unit 1306 generates a logic zero signal when all paths for the inlet/outlet pairs are not link disjoint and generates a logic one signal when all pairs are link disjoint. The explanation of this logic is as follows. Consider the binary representation of $xM_1+P^*M+y$ for the two inlet/outlet pairs being checked.

$$\begin{array}{cc} x & y \end{array}$$

$$X_9X_8X_7X_6X_5X_4X_3X_2X_1ppp\,Y_9Y_8Y_7Y_6Y_5Y_4Y_3Y_2Y_1$$

$$\begin{array}{cc} x' & y' \end{array}$$

$$x_9x_8x_7x_6x_5x_4x_3x_2x_1ppp\,y_9y_8y_7y_6y_5y_4y_3y_2y_1$$

$L_i(x,P^*,y)$ is given by a window of $\log_2(r_i\cdot m_i) = n+k = 9+3 = 12$ bits displaced by $\log_2 M_{i+1} = 1-2-i$ bits from the right of these binary values for $4 \leq i \leq 11$. Since any stage 1, 2, or 3 link is accessible by only one inlet (the three stages of fan-out) and any stage 12, 13, or 14 link is accessible by only one outlet (the three stages of fan-in) we are concerned with $L_i$ only $4 \leq i \leq 11$.

Consider
$L_4(x,P^*,y)$ and $L_4(x',P^*,y')$
$L_4(x,P^*,y) = X_8X_7X_6X_5X_4X_3X_2X_1pppY_9$
$L_4(x',P^*,y') = x_8x_7x_6x_5x_4x_3x_2x_1ppp9$
Since the ppp field can take on all possible eight values, these two sets of links will be disjoint only if the remaining bits differ in at least one position. Thus, these two link sets will be disjoint if $D_4 = (X_8 \oplus x_8) + (X_7 \oplus x_7) + \ldots + (X_1 \oplus x_1) + (Y_9 \oplus y_9) = 1$. Similarly, $L_5(x,P^*,y)$ will be disjoint from $L_5(x',P^*,y')$ if $D_5 = (X_7 \oplus x_7) + \ldots + (X_1 \oplus x_1) + (Y_9 \oplus y_9) + (Y_8 \oplus y_8) = 1$ and so on until we reach $D_{11} = (X_1 \oplus x_1) + (Y_9 \oplus y_9) + \ldots + (Y_2 \oplus y_2) = 1$. The entire set of links will disjoint only if each $D_i = 1$ or $D_T = D_4 x D_5 x \ldots x D_{11} = 1$. The logic shown in FIG. 46 is a Boolean reduction of $D_T$.

When two inlet/outlet pairs are determined to be link disjoint, then the path hunt function to establish connections can be performed in an overlap mode of operation, as shown in the timing diagram of FIG. 47. As shown, the times needed to perform a read of the memories 1312, the subsequent operation of the logic circuitry comprising OR gates 1314 and the idle path select unit 1316, and then the subsequent time for writing of path memory 1318, as well as writing busy bits into the memories 1312, are indicated in FIG. 47 by the times $R_1, L_1, W_1$. The corresponding times for a second connection request are designated $R_2, L_2, W_2$. As shown, the second read occurs during the time that the results of the first reading are propagating through the several levels of logic gates. As shown in FIG. 48, when duplicate copies of the network controller memories, etc., are used, as in FIG. 45, four reads can be effected before the corresponding four writes occur.

Alternatively, instead of checking whether there are any conflicts among the paths between a first inlet and first outlet, and a second inlet and second outlet, one can simply proceed as if the selected paths did not conflict, and in case of a conflict, choose an alternate path between the second inlet and outlet. The presence of a conflict is detected if any of the busy-idle indicators for the second selected path must be retained as idle, except for those detected to be already busy, and a hunt for an alternate path between the second inlet and outlet is made.

In many EGS networks, the probability that two connection requests are disjoint is high. Consider an EGS network with N inlets and M outlets, S stages, and with $n_i$ inlets on each switch in stage i and $m_i$ outlets on each switch in stage i and where $$N = O_{mod} \prod_{j=1}^{i} n_j \text{ for } \prod_{j=1}^{i} n_j \leq N \text{ and}$$

$$M = O_{mod} \prod_{j=i}^{S} m_j \text{ for } \prod_{j=i}^{S} m_j \leq M.$$

Define L(a,b) as the set of all links in all paths between inlet a and outlet b, S(a,b) as the set of all switches in all paths between inlet a and outlet b, and $\phi$ as the empty or null set. With these definitions, we state the following theorems. Link disjoint path theorem:

$L(x,y) \cap L(x',y') = \phi$ if and only if $t \geq u$.

Switch disjoint path theorem:

$S(x,y) \cap S(x',y') = \phi$ if and only if $t > u$.

where t is the smallest value of i for which $$x = x'_{mod} \left\lceil \frac{N}{\prod_{j=1}^{i} n_j} \right\rceil$$

and
u is the largest value of i for which $$\left\lfloor \frac{Y}{\prod_{j=i}^{S} m_j} \right\rfloor = \left\lfloor \frac{Y'}{\prod_{j=i}^{S} m_j} \right\rfloor$$

and where
⌊W⌋ denotes the largest integer ≤ W and
⌈W⌉ denotes the smallest integer ≥ W.

For x,y and x',y' chosen at random, we consider two cases:

Case 0: x and x' are chosen with replacement from the set of N inlets, i.e., x and x' are allowed to be the same inlet. Similarly, y and y' are chosen with replacement from the set of M outlets. For this case we set a variable $\beta = 0$.

Case 1: x and x' and also y and y' are chosen without replacement from the sets of N inlets and M outlets, respectively. Thus, $x \neq x'$, and $x \neq y'$. For this case we set $\beta = 1$.

Link disjoint path probability: The probability that $L(x,y) \cap L(x',y') = \phi$ is given by $$1 - \frac{(n_1 - \beta) \times \min\left\{\prod_{j=2}^{S} m_j - \beta, N - \beta\right\}}{(N-\beta)^2} + $$

$$\frac{\sum_{i=2}^{S-1} \left[\min\left\{\prod_{j=1}^{i} n_j, N\right\} - \min\left\{\prod_{j=1}^{i-1} n_j, N\right\}\right]\left[\min\left\{\prod_{j=i+1}^{S} m_j - \beta, N - \beta\right\}\right]}{(N-\beta)^2}$$

Switch disjoint path probability: The probability that $S(x,y) \cap S(x',y') = \phi$ is given by $$1 - \frac{(n_1 - \beta) \times \min\left\{\prod_{j=1}^{S} m_j - \beta, N - \beta\right\}}{(N-\beta)^2} + \frac{\sum_{i=2}^{S}\left[\min\left\{\prod_{j=1}^{i} n_j, N\right\} - \min\left\{\prod_{j=1}^{i-1} n_j, N\right\}\right]\left[\min\left\{\prod_{j=i}^{S} m_j - \beta, N - \beta\right\}\right]}{(N-\beta)^2}$$

For $\log_2 N \leq S \leq 2 \log_2 N$: P (disjoint) = P (all paths between a given inlet/outlet pair are switch and link disjoint from all paths between another $$\text{Inlet/outlet} = 1 - \frac{2^S(2 \log_2 N - S + 1) - 2N + 1}{(N-1)^2}.$$

There are $$\frac{N^2}{2} [2^S(2 \log_2 N - S + 1) - 2N + 1]$$

ways to select two inlet/outlet pairs that have common switches for some paths. There are $$N^2 \frac{(N-1)^2}{2}$$

ways to select two inlet/outlet pairs. By way of example, for N=512, S=9, there are $512^2/2$ $[512(18-9+1)-1024+1]=537,001,984$ ways to select two inlet/outlet pairs with intersecting paths and $512^2 \times 511^2/2 = 34,225,651,712$ ways to select two inlet/outlet pairs. P (disjoint) = $1-537,001,984/34,225,651,712=0.9843$. In addition, P (at least 2 of 3 pairs are disjoint)$\approx 0.99999613$, P (each of 4 pairs are disjoint from the other three)$\approx 0.9094$, and P (some of 4 of 5 pairs are all disjoint)$\approx 0.996$.

It is to be understood that the above-described embodiments are merely illustrative of the principles of the invention and that many variations may be devised by those skilled in the art without departing from the spirit and scope of the invention. It is therefore intended that such variations be included within the scope of the claims.

I claim:

1. A method for use in an arrangement comprising a network for interconnecting any of a plurality of inlets with any of a plurality of outlets, said arrangement further comprising means for storing busy/idle information for path components of said network, said method comprising reading said storing means to identify an idle path from a first one of said inlets through said network to a first one of said outlets, after identifying an idle path from said first inlet to said first outlet, marking path components of said identified path busy in said storing means and before said marking, accessing said storing means to fine an idle path from a second one of said inlets through said network to a second one of said outlets, said method further comprising determining whether all paths of said network from said first inlet to said first outlet are disjoint from all paths of said network from said second inlet to said second outlet, and said accessing being in response to a determination that all paths of said network from said first inlet to said first outlet are disjoint from all paths of said network from said second inlet to said second outlet.

2. A method in accordance with claim 1 wherein said network comprises a plurality of nodes of capacity one and wherein said determining comprises determining whether any paths of said network from said first inlet to said first outlet include one of said nodes that is also included in any paths of said network from said second inlet to said second outlet.

3. A method in accordance with claim 1 wherein said network comprises a plurality of nodes of full capacity interconnected by links and wherein said determining comprises determining whether any paths of said network from said first inlet to said first outlet include one of said links that is also included in any paths of said network from said second inlet to said second outlet.

4. A method in accordance with claim 1 wherein each of said plurality of inlets is associated with an inlet binary number comprising a plurality of bits and each of said plurality of outlets is associated with an outlet binary number comprising a plurality of bits, said determining comprising logically processing the bits of the inlet binary numbers associated with said first and second inlets and the bits of the outlet binary numbers associated with said first and second outlets.

5. A method in accordance with claim 4 wherein said processing comprises logically combining corresponding bits of the inlet binary numbers associated with said first and second inlets and logically combining corresponding bits of the outlet binary numbers associated with said first and second outlets.

6. A method in accordance with claim 1 further comprising after finding an idle path from said second inlet to said second outlet, marking all path components of said found path busy in said storing means.

7. A method in accordance with claim 1 wherein said first and second inlets must be different ones of said plurality of inlets and said first and second outlets must be different ones of said plurality of outlets.

8. A method for use in an arrangement comprising a network for interconnecting any of a plurality of inlets with any of a plurality of outlets, sad arrangement further comprising means for storing busy/idle information for path components of said network, said method comprising reading said storing means to identify an idle path from a first one of said inlets through said network to a first one of said outlets, after identifying an idle path from said first inlet to said first outlet, marking path components of said identified path busy in said storing means and before said marking, accessing said storing means to find an idle path from a second one of said inlets through said network to a second one of said outlets, wherein said storing means comprises first and second memory means each for storing busy/idle information for all path components for all paths of said network, wherein said reading comprises reading said first memory means, wherein said marking comprises marking all path components of said identified path busy in both said first and second memory means, and wherein said accessing comprises accessing said second memory means.

9. A method in accordance with claim 8 wherein said accessing said second memory means is performed concurrently with said reading of said first memory means.

10. A method in accordance with claim 8 further comprising after finding an idle path from said second inlet to said second outlet, marking all path components of said found path busy in said storing means.

11. A method in accordance with claim 8 wherein said first and second inlets must be different ones of said plurality of inlets and said first and second outlets must be different ones of said plurality of outlets.

12. A method for use in an arrangement comprising a network for interconnecting any of a plurality of inlets with any of a plurality of outlets, said arrangement further comprising means for storing busy/idle information for all path components for all paths of said network, said method comprising reading said storing means to identify an idle path from a first one of said inlets through said network to a first one of said outlets, after identifying an idle path from said first inlet to said first outlet, marking path components of said identified path busy in said storing means and before said marking, accessing said storing means to find an idle path from a second one of said inlets through said network to a second one of said outlets, wherein said reading comprises reading busy/idle information from said storing means, and processing said read information, concurrently with said accessing, to identify an idle path from said first inlet to said first outlet.

13. A method in accordance with claim 12 further comprising after finding an idle path from said second inlet to said second outlet, marking all path components of said found path busy in said storing means, 14. A method in accordance with claim 12 wherein said first and second inlets must be different ones of said plurality of inlets and said first and second outlets must be different ones of said plurality of outlets.

15. A method for use in an arrangement comprising the network for interconnecting any of a plurality of inlets with any of a plurality of outlets, said arrangement further comprising first and second memory means each for storing busy/idle information for all path components for all paths of said network, said method comprising reading said first memory means to identify an idle path from a first one of said inlets through said network to a first one of said outlets and reading said second memory means, concurrently with said reading of said first memory means to identify an idle path from a second one of said inlets through said network to a second one of said outlets.

16. A method in accordance with claim 15 further comprising after identifying an idle path from said first inlet to said first outlet, marking all path components of said identified path from said first inlet to said first outlet busy in both said first and second memory means.

17. A method in accordance with claim 16 further comprising before said marking, accessing said first memory means to find an idle path from a third one of said inlets through said network to a third one of said outlets and accessing said second memory means, concurrently with said accessing of said first memory means, to identify an idle path from a fourth one of said inlets through said network to a fourth one of said outlets.

18. A method in accordance with claim 15 further comprising after identifying an idle path from said first inlet to said first outlet, marking all path components of said identified path from said first inlet to said first outlet busy in both said first and second memory means, and after identifying an idle path from said second inlet to said second outlet, marking all path components of said identified path from said second inlet to said second outlet busy in both said first and second memory means.

19. A method in accordance with claim 18 further comprising before marking said identified path from said first inlet to said first outlet busy in said first and second memory means and before marking said identified path from said second inlet to said second outlet busy in said first and second memory means, accessing said first memory means to find an idle path from a third one of said inlets through said network to a third one of said outlets and accessing said second memory means, concurrently with said accessing of said first memory means, to identify an idle path from a fourth one of said inlets through said network to a fourth one of said outlets.

20. A method for use in an arrangement comprising a network for interconnecting any of a plurality of inlets with any of a plurality of outlets, said arrangement further comprising means for storing busy/idle information for all path components for all paths of said network, said method comprising reading said storing means to determine all idle path from a first one of said inlets through said network to a first one of said outlets, after determining all idle paths from said first inlet to said first outlet, selecting one of said determined idle paths, after selecting one of said determined idle paths, marking all path components of said selected path busy in said storing means and before said marking but not before said reading, accessing said storing means to determine all idle paths from a second one of said inlets through said network to a second one of said outlets.

21. An arrangement comprising a network for interconnecting any of a plurality of inlets with any of a plurality of outlets, means for storing busy/idle information for path components of said network, means responsive to a request for a first connection from a first one of said inlets through said network to a first one of said outlets for reading busy/idle information from said storing means, means responsive to said read busy/idle information for identifying an idle path through said network for said first connection, means responsive to identification of said first connection path by said identifying means for marking path components of said first connection path as busy in said storing means, and means responsive to a request for a second connection from a second one of said inlets through said network to a second one of said outlets for controlling said reading means to read, before said first connection path components are marked busy by said marking means, busy/idle information from said storing means to identify an idle path through said network for said second connection, wherein said controlling means comprises means for determining whether all paths of said network from said first inlet to said first outlet are disjoint from all paths of said network from said second inlet to said second outlet, and wherein said controlling means controls said reading from said storing means to identify said second connection path only in response to a determination by said determining means that all paths of said network from said first inlet to said first outlet are disjoint from all paths of said network from said second inlet to said second outlet.

22. An arrangement comprising
a network for interconnecting any of a plurality of inlets with any of a plurality of outlets,
means for storing busy/idle information for path components of said network,
means responsive to a request for a first connection from a first one of said inlets through said network to a first one of said outlets for reading busy/idle information from said storing means,
means responsive to said read busy/idle information for identifying an idle path through said network for said first connection,
means responsive to identification of said first connection path by said identifying means for marking path components of said first connection path as busy in said storing means, and
means responsive to a request for a second connection from a second one of said inlets through said network to a second one of said outlets for controlling said reading means to read, before said first connection path components are marked busy by said marking means, busy/idle information from said storing means to identify an idle path through said network for said second connection,
wherein said storing means comprises first and second memory means each for storing busy/idle information for all path components for all paths of said network,
wherein said reading means is responsive to said request for said first connection for reading busy/idle information from said first means to identity said first connection path,
wherein said marking means is responsive to said identification of said first connection path for marking all path components of said first connection path as busy in both said first and second memory means, and
wherein said controlling means is responsive to said request for said second connection for controlling said reading means to read busy/idle information from said second memory means to identify said second connection path concurrently with reading busy/idle information from said first memory means to identify said first connection path.

23. An arrangement comprising
a network for interconnecting any of a plurality of inlets with any of a plurality of outlets,
means for storing busy/idle information for all path components for all paths of said network,
means responsive to a request for a first connection from a first one of said inlets through said network to a first one of said outlets for reading busy/idle information from said storing means,
means responsive to said read busy/idle information for identifying an idle path through said network for said first connection,
means responsive to identification of said first connection path by said identifying means for marking path components of said first connection path as busy in said storing means, and means responsive to a request for a second connection from a second one of said inlets through said network to a second one of said outlets for controlling said reading means to read, before said first connection path components are marked busy by said marking means, busy/idle information from said storing means to identify an idle path through said network for said second connection,
wherein said identifying means comprises
means for processing read busy/idle information to identify said first connection path, and
wherein said controlling means controls reading from said storing means to identify said second connection path concurrently with said processing means processing to identify said first connection path.

24. A method for use in an arrangement comprising a network having a plurality of stages, said network for providing paths for selectively interconnecting any of a plurality of inlets with any of a plurality of outlets, said arrangement further comprising a plurality of groups of storage locations, each group of storage locations being addressable via an address bus common to that group and storing stage busy/idle information for all of said paths of said network through an associated one of said stages, said method comprising
in response to a request for a connection from a first one of said inlets through said network to a first one of said outlets, reading stored stage busy/idle information from each of said groups of storage locations,
processing said read information to identify an idle one of said paths from said first inlet through said network to said first outlet,
after identifying said idle path from said first inlet through said network to said first outlet, marking as busy the storage location from each of said groups that corresponds to said identified path and
before said marking, not before said reading, and without otherwise modifying any storage location of said groups in response to said request, accessing stored stage busy/idle information from each of said groups of storage locations to find an idle one of said paths from a second one of said inlets through said network to a second one of said outlets.

25. A method in accordance with claim 24 wherein said accessing is performed concurrently with at least one of said reading and said processing.

26. A method in accordance with claim 25 wherein said reading comprises
reading stored stage busy/idle information concurrently from each of said groups of storage locations, and wherein said accessing comprises
accessing stored stage busy/idle information concurrently from each of said groups of storage locations.

27. A method in accordance with claim 24 wherein said reading comprises
reading stored stage busy/idle information concurrently from each of said groups of storage locations, and wherein said accessing comprises
accessing stored stage busy/idle information concurrently from each of said groups of storage locations.

28. A method for use in an arrangement comprising a network having a plurality of stages, said network for providing paths for selectively interconnecting any of a plurality of inlets with any of a plurality of outlets, said arrangement further comprising a plurality of groups of first storage locations, each group of first storage locations being addressable via an address bus common to that group and storing stage busy/idle information for all of said paths of said network through an associated one of said stages, said arrangement further comprising a plurality of groups of second storage locations, each group of second storage locations being addressable via an address bus common to that group and storing stage busy/idle information for all of said paths of said network through an associated one of said stages, said method comprising in response to a request for a connection from a first one of said inlets through said network to a first one of said outlets, reading stored stage busy/idle information from each of said groups of first storage locations, processing said read information to identify an idle one of said paths from said first inlet through said network to said first outlet, after identifying said idle path from said first inlet through said network to said first outlet, marking as busy the storage location from each of said groups of first storage locations that corresponds to said identified path and the storage location from each of said groups of second storage locations that corresponds to said identified path and before said marking, not before said reading, and without otherwise modifying any storage location of said groups of said first storage locations and said groups of second storage locations in response to said request, accessing stored stage busy/idle information from each of said groups of second storage locations to find an idle one of said paths from a second one of said inlets through said network to a second one of said outlets.

29. A method in accordance with claim 28 wherein said accessing is performed concurrently with said reading.

30. A method in accordance with claim 29 wherein said reading comprises reading stored stage busy/idle information concurrently from each of said groups of first storage locations, and wherein said accessing comprises accessing stored stage busy/idle information concurrently from each of said groups of second storage locations.

31. A method in accordance with claim 28 wherein said reading comprises reading stored stage busy/idle information concurrently from each of said groups of first storage locations, and wherein said accessing comprises accessing stored stage busy/idle information concurrently from each of said groups of second stage locations.

32. A method in accordance with claim 30 further comprising after said reading, updating the stage busy/idle information in both of said first and second duplicate means of said at least three storing means to indicate present stage busy/idle status before again reading the stage busy/idle information from said first and second duplicate means of said at least three storing means.

33. A method for use in an arrangement comprising a network having a plurality of inlets and a plurality of outlets and comprising a plurality of stages, said arrangement further comprising a plurality of means each for storing stage busy/idle information for an associated one of said stages, said method comprising combining stage busy/idle information concurrently from at least three of said storing means to hunt for an idle path from a specified one of said inlets through said network to a specified one of said outlets, wherein each of said plurality of storing means comprises first and second duplicate means each for storing the same stage busy/idle information for an associated one of said stages, wherein said combining comprises reading stage busy/idle information concurrently from the first and second duplicate means of said at least three storing means to hunt for a first idle path from a first specified one of said inlets through said network to a first specified one of said outlets and for a second idle path from a second specified one of said inlets through said network to a second specified one of said outlets.

34. An arrangement comprising a network having a plurality of inlets and a plurality of outlets and comprising a plurality of stages, a plurality of means each for storing stage busy/idle information for an associated one of said stages, and means responsive to a request for a connection from a specified one of said inlets through said network to a specified one of said outlets for combining stage busy/idle information concurrently from at least three of said storing means to hunt for an idle path for said connection, wherein each of said plurality of storing means comprises first and second duplicate means each for storing the same stage busy/idle information for an associated one of said stages, and wherein said combining means comprises means responsive to a request for a first connection from a first specified one of said inlets through said network to a first specified one of said outlets and a request for a second connection from a second specified one of said inlets through said network to a second specified one of said outlets for effecting a reading of stage busy/idle information concurrently from the first and second duplicate means of said at least three storing means to hunt for a first idle path for said first connection and for a second idle path for said second connection.

* * * * *

UNITED STATES PATENT AND TRADEMARK OFFICE
CERTIFICATE OF CORRECTION

PATENT NO. : 4,993,016

DATED : February 12, 1991

INVENTOR(S) : Gaylord W. Richards

BEST AVAILABLE COPY

It is certified that error appears in the above-identified patent and that said Letters Patent is hereby corrected as shown below:

Column 8, line 49, (5) $r_i m_i = r_{i+1} n_{i+1}$ for $1 \leq i \leq S-1$.

should be (5) $r_i m_i = r_{i+1} n_{i+1}$ for $1 \leq i \leq S-1$.

Column 9, line 11, where $\ulcorner x \urcorner$ denotes the smallest integer $\geq x$ and $x$ should be where $\lceil x \rceil$ denotes the smallest integer $\geq x$ and $\lfloor x \rfloor$ Column 9, line 56, $k^*1$ should be $k+1$

UNITED STATES PATENT AND TRADEMARK OFFICE
CERTIFICATE OF CORRECTION

PATENT NO. : 4,993,016
DATED : February 12, 1991
INVENTOR(S) : Gaylord W. Richards

BEST AVAILABLE COPY

It is certified that error appears in the above-identified patent and that said Letters Patent is hereby corrected as shown below:

Column 12, line 55, $\sum_{p=1}^{i} n_p - 1$ should be $\prod_{p=1}^{i-1} m_p$

Column 12, line 64, " $\sum_{p=1}^{i}$ should be $\prod_{p=1}^{i} n_p$

Column 19, line 36, " $\phi_1(\beta) \in \{(\phi_I(\alpha) \times F - o_I)_{\bmod r_I} : o_I \{0,1, \ldots, F-1\}\}$, where $\emptyset_1 \in C_1$:

should be $\phi_1(\beta) \in \left\{ \left[\phi_I(\alpha) \times F + o_I\right]_{\bmod r_I} : o_I\{0,1,\cdots,F-1\} \right\}$, where $\phi_1 \in C_1$. $C_1$ exists Column 19, line 65, $\frac{n_I r_I}{M} = F$.

should be $C_1$ exists, $\frac{n_s r_s}{M} = F'$

UNITED STATES PATENT AND TRADEMARK OFFICE
CERTIFICATE OF CORRECTION

PATENT NO. : 4,993,016

DATED : February 12, 1991

INVENTOR(S) : Gaylord W. Richards

BEST AVAILABLE COPY

It is certified that error appears in the above-identified patent and that said Letters Patent is hereby corrected as below:

Column 20, line 12, $C_2$ exists, $\frac{n'}{\lambda} = F$.

should be $C_2$ exists, $\frac{n_s r_s}{N} = F'$

Column 20, line 21, $\psi_s(\alpha)((\psi_o\beta) \times F - i_o/mod\ r_s \in \{0,1,\ldots F-1\})$, where $\psi \in C_2$.

should be $\psi_s(\alpha) \in \left\{ \left[\psi_o(\beta) \times F' + i_o\right]_{mod\ r_s} : i_o \in \{0,1,\cdots,F'-1\} \right\}$, where $\psi_s \in C_2$.

Column 20, line 44, $r_i$ should be $r_i \in$

Column 20, line 50, "permitting", should be "permutation"

Column 20, lines 57, 58, $S \geq 3,\ n_1 \geq 1,\ m_1 = F,\ r_1 = N,$ $n_r = F,\ M_2 = 1,\ r_2 = N.$ should be $S \geq 3,\ n_1 = 1,\ m_1 = F,\ r_1 = N,\ n_S = F,\ M_S = 1,\ r_S = N,$

UNITED STATES PATENT AND TRADEMARK OFFICE
CERTIFICATE OF CORRECTION

PATENT NO. : 4,943,03x

DATED : February 17, 1991

INVENTOR(S) : (illegible)

BEST AVAILABLE COPY

It is certified that error appears in the above-identified patent and that said Letters Patent is hereby corrected as shown below:

Column 23, line 34, $P, Sp(x,P^*,y)$ should be $P, S_i(x,P^*,y),$ and $L_i(x,P^*,y)$ Column 23, lines 45, 46, $N=M=2^n, n_1=m_2=1, m_1=n_2=2^k=F,$ and, for $2 \leq i \leq S-1, n_i=m_i=2,$ where should be $N = M = 2^n, n_1 = m_S = 1, m_1 = n_S = 2^k = F,$ and, for $2 \leq i \leq S-1, n_i = m_i = 2,$ where--

Column 23, lines 65, 66, Also, $x \cdot 2^{S+k-2}$ has values should be Also, $x \cdot 2^{S+k-2}$ has values Column 24, lines 5, 6, 7, $xM_1 - P^*M - y = \underbrace{xx \cdots x}_{n} \underbrace{p p \cdots p}_{S-k-n-2} \underbrace{yy \cdots y}_{n}$ should be $xM_1 + P^*M + y \equiv \underbrace{xx \cdots x}_{n} \underbrace{pp \cdots p}_{S+k-n-2} \underbrace{yy \cdots y}_{n}.$

UNITED STATES PATENT AND TRADEMARK OFFICE
CERTIFICATE OF CORRECTION

PATENT NO. : 4,993,016

DATED : February 12, 1991

INVENTOR(S) : Gaylord W. Richards

BEST AVAILABLE COPY

It is certified that error appears in the above-identified patent and that said Letters Patent is hereby corrected as shown below:

Column 24, lines 15, 16, should be
$$S_i(x,P^*,y) = \left\lfloor \frac{xM_1 + P^*M + y}{M_i} \right\rfloor_{\bmod r_i} = \left\lfloor \frac{xM_1 + P^*M + y}{2^{S-i}} \right\rfloor_{\bmod 2^{n+k-1}} \text{ for}$$

$2 \leq i \leq S-1$.

Column 24, line 30, 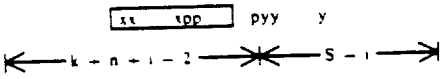

should be
$$\underbrace{xx\cdots xpp\cdots}_{k+n+i-2} \underbrace{pyy\cdots y}_{S-i}$$

Column 24, line 45, 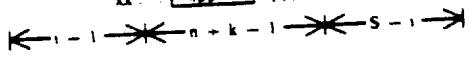

should be
$$\underbrace{xx\cdots}_{i-1} \underbrace{xpp\cdots}_{n+k-1} \underbrace{pyy\cdots y}_{S-i}$$

Column 29, line 41  $n = k - 1 + S - i$ should be  $n + k - 1 + S - i$

UNITED STATES PATENT AND TRADEMARK OFFICE
CERTIFICATE OF CORRECTION

PATENT NO. : 4,993,016

DATED : February 12, 1991

INVENTOR(S) : Gaylord W. Richards

It is certified that error appears in the above-identified patent and that said Letters Patent is hereby corrected as shown below:

Column 30, lines 32-38, $$\overbrace{X_9X_8X_7X_6X_5X_4X_3X_2X_1}^{x} ppp \overbrace{Y_9Y_8Y_7Y_6Y_5Y_4Y_3Y_2Y_1}^{y}$$
$$\overbrace{x_9x_8x_7x_6x_5x_4x_3x_2x_1}^{x'} ppp \overbrace{y_9y_8y_7y_6y_5y_4y_3y_2y_1}^{y'}$$

should be $$\overbrace{X_9X_8X_7X_6X_5X_4X_3X_2X_1}^{x} ppp \overbrace{Y_9Y_8Y_7Y_6Y_5Y_4Y_3Y_2Y_1}^{y}$$
$$\overbrace{x_9x_8x_7x_6x_5x_4x_3x_2x_1}^{x'} ppp \overbrace{y_9y_8y_7y_6y_5y_4y_3y_2y_1}^{y'}$$

Column 30, line 40, $M_{i-1} = 1-$ should be $M_{i+1} = 12-i$

Column 30, line 50, $L_4(x',P^*,y') = x_8x_7x_6x_5x_4x_3x_2x_1 ppp_9$ should be $L_4(x',P^*,y') = x_8x_7x_6x_5x_4x_3x_2x_1 pppy_9$ Column 32, lines 18, 19, $W$ denotes the largest integer $\leq W$ and
$W$ denotes the smallest integer $\geq W$.

should be $\lfloor W \rfloor$ denotes the largest integer $\leq W$ and
$\lceil W \rceil$ denotes the smallest integer $\geq W$.

UNITED STATES PATENT AND TRADEMARK OFFICE
CERTIFICATE OF CORRECTION

PATENT NO. : 4,993,016
DATED : February 12, 1991
INVENTOR(S) : Gaylord W. Richards

BEST AVAILABLE COPY

It is certified that error appears in the above-identified patent and that said Letters Patent is hereby corrected as shown below:

Column 32, line 45  $S(x,y) \cap S(x.40,y) = \phi$ should be  $S(x,y) \cap S(x',y') = \phi$ Column 12, line 66, "products" should be "product",

In the claims:

Column 33, line 37, "fine" should be "find".

Signed and Sealed this

Fifth Day of January, 1993

*Attest:*

DOUGLAS B. COMER

*Attesting Officer*  *Acting Commissioner of Patents and Trademarks*